US011890876B2

(12) United States Patent
Ono et al.

(10) Patent No.: US 11,890,876 B2
(45) **Date of Patent: *Feb. 6, 2024**

(54) LIQUID CARTRIDGE PROVIDED WITH LIQUID SUPPLY PORTION HAVING GUIDE GROOVE

(71) Applicant: BROTHER KOGYO KABUSHIKI KAISHA, Nagoya (JP)

(72) Inventors: Akihito Ono, Nagoya (JP); Akinari Ishibe, Okazaki (JP)

(73) Assignee: BROTHER KOGYO KABUSHIKI KAISHA, Aichi (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/159,803

(22) Filed: Jan. 26, 2023

(65) Prior Publication Data

US 2023/0234368 A1 Jul. 27, 2023

Related U.S. Application Data

(63) Continuation of application No. 17/371,217, filed on Jul. 9, 2021, now Pat. No. 11,571,907, which is a (Continued)

(30) Foreign Application Priority Data

Mar. 27, 2017 (JP) ................................. 2017-061901

(51) Int. Cl.
*B41J 2/175* (2006.01)

(52) U.S. Cl.
CPC ........... *B41J 2/17553* (2013.01); *B41J 2/175* (2013.01); *B41J 2/1752* (2013.01); *B41J 2/1753* (2013.01);

(Continued)

(58) Field of Classification Search
CPC .... B41J 2/17553; B41J 2/175; B41J 2/17509; B41J 2/17513; B41J 2/1752; B41J 2/1753; B41J 2/1754
See application file for complete search history.

(56) References Cited

U.S. PATENT DOCUMENTS 4,907,019 A 3/1990 Stephens
5,425,478 A 6/1995 Kotaki et al.

(Continued)

FOREIGN PATENT DOCUMENTS

CN 1107103 A 8/1995
CN 126109 A 7/2000

(Continued)

OTHER PUBLICATIONS

Extended European Search Report from European Patent Application No. 17184054.9, dated Feb. 5, 2018.

(Continued)

*Primary Examiner* — Yaovi M Ameh
(74) *Attorney, Agent, or Firm* — Merchant & Gould P.C.

(57) ABSTRACT

A liquid cartridge configured to be inserted into a cartridge attachment section includes: a cartridge body having a liquid storage chamber, and a liquid supply portion configured to supply the liquid stored in the liquid storage chamber to an outside. The liquid supply portion includes: a front end face facing frontward, an outer peripheral surface extending rearward from the front end face, and at least one guide provided at the outer peripheral surface. Each of the at least one guide is guided by corresponding at least one projection of the cartridge attachment section during attachment of a liquid supply tube of the cartridge attachment section to the liquid supply portion at a time of attachment of the liquid (Continued)

cartridge to the cartridge attachment section. Each of the at least one guide includes: a first guide portion, and a second guide portion.

18 Claims, 28 Drawing Sheets

Related U.S. Application Data continuation of application No. 16/893,499, filed on Jun. 5, 2020, now Pat. No. 11,065,880, which is a continuation of application No. 16/514,574, filed on Jul. 17, 2019, now Pat. No. 10,703,107, which is a continuation of application No. 15/664,100, filed on Jul. 31, 2017, now Pat. No. 10,357,976.

(52) U.S. Cl.
CPC ......... *B41J 2/1754* (2013.01); *B41J 2/17509* (2013.01); *B41J 2/17513* (2013.01)

(56) References Cited

U.S. PATENT DOCUMENTS

| | | | | |
|---|---|---|---|---|
| 5,512,925 | A | 4/1996 | Ohashi | |
| 5,512,926 | A | 4/1996 | Uchikata et al. | |
| 5,619,239 | A | 4/1997 | Kotaki et al. | |
| 5,886,721 | A | 3/1999 | Fujii et al. | |
| 5,953,031 | A | 9/1999 | Omata et al. | |
| 6,003,985 | A * | 12/1999 | Bekki | B41J 2/17566 347/49 |
| 6,470,744 | B1 | 10/2002 | Usui et al. | |
| 6,511,167 | B1 | 1/2003 | Kitabatake et al. | |
| 6,623,104 | B1 | 9/2003 | Kotaki et al. | |
| 6,799,820 | B1 | 10/2004 | Usui et al. | |
| 8,132,898 | B2 | 3/2012 | Fukazawa et al. | |
| 9,815,288 | B2 | 11/2017 | Wang | |
| 11,571,907 | B2 * | 2/2023 | Ono | B41J 2/1752 |
| 2002/0060725 | A1 | 5/2002 | Shinada et al. | |
| 2002/0071011 | A1 | 6/2002 | Hayashi et al. | |
| 2002/0118262 | A1 | 8/2002 | Seino et al. | |
| 2003/0001934 | A1 | 1/2003 | Kitabatake et al. | |
| 2003/0156171 | A1 | 8/2003 | Yamaguchi et al. | |
| 2004/0074804 | A1 | 4/2004 | Toba et al. | |
| 2006/0007283 | A1 | 1/2006 | Sacco, Jr. et al. | |
| 2006/0125887 | A1 | 6/2006 | Hwang | |
| 2007/0139491 | A1 | 6/2007 | Conway et al. | |
| 2007/0229615 | A1 * | 10/2007 | Hattori | B41J 2/17566 347/86 |
| 2007/0229618 | A1 | 10/2007 | Sugahara | |
| 2008/0230141 | A1 | 9/2008 | Hattori | |
| 2008/0231675 | A1 | 9/2008 | Hattori | |
| 2008/0239033 | A1 | 10/2008 | Hattori | |
| 2008/0291251 | A1 | 11/2008 | Hattori | |
| 2009/0135237 | A1 | 5/2009 | Nakamura et al. | |
| 2009/0141103 | A1 | 6/2009 | Takagi | |
| 2011/0285797 | A1 | 11/2011 | Ogawa et al. | |
| 2011/0310193 | A1 | 12/2011 | Ishibe et al. | |
| 2012/0038719 | A1 | 2/2012 | Shimizu et al. | |
| 2013/0050358 | A1 | 2/2013 | Kanbe et al. | |
| 2013/0278683 | A1 | 10/2013 | Kanbe et al. | |
| 2013/0278684 | A1 | 10/2013 | Kanbe et al. | |
| 2013/0314476 | A1 | 11/2013 | Kodama et al. | |
| 2014/0063139 | A1 | 3/2014 | Iwamuro et al. | |
| 2014/0063145 | A1 | 3/2014 | Iwamuro et al. | |
| 2014/0063148 | A1 | 3/2014 | Iwamuro et al. | |
| 2014/0292958 | A1 * | 10/2014 | Tomoguchi | B41J 2/17513 347/86 |
| 2014/0362147 | A1 | 12/2014 | Blowfield et al. | |
| 2015/0022599 | A1 | 1/2015 | Nozawa et al. | |
| 2015/0224782 | A1 | 8/2015 | Nakamura et al. | |
| 2016/0016412 | A1 | 1/2016 | Mizutani et al. | |
| 2016/0263905 | A1 | 9/2016 | Kimura et al. | |
| 2016/0279960 | A1 | 9/2016 | Okazaki et al. | |
| 2016/0368272 | A1 | 12/2016 | Ono et al. | |
| 2017/0066248 | A1 | 3/2017 | Ono | |
| 2017/0165972 | A1 | 6/2017 | Lee | |
| 2017/0197429 | A1 | 7/2017 | Kimura et al. | |

FOREIGN PATENT DOCUMENTS

| | | | |
|---|---|---|---|
| CN | 1361011 | A | 7/2002 |
| CN | 101132918 | A | 2/2008 |
| CN | 101310986 | A | 11/2008 |
| CN | 103358704 | A | 10/2013 |
| CN | 104999798 | A | 10/2015 |
| CN | 110546006 | A | 12/2019 |
| CN | 1336872 | A | 2/2020 |
| DE | 10 2015 009 612 | A1 | 1/2017 |
| EP | 1 053 881 | A1 | 11/2000 |
| EP | 1 065 062 | A2 | 1/2001 |
| EP | 1 398 156 | A2 | 2/2003 |
| EP | 1 300 245 | A1 | 4/2003 |
| EP | 1 403 064 | A1 | 3/2004 |
| EP | 1 612 049 | A1 | 1/2006 |
| EP | 2147792 | A1 | 1/2010 |
| EP | 2 233 300 | A1 | 9/2010 |
| EP | 2 607 088 | A2 | 6/2013 |
| EP | 2 666 640 | A2 | 11/2013 |
| EP | 2 746 053 | A2 | 6/2014 |
| EP | 2 783 862 | A2 | 10/2014 |
| EP | 3 112 163 | A1 | 1/2015 |
| EP | 3153320 | A1 | 4/2017 |
| JP | 1427485 | S | 8/1986 |
| JP | H01-080425 | U | 5/1989 |
| JP | 4-164649 | A | 6/1992 |
| JP | 6-15834 | A | 1/1994 |
| JP | 6-210865 | A | 8/1994 |
| JP | 8-207298 | A | 8/1996 |
| JP | 9-109415 | A | 4/1997 |
| JP | 10-44452 | A | 2/1998 |
| JP | 2001-10078 | A | 1/2001 |
| JP | 2003-237102 | A | 8/2003 |
| JP | 2004-090624 | A | 3/2004 |
| JP | 2006-56118 | A | 3/2006 |
| JP | 2007-192838 | A | 8/2007 |
| JP | 2007-268792 | A | 10/2007 |
| JP | 2008-49640 | A | 3/2008 |
| JP | 2008-194885 | A | 8/2008 |
| JP | 2008-213147 | A | 9/2008 |
| JP | 2010-228388 | A | 10/2010 |
| JP | 2011-240686 | A | 12/2011 |
| JP | 2013-123905 | A | 6/2013 |
| JP | 2013-220650 | A | 10/2013 |
| JP | 2014-46531 | A | 3/2014 |
| JP | 2015-3473 | A | 1/2015 |
| JP | 2016-159458 | A | 9/2016 |
| JP | 2016-168835 | A | 9/2016 |
| JP | 2016-185650 | A | 10/2016 |
| JP | 2017-52219 | A | 3/2017 |
| KR | 10-1493035 | B1 | 2/2015 |
| TW | 505573 | B | 10/2002 |
| WO | 2007/128171 | A1 | 11/2007 |
| WO | 2007/146029 | A2 | 12/2007 |
| WO | 2016/157901 | A1 | 10/2016 |
| WO | 2019/026100 | A1 | 2/2019 |

OTHER PUBLICATIONS

Extended European Search Report issued in related European Application No. 17184048.1, dated Jan. 23, 2018.

International Search Report and Written Opinion in related International Patent Application No. PCT/JP2017/027636, dated Apr. 11, 2018.

International Search Report and Written Opinion in related International Patent Application No. PCT/JP2017/027680, dated Apr. 13, 2018.

International Search Report and Written Opinion in related International Patent Application No. PCT/JP2017/027715, dated Apr. 6, 2018.

(56) References Cited

OTHER PUBLICATIONS

International Search Report and Written Opinion issued in corresponding International Application PCT/JP2017/027668, dated Apr. 9, 2018.
International Search Report and Written Opinion issued in corresponding International Application PCT/JP2017/027167, dated Apr. 3, 2018.
International Search Report and Written Opinion issued in related International Patent Application No. PCT/JP2017/027670, dated Apr. 18, 2018.
Office Action (Notice of Allowance) issued in related U.S. Appl. No. 15/663,892, dated Mar. 8, 2018.
Office Action (Notice of Allowance) issued in related U.S. Appl. No. 15/663,892, dated Jul. 6, 2018.
Office Action (Notice of Allowance) issued in related U.S. Appl. No. 15/663,919, dated May 22, 2019.
Office Action (Notice of Allowance) issued in related U.S. Appl. No. 15/664,077, dated Feb. 25, 2019.
Office Action (Notice of Allowance) issued in related U.S. Appl. No. 15/664,100, dated Mar. 15, 2019.
Office Action issued in related U.S. Appl. No. 15/663,919, dated Jan. 2, 2019.
Office Action issued in related U.S. Appl. No. 15/663,919, dated May 18, 2018.
Office Action issued in related U.S. Appl. No. 15/663,992, dated Apr. 5, 2019.
Office Action issued in related U.S. Appl. No. 15/663,992, dated May 10, 2018.
Office Action issued in related U.S. Appl. No. 15/663,992, dated Sep. 7, 2018.
Office Action issued in related U.S. Appl. No. 15/664,077, dated Aug. 9, 2018.
Office Action issued in related U.S. Appl. No. 15/664,077, dated May 2, 2018.
Related U.S. Appl. No. 15/663,892, filed Jul. 31, 2017.
Related U.S. Appl. No. 15/663,919, filed Jul. 31, 2017.
Related U.S. Appl. No. 15/663,992, filed Jul. 31, 2017.
Related U.S. Appl. No. 15/664,077, filed Jul. 31, 2017.
Office Action issued in related European Patent Application 17184048.1, dated Jan. 24, 2020.
Extended European Search Report issued in corresponding European Patent Application 19206782.5, dated Feb. 5, 2020.
International Preliminary Report on Patentability issued in related International Patent Application No. PCT/JP2017/027617, dated Feb. 13, 2020.
International Preliminary Report on Patentability issued in related International Patent Application No. PCT/JP2017/027715, dated Feb. 13, 2020.
Notification of Office Action issued corresponding Chinese Patent Application No. 201780087450.0, dated Jun. 22, 2020.
Office Action (Notice of Reasons for Refusal) issued in corresponding Japanese Patent Application No. 2017-061901, dated Feb. 24, 2021.
Notification of Second Office Action issued corresponding Chinese Patent Application No. 201780087450.0, dated Jan. 26, 2021.
Office Action issued in related U.S. Appl. No. 16/682,746, dated Aug. 10, 2020.
Office Action (Notice of Reasons for Refusal) issued in related Japanese Patent Application No. 2017-061894, dated Mar. 2, 2021.
Office Action (Notice of Reasons for Refusal) issued in related Japanese Patent Application No. 2017-061895, dated Mar. 2, 2021.
Office Action (Notice of Reasons for Refusal) issued in related Japanese Patent Application No. 2017-061894, dated Aug. 10, 2021.
Office Action issued in related U.S. Appl. No. 17/389,419, dated Aug. 19, 2022.
Notification of First Office Action issued in corresponding Chinese Patent Application No. 202110936331.6, dated Aug. 29, 2022.
Office Action (Notice of Reasons for Refusal) issued in corresponding Japanese Patent Application No. 2021-152978, dated Nov. 15, 2022.
Office Action (Notice of Reasons for Refusal) issued in related Japanese Patent Application No. 2022-026122, dated Apr. 4, 2023.
Office Action issued in related Japanese Patent Application No. 2022-026122, dated Aug. 16, 2023.

* cited by examiner

LIQUID CARTRIDGE PROVIDED WITH LIQUID SUPPLY PORTION HAVING GUIDE GROOVE

REFERENCE TO RELATED APPLICATIONS

This application is a continuation application of U.S. application Ser. No. 17/371,217, filed Jul. 9, 2021, now U.S. Pat. No. 11,571,907, which is a continuation of U.S. application Ser. No. 16/893,499, filed Jun. 5, 2020, now U.S. Pat. No. 11,065,880, which is a continuation of U.S. application Ser. No. 16/514,574, filed Jul. 17, 2019, now U.S. Pat. No. 10,703,107, which is a continuation of U.S. application Ser. No. 15/664,100 filed Jul. 31, 2017, now U.S. Pat. No. 10,375,976, which claims priority from Japanese Patent Application No. 2017-061901 filed Mar. 27, 2017. The present application relates to co-pending U.S. patent application Ser. Nos. 15/663,992, 15/664,077, 15/663,919 and 15/663,892, all filed on Jul. 31, 2017. The aforementioned applications are incorporated herein by reference in their entirety.

BACKGROUND ART

Technical Field

The present disclosure relates to a liquid cartridge including: a casing having a liquid storage chamber; and a liquid supply portion configured to supply liquid stored in the liquid storage chamber to an outside.

Background

A printer including a recording head configured to eject ink supplied from an ink cartridge through nozzles is known in the art. For example, Japanese Patent Application Publication No. 2016-185650 discloses an ink cartridge configured to be attached to a cartridge attachment section provided at a main body of a printer. In a state where the ink cartridge is attached to the cartridge attachment section, an ink needle provided at the cartridge attachment section is inserted into a tubular ink supply portion provided at the ink cartridge. Thus, ink can be supplied from the ink cartridge to a recording head through the ink needle. The cartridge attachment section is provided with a hollow cylindrical guide portion at a position around the ink needle. During attachment process of the ink cartridge to the cartridge attachment section, the tubular ink supply portion is guided by the hollow cylindrical guide portion. Accordingly, the ink needle is introduced into an inner space of the ink supply portion.

DESCRIPTION

Summary

When the tubular ink supply portion is guided by the hollow cylindrical guide portion, an outer peripheral surface of the ink supply portion contacts an inner peripheral surface of the guide portion. By virtue of this contact, the ink supply portion is fixed in position relative to the guide portion. However, if the positioning of the ink supply portion is performed by the contact between the outer peripheral surface of the ink supply portion and the inner peripheral surface of the guide portion, the ink supply portion may be wobbling relative to the guide portion since an area of the peripheral surface used for positioning the ink supply portion is extensive. If the ink supply portion wobbles relative to the guide portion during attachment of the ink cartridge to the cartridge attachment section, the ink needle may collide against the ink supply portion, so that ink adhered onto a tip end of the ink needle may be adhered to the outer peripheral surface of the ink supply portion. In this case, a user's hand may be polluted by the ink adhered to the ink supply portion when the ink cartridge is detached from the cartridge attachment section.

In view of the foregoing, it is an object of the present disclosure to provide a liquid cartridge capable of suppressing wobbling of a liquid supply portion relative to the liquid supply tube when the liquid supply portion is guided to a guide portion of a cartridge attachment section.

In order to attain the above and other objects, according to one aspect, the disclosure provides a liquid cartridge configured to be inserted into a cartridge attachment section in a frontward direction perpendicular to a gravitational direction in an upright posture. The cartridge attachment section having a liquid supply tube extending in a front-rear direction. The liquid cartridge includes: in the upright posture of the liquid cartridge, a cartridge body, and a liquid supply portion. The cartridge body has a liquid storage chamber configured to store liquid therein. The liquid supply portion defines a liquid passage therein. The liquid supply portion is configured to supply the liquid stored in the liquid storage chamber to an outside through the liquid passage in the frontward direction. The liquid supply portion includes: a front end face, an outer peripheral surface, and at least one guide. The front end face faces frontward. The liquid passage extends in the front-rear direction and is open frontward on the front end face. The outer peripheral surface extends rearward from the front end face. The at least one guide is provided at the outer peripheral surface of the liquid supply portion and extends in the front-rear direction. Each of the at least one guide is configured to be guided by corresponding at least one projection provided at the cartridge attachment section and extending in the front-rear direction during attachment of the liquid supply tube to the liquid supply portion at a time of attachment of the liquid cartridge to the cartridge attachment section. The projection has one surface, and another surface crossing the one surface. Each of the at least one guide includes: a first guide portion, and a second guide portion. The first guide surface extends in the front-rear direction and is configured to be in contact with the one surface. The second guide surface extends in the front-rear direction and is configured to be in contact with the another surface.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

Figure 1:
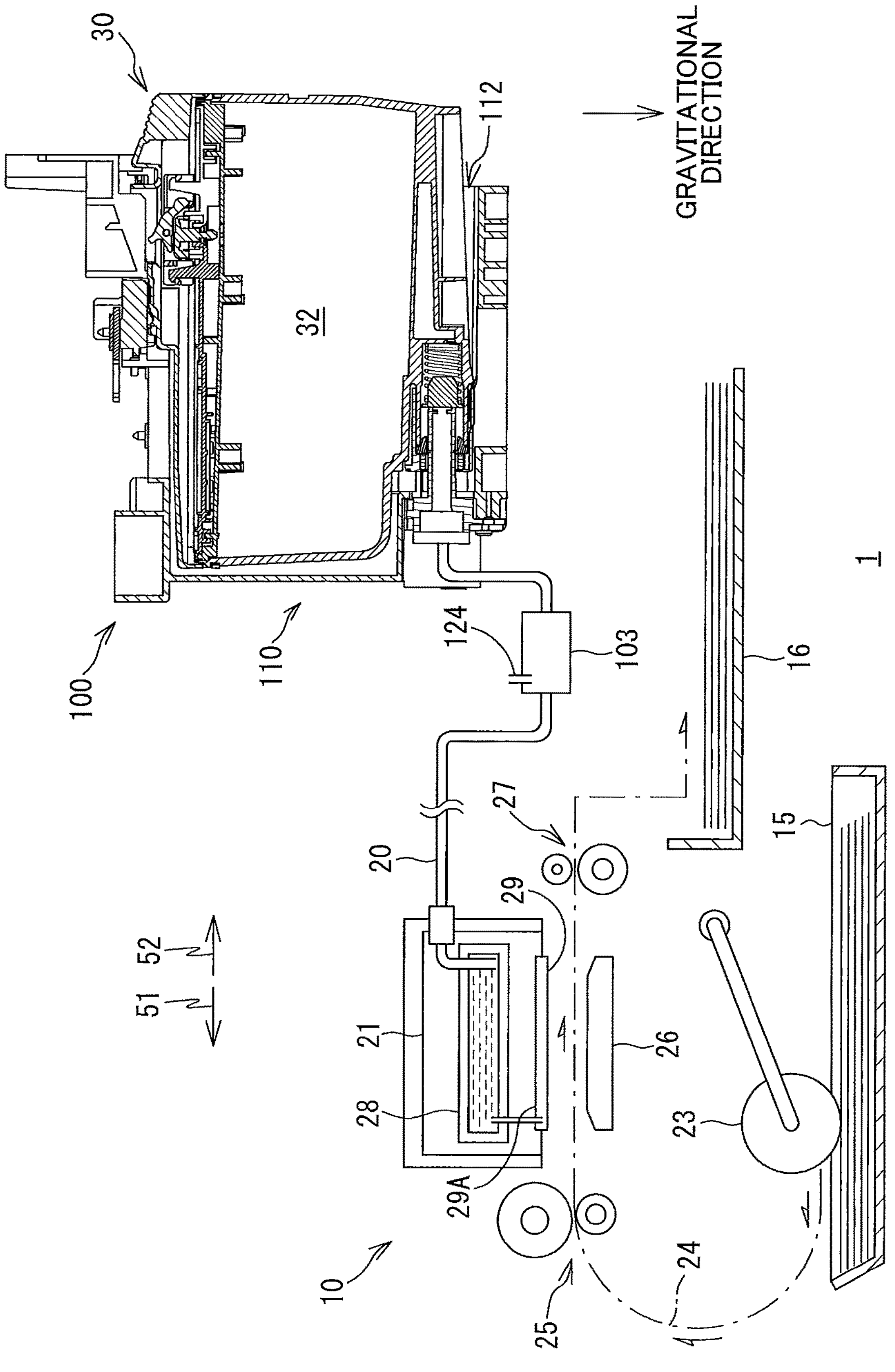
FIG. 1 is a schematic vertical cross-sectional diagram illustrating an internal structure of a printer 10 provided with a cartridge attachment section 110 to which an ink cartridge 30 according to one embodiment is detachably attached.

An ink cartridge 30 according to one embodiment and a printer 10 to which the ink cartridge 30 is detachably attachable will be described with reference to FIGS. 1 through 22, wherein like parts and components are designated by the same reference numerals to avoid duplicating description. In the embodiment, a combination of the ink cartridge 30 and the printer 10 constitutes a system 1.

In the following description, a direction in which the ink cartridge 30 is inserted into a cartridge attachment section 110 of the printer 10 is defined as a "frontward direction 51," while a direction in which the ink cartridge 30 is removed from the cartridge attachment section 110 is defined as a "rearward direction 52." The frontward direction 51 and the rearward direction 52 are opposite to each other. As will be described later, the ink cartridge 30 is inserted into and removed from the cartridge attachment section 110 in a horizontal direction. Both the frontward direction 51 and the rearward direction 52 are therefore regarded as directions parallel to a horizontal plane perpendicular to the gravitational direction. Further, a direction perpendicular to the frontward direction 51 or the rearward direction 52 is defined as a "downward direction 53." A direction opposite to the downward direction 53 is defined as an "upward direction 54." A direction perpendicular to the frontward direction 51 and the downward direction 53 is defined as a "rightward direction 55." A direction opposite to the rightward direction 55 is defined as a "leftward direction 56." The rightward direction 55 and the leftward direction 56 are also parallel to the horizontal plane.

Hence, in a state where the ink cartridge 30 is attached to the cartridge attachment section 110, that is, in a state where the ink cartridge 30 is capable of being used or operated by the printer 10, the downward direction 53 is coincident with a direction of a gravitational force acting on the ink cartridge 30 (i.e. gravitational direction), and the upward direction 54 is coincident with a direction opposite to the gravitational direction. Therefore, in a state where the ink cartridge 30 is attached to the cartridge attachment section 110 and capable of being used by the printer 10, an outer surface of a main bottom wall portion 42 (described later) of a cartridge casing 130 (described later) faces downward, that is, faces in the gravitational direction. Further, at this state, the frontward direction 51 and the rearward direction 52 are perpendicular to the gravitational direction.

Further, the rightward direction 55 and the leftward direction 56 are defined as directions perpendicular to the frontward direction 51 and the downward direction 53. More specifically, in a state where the ink cartridge 30 is attached to the cartridge attachment section 110 and is capable of being used by the printer 10, the rightward direction 55 is a direction toward the right and the leftward direction 56 is a direction toward the left when the ink cartridge 30 is viewed from a rear side thereof.

Note that a state where the ink cartridge 30 is attached to the cartridge attachment section 110 or a state where the ink cartridge 30 is capable of being operated by the printer 10 implies a state of the ink cartridge 30 when the ink cartridge 30 has been completely inserted into an attachment position in the cartridge attachment section 110. At the attachment position, an ink needle 102 provided at the cartridge attachment section 110 is inserted into an ink supply portion 34 of the ink cartridge 30 to be coupled to the ink supply portion 34, and an IC board 64 (described later) provided at the ink cartridge 30 is in contact with contacts 106 (described later) provided at the cartridge attachment section 110. Hereinafter, a posture of the ink cartridge 30 in a state where the ink cartridge 30 is attached to the cartridge attachment section 110 or a state where the ink cartridge 30 is capable of being operated by the printer 10 will be referred to as an “operational posture.” The operational posture of the ink cartridge 30 will also be referred to as an “upright posture.”

Further, the frontward direction 51 and the rearward direction 52 may be collectively referred to as a “front-rear direction.” The upward direction 54 and the downward direction 53 may be collectively referred to as an “up-down direction.” The rightward direction 55 and the leftward direction 56 may be collectively referred to as a “left-right direction.”

Further, in the following description, an expression “facing frontward” means “facing in a direction containing a frontward component, an expression “facing rearward” means “facing in a direction containing a rearward component.” Further, an expression “facing downward” means “facing in a direction containing a downward component,” and an expression “facing upward” means “facing in a direction containing an upward component.” For example, a phrase “A front surface faces frontward.” denotes that the front surface may face in the frontward direction, or the front surface may face in a direction inclined relative to the frontward direction as long as the direction contains a frontward component.

<Overview of Printer 10>

As illustrated in FIG. 1, the printer 10 is an image recording apparatus configured to selectively eject ink droplets onto recording sheets to record images thereon based on an inkjet recording system. The printer 10 is, for example, an inkjet printer. The printer 10 includes a recording head 21, an ink supplying device 100, and ink tubes 20 connecting the recording head 21 to the ink supplying device 100. The ink supplying device 100 includes the cartridge attachment section 110. The cartridge attachment section 110 can detachably accommodate a plurality of ink cartridges 30. The cartridge attachment section 110 has an opening 112 in one side thereof. Through the opening 112, each of the ink cartridges 30 can be inserted into the cartridge attachment section 110 in the frontward direction 51 and removed from the cartridge attachment section 110 in the rearward direction 52. In the embodiment, four ink cartridges 30 corresponding to respective four colors of cyan, magenta, yellow, and black can be accommodated in the cartridge attachment section 110 of the ink supply device 100. For an explanatory purpose, in the following description and the drawings, only one ink cartridge 30 is assumed to be attached to the cartridge attachment section 110 unless otherwise specified.

The ink cartridge 30 stores liquid therein. Specifically, the ink cartridge 30 stores ink therein that can be used for printing operations performed in the printer 10. When the ink cartridge 30 has been completely attached to the cartridge attachment section 110, the ink cartridge 30 is connected to the recording head 21 through the corresponding ink tube 20. The recording head 21 has a plurality of (four in the embodiment) damper chambers 28 corresponding to the plurality of ink cartridges 30. Each damper chamber 28 is adapted to temporarily store the ink supplied from the corresponding ink cartridge 30 through the corresponding ink tube 20. The recording head 21 also includes a plurality of nozzles 29 through which the ink supplied from the respective damper chambers 28 is selectively ejected. More specifically, the recording head 21 is provided with a head control board (not illustrated), and a plurality of piezoelectric elements 29A corresponding one-on-one to the plurality of nozzles 29. The head control board is configured to selectively apply drive voltages to the plurality of piezoelectric elements 29A to eject ink selectively from the nozzles 29. In this way, the recording head 21 is configured to consume ink stored in each ink cartridge 30 that has been attached to the cartridge attachment section 110.

The printer 10 includes a sheet feeding tray 15, a sheet feeding roller 23, a pair of conveying rollers 25, a platen 26, a pair of discharge rollers 27, and a sheet discharge tray 16. The sheet feeding roller 23 feeds recording sheets from the sheet feeding tray 15 onto a conveying path 24. The recording sheets conveyed to the conveying path 24 are then received by the pair of conveying rollers 25. The pair of conveying rollers 25 conveys the recording sheets over the platen 26. The recording head 21 selectively ejects ink onto the recording sheets as the recording sheets passes over the platen 26, whereby images are recorded on the recording sheets. The pair of discharge rollers 27 receives the recording sheets that have passed over the platen 26 and discharges the recoding sheets onto the sheet discharge tray 16 provided at a position most downstream in the conveying path 24.

<Ink Supplying Device 100>

As illustrated in FIG. 1, the ink supplying device 100 is provided in the printer 10. The ink supplying device 100 is configured to supply ink to the recording head 21. The ink supplying device 100 includes the cartridge attachment section 110, a plurality of (four in the embodiment) tanks 103, and the plurality of (four in the embodiment) ink tubes 20. The ink cartridges 30 are detachably attachable to the cartridge attachment section 110. Note that FIG. 1 illustrates a state where the ink cartridge 30 has been completely attached to the cartridge attachment section 110. That is, in FIG. 1, the ink cartridge 30 is its attached state where the ink cartridge 30 has been completely attached to the cartridge attachment section 110. In other words, the ink cartridge 30 illustrated in FIG. 1 is in its operational posture described above.

<Cartridge Attachment Section 110>

Figure 2:
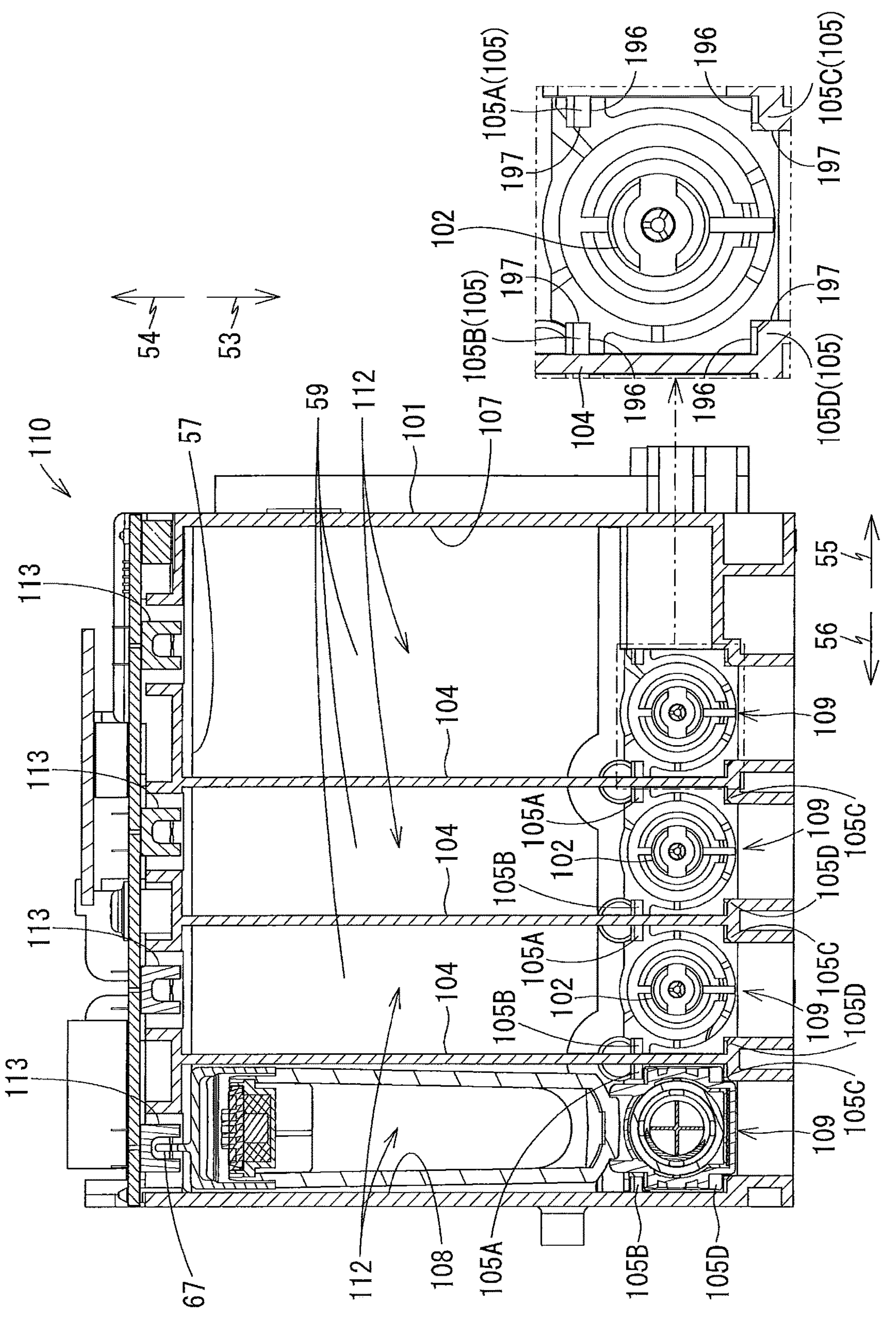
FIG. 2 is a cross-sectional view of the cartridge attachment section 110 according to the embodiment as viewed from a rear side thereof.
Figure 3:
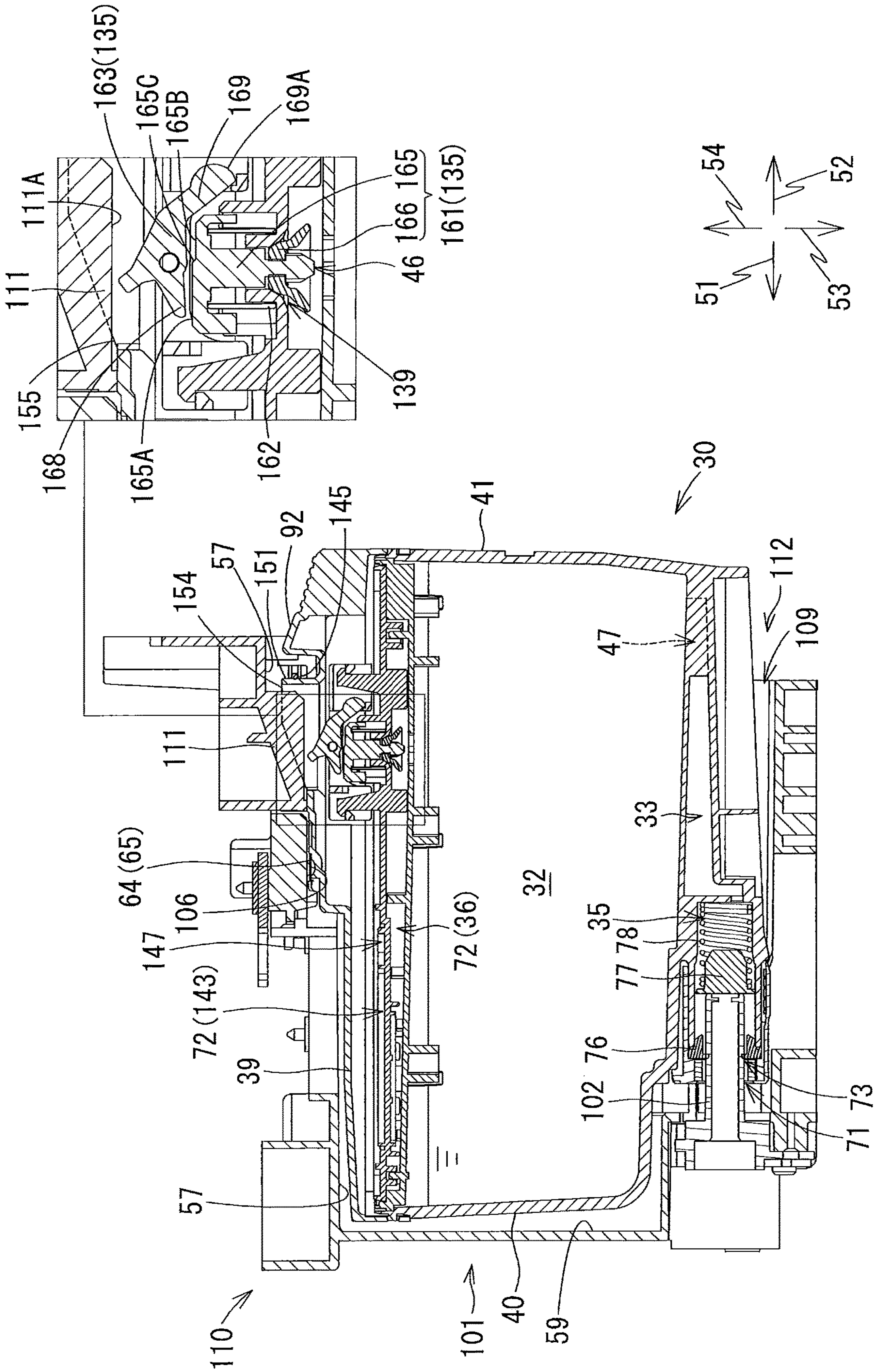
FIG. 3 is a vertical cross-sectional view of the cartridge attachment section 110 and the ink cartridge 30 according to the embodiment, illustrating a state where the ink cartridge 30 has been completely attached to the cartridge attachment section 110.

As illustrated in FIGS. 1 to 3, the cartridge attachment section 110 includes a case 101, a plurality of (four in the embodiment) ink needles 102, a plurality of (four in the embodiment) projection plates 111, a plurality of (four in the embodiment) optical sensors 113, and a plurality of sets (four sets in the embodiment) of contacts 106. As described above, four types of ink cartridges 30 corresponding to four colors of ink, i.e. cyan, magenta, yellow, and black, are detachably mountable in the cartridge attachment section 110. The four ink needles 102, the four projection plates 111, and the four optical sensors 113 are provided in one-to-one correspondence with the four ink cartridges 30. Four contacts 106 are provided for one ink cartridge 30. Accordingly, four sets of four contacts 106, that is, a total of 16 (sixteen) contacts 106 are provided for the four ink cartridges 30. The four tanks 103 and the four ink tubes 20 are provided in one-to-one correspondence with the four ink cartridges 30.

As illustrated in FIG. 2, the case 101 constitutes a housing of the cartridge attachment section 110. The case 101 has a generally box-like shape defining an internal space. The case 101 has an inner top surface 57, an inner bottom surface, an inner right-side surface 107, an inner left-side surface 108, an inner end surface 59, and the opening 112. The inner top surface 57 defines the top of the internal space of the case 101. The inner bottom surface defines the bottom of the internal space of the case 101. The inner right-side surface 107 defines the right of the internal space of the case 101. The inner left-side surface 108 defines the left of the internal space of the case 101. The inner end surface 59 connects the inner top surface 57, the inner bottom surface, the inner right-side surface 107, and the inner left-side surface 108. The opening 112 is formed in the case 101 at a position facing the inner end surface 59 in the front-rear direction. The opening 112 can be exposed to a user-interface surface of the printer 10 that a user can face when operating the printer 10.

Each ink cartridge 30 can be inserted into and removed from the case 101 through the opening 112. The case 101 has a bottom portion formed with a plurality of (four in the embodiment) guide grooves 109 for guiding insertion and removal of the ink cartridges 30 relative to the case 101. Movements of the respective ink cartridges 30 in the front-rear direction (i.e., in FIG. 2, a direction perpendicular to a sheet surface) are guided by the corresponding guide grooves 109 as lower end portions of the ink cartridges 30 are inserted into the corresponding guide grooves 109. The case 101 has three plates 104 (FIG. 2) that partition the internal space into four individual spaces each elongated in the up-down direction. Each of the four spaces partitioned by the plates 104 can receive corresponding one of the four ink cartridges 30.

<Ink Needle 102>

As illustrated in FIGS. 2 and 3, each ink needle 102 has a hollow tubular shape and is disposed at a lower end portion of an end wall (i.e. a wall having the inner end surface 59) of the case 101. At the end wall of the case 101, the ink needles 102 are arranged at positions corresponding to the corresponding ink supply portions 34 of the ink cartridges 30 accommodated in the cartridge attachment section 110.

Each ink needle 102 protrudes rearward from the inner end surface 59 of the case 101 and is open at its distal end (i.e. rear end). Incidentally, each ink needle 102 may have a flat-shaped tip or a pointed tip.

Figure 15:
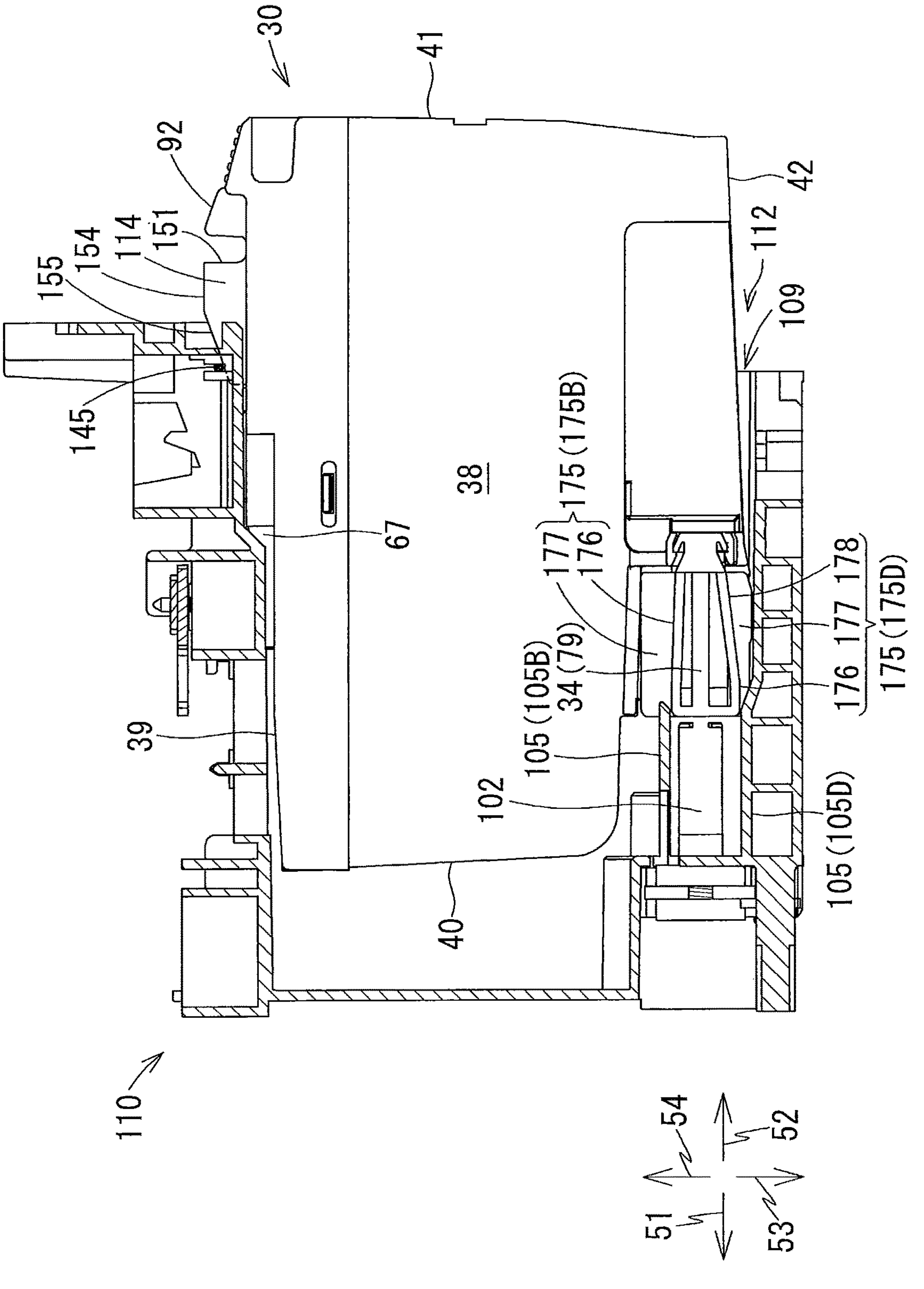
FIG. 15 is a vertical cross-sectional view of the cartridge attachment section 110 and a left side view of the ink cartridge 30 during an attachment process of the ink cartridge 30 to the cartridge attachment section 110 according to the embodiment.

As illustrated in FIG. 2, a plurality of projections 105 are formed on the inner right-side surface 107, the inner left-side surface 108, and the plates 104 of the case 101. The projections 105 are provided at the case 101 in the vicinity of the ink needles 102. In this embodiment, four projections 105 are provided for each ink needle 102. More specifically, when viewed in an insertion direction that the ink cartridge 30 is inserted into the cartridge attachment section 110 (i.e. frontward direction 51), the four projections 105 are respectively positioned at an upper-right side, an upper-left side, a lower-right side and a lower-left side relative to each ink needle 102. Specifically, the four projections 105 include a projection 105A, a projection 105B, a projection 105C, and a projection 105D. The projection 105A is disposed at the upper-right side relative to the ink needle 102. The projection 105B is disposed at the upper-left side relative to the ink needle 102. The projection 105C is disposed at the lower-right side relative to the ink needle 102. The projection 105D is disposed at the lower-left side relative to the ink needle 102. Hereinafter, the four projections 105A, 105B, 105C, and 105D will also be collectively referred to as "projections 105." As illustrated in FIG. 15, the projections 105 extend in the front-rear direction.

Each projection 105 has a first guide surface 196 and a second guide surface 197. In FIG. 2, for the sake of simplicity, reference signs 196 and 197 appear only on the first guide surfaces 196 and the second guide surfaces 197 of the projections 105A, 105B, 105C, and 105D positioned in the rightmost space of the case 101.

The first guide surface 196 is a plane extending in the front-rear direction and the left-right direction. The second guide surface 197 is a plane extending in the front-rear direction and the up-down direction. The second guide surface 197 is connected to the first guide surface 196. Incidentally, the first guide surface 196 and the second guide surface 197 need not be connected to each other.

The first guide surface 196 of the projection 105A and the first guide surface 196 of the projection 105C oppose each other and are spaced apart from each other in the up-down direction. The first guide surface 196 of the projection 105B and the first guide surface 196 of the projection 105D oppose each other and are spaced apart from each other in the up-down direction. The second guide surface 197 of the projection 105A and the second guide surface 197 of the projection 105B oppose each other and spaced apart from each other in the left-right direction. The second guide surface 197 of the projection 105C and the second guide surface 197 of the projection 105D oppose each other and are spaced apart from each other in the left-right direction.

Note that the projections 105 need not be positioned at the upper-right side, the upper-left side, the lower-right side, and the lower-left side relative to each ink needle 102. The projections 105 may be positioned at a left side, a right side, an upper side, and a lower side relative to each ink needle 102. Further, three or less projections 105, or five or more projections 105 may be provided for each ink needle 102.

<Projection Plate 111>

As illustrated in FIG. 3, a projection plate 111 is provided in each of the four spaces of the case 101 in which one of the four ink cartridges 30 can be accommodated. Accordingly, four projection plates 111 are provided at the case 101, with one in each of the four cartridge-accommodating spaces. Specifically, the projection plates 111 each protrude, in the respective cartridge-accommodating spaces, downward from the inner top surface 57 of the case 101 at positions near the opening 112. Each projection plate 111 has a dimension in the left-right direction smaller than a gap distance between a pair of walls 114 constituting a protruding portion 43 (see FIG. 4, described later) of the ink cartridge 30. Further, the projection plate 111 is located between the pair of walls 114 in the left-right direction when the ink cartridge 30 has been inserted into the cartridge attachment section 110. During the insertion process of the ink cartridge 30 into the cartridge attachment section 110, the projection plate 111 advances into a space between the pair of walls 114 of the protruding portion 43 of the ink cartridge 30. When the ink cartridge 30 has been completely attached to the cartridge attachment section 110, the projection plate 111 is positioned between the pair of walls 114 in the left-right direction, as illustrated in FIG. 3. The projection plate 111 has a bottom surface 111A capable of abutting against a lever 163 of a valve mechanism 135 (see FIG. 3, described later).

<Contact 106>

As illustrated in FIG. 3, a set of the four contacts 106 (only one contact is shown in FIG. 3) is disposed in each of the four cartridge-accommodating spaces of the case 101. Specifically, the set of the four contacts 106 is disposed on the inner top surface 57, in each cartridge-accommodating space of the case 101, at a position frontward of the projection plate 111. The set of the four contacts 106 protrudes downward from the inner top surface 57 into the cartridge-accommodating space of the case 101. The four contacts 106 are arranged spaced apart from one another in the left-right direction, although not illustrated in the drawings in detail. The four contacts 106 in each set are arranged at positions respectively corresponding to four electrodes 65 (described later, see FIG. 4) provided at each of the ink cartridges 30. Each contact 106 is formed of a material having electrical conductivity and resiliency. The contacts 106 can thus be resiliently deformable upward. In the embodiment, four sets of the four contacts 106 are provided each set for each of the four ink cartridges 30 that can be accommodated in the case 101. Hence, a total of 16 (sixteen) contacts 106 are provided at the case 101. However, the contacts 106 and the electrodes 65 may be provided in any number desired.

Each of the contacts 106 is electrically connected to an arithmetic unit (not illustrated) of the printer 10 via an electric circuit. The arithmetic unit may include a CPU, a ROM, a RAM, and the like, for example. The arithmetic unit may function as, for example, a controller of the printer 10. When contacting the corresponding four electrodes 65, the four contacts 106 are electrically connected thereto, respectively. As a result, a voltage Vc is applied to one of the four electrodes 65; another of the four electrodes 65 is grounded; a signal indicative of data is transmitted to another of the four electrodes 65, and a synchronization signal is transmitted from the arithmetic unit to the other of the four electrodes 65. Once the contacts 106 have been electrically connected to the corresponding electrodes 65, respectively, the arithmetic unit can access data stored in an IC of the ink cartridge 30. Output from each of the contacts 106 via the electric circuit is inputted into the arithmetic unit.

<Optical Sensor 113>

As illustrated in FIG. 2, the four optical sensors 113 are disposed on the inner top surface 57 of the case 101. Specifically, each of the optical sensors 113 is disposed, in each cartridge-accommodating space of the case 101, at a position frontward of the set of the four contacts 106. Each of the optical sensors 113 includes a light emitter and a light receiver. The light emitter and the light receiver oppose each other in the left-right direction. Specifically, the light emitter is located leftward or rightward of the light receiver with a space therebetween. When the ink cartridge 30 has been attached to the cartridge attachment section 110, a light-blocking plate 67 (described later, see FIGS. 2 and 4) of the attached ink cartridge 30 is positioned between the light emitter and the light receiver of the corresponding optical sensor 113. In other words, the light emitter and the light receiver of the optical sensor 113 are arranged at positions opposing each other such that the light-blocking plate 67 of the ink cartridge 30 attached to the cartridge attachment section 110 is positioned between the light emitter and the light receiver.

Each optical sensor 113 is adapted to output different detection signals depending on whether or not the light receiver has received light emitted in the left-right direction from the light emitter. For example, the optical sensor 113 outputs a low-level signal when the light receiver fails to receive the light emitted from the light emitter (that is, when an intensity of the light received by the light receiver is smaller than a prescribed value). On the other hand, the optical sensor 113 outputs a high-level signal when the light receiver receives the light emitted from the light emitter (that is, when the intensity of the received light is equal to or greater than the prescribe value).

<Lock Shaft 145>

As illustrated in FIG. 3, a lock shaft 145 is provided at the case 101. The lock shaft 145 extends in the left-right direction in the vicinity of the inner top surface 57 and the opening 112 of the case 101. The lock shaft 145 is a rod-like member extending in the left-right direction. The lock shaft 145 is formed of metal and has a columnar shape, for example. The lock shaft 145 has left and right end portions fixed to walls defining left and right ends of the case 101. Hence, the lock shaft 145 is immovable, for example, not pivotable, relative to the case 101. The lock shaft 145 extends in the left-right direction, spanning the four cartridge-accommodating spaces of the case 101 each in which the ink cartridge 30 can be accommodated. In each of the cartridge-accommodating spaces, a space exists around the lock shaft 145. A lock surface 151 (described later) of each ink cartridge 30 can therefore access the lock shaft 145 by moving upward or rearward.

Here, the term "access" may imply either a physical access or contact (such as, contact that the lock shaft 145 contacts the lock surface 151), or an optical access (such as, exposure of the light-blocking plate 67 (described later) to light emitted from the optical sensor 113). Alternatively, the term "access" may imply an electrical access (such as, establishment of electrical connection between the electrodes 65 of the IC board 64 (described later) and the contacts 106 to allow a current to flow therebetween when the contacts 106 contact the electrodes 65. Further, the access may be achieved in the up-down direction or in the left-right direction. The access may alternatively be achieved in the front-rear direction.

The lock shaft 145 is adapted to retain the ink cartridge 30 attached to the cartridge attachment section 110 at the attachment position. The ink cartridge 30 is brought into engagement with the lock shaft 145 when the ink cartridge 30 is inserted into the cartridge attachment section 110 and pivotally moved to the operational posture. Further, the lock shaft 145 retains the ink cartridge 30 at the attachment position in the cartridge attachment section 110 against an urging force of a coil spring 78 (see FIG. 3) of the ink cartridge 30 that pushes the ink cartridge 30 rearward.

<Tank 103>

As illustrated in FIG. 1, each tank 103 is provided at a position frontward of the case 101. The tank 103 has a box-like shape that allows ink to be stored therein. The tank 103 has an atmosphere communication port 124 at its top portion. Through the atmosphere communication port 124, the tank 103 opens to an outside. That is, an inner space of the tank 103 is open to an atmosphere through the atmosphere communication port 124. At a rear portion of the tank 103, the inner space of the tank 103 communicates with the inner space of the ink needle 102. Hence, ink flowing out from the ink cartridge 30 through the corresponding ink needle 102 is stored in the corresponding tank 103. Four ink tubes 20 are connected to the four tanks 103, respectively. The ink stored in the inner space of each tank 103 is thus supplied to the recording head 21 through the corresponding ink tube 20.

<Overall Structure of Ink Cartridge 30>

Figure 4:
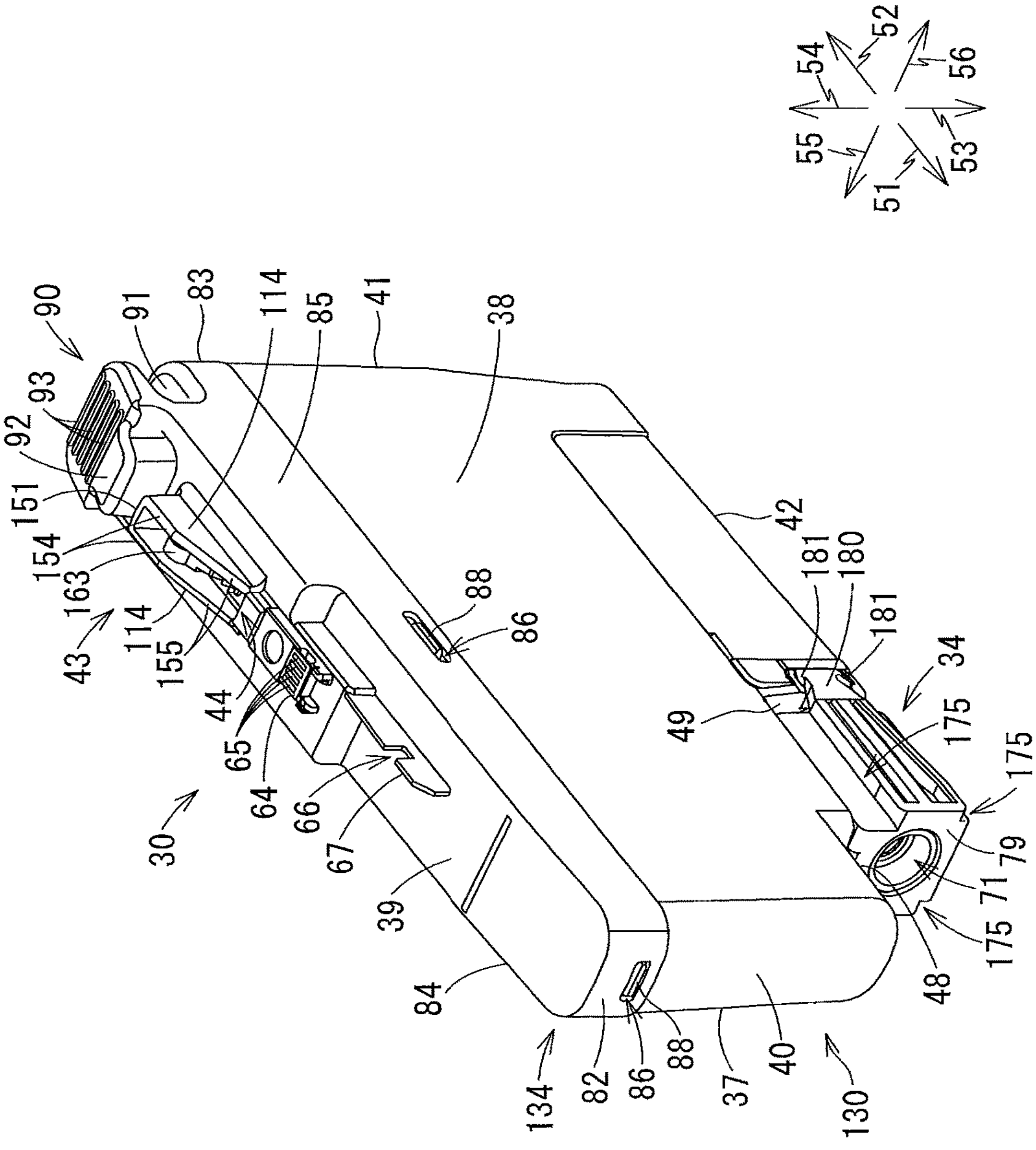
FIG. 4 is a perspective view of the ink cartridge 30 according to the embodiment as viewed from a front side thereof.

The ink cartridge 30 is a container for storing liquid, such as ink, therein. As described above, in the embodiment, four ink cartridges 30 corresponding to respective four colors of cyan, magenta, yellow, and black can be attached to the cartridge attachment section 110. Of the four ink cartridges 30, three ink cartridges 30 respectively corresponding to three colors of cyan, magenta, and yellow are identical in structure as illustrated in FIG. 4. The ink cartridge 30 corresponding to a color of black differs in structure from the other three ink cartridges 30 in that the dimension in the left-right direction of the ink cartridge 30 corresponding to a color of black is greater than that of the ink cartridge 30 corresponding to colors of cyan, magenta, and yellow. Other than this difference, the ink cartridge 30 corresponding to a color of black is substantially identical to the other three ink cartridges 30 corresponding to colors of cyan, magenta, and yellow. The composition of the ink stored in the ink cartridge 30 is not particularly limited, but the ink may be pigment ink having a sedimentary component, for example. Alternatively, the ink may be dye ink.

First, the structure of the ink cartridge 30 corresponding to colors of cyan, magenta, and yellow will be described in detail. With regard to the configuration of the ink cartridge 30 corresponding to a color of black, only parts differing from those of the ink cartridge 30 corresponding to colors of cyan, magenta, and yellow will be described later as a variation of the ink cartridge 30. Note that hereinafter the ink cartridge 30 corresponding to a color of black will also be referred to as an ink cartridge 30K when it is necessary to distinguish between the ink cartridge 30 corresponding to colors of cyan, magenta, and yellow and the ink cartridge 30 corresponding to a color of black.

Figure 5:
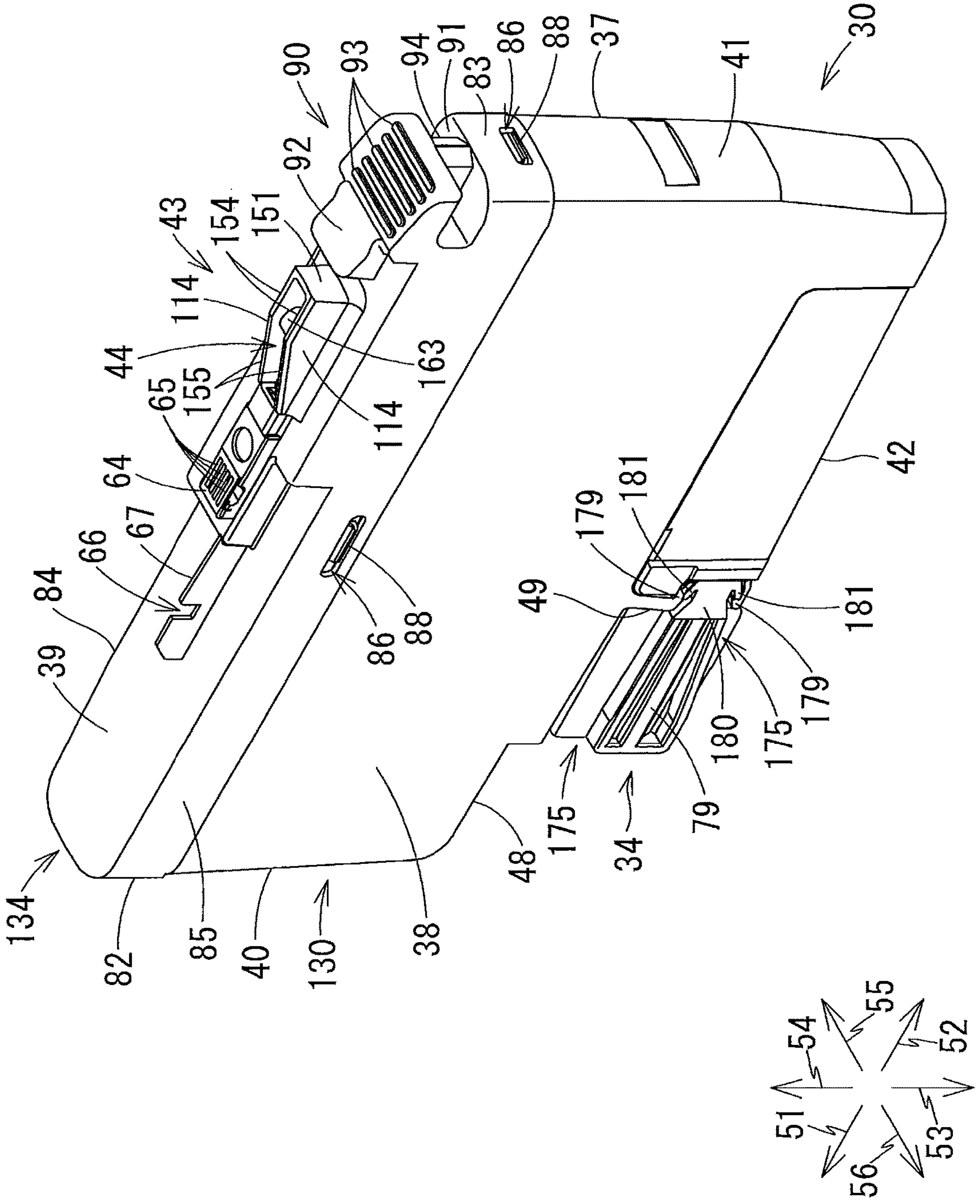
FIG. 5 is a perspective view of the ink cartridge 30 according to the embodiment as viewed from a rear side thereof.
Figure 6:
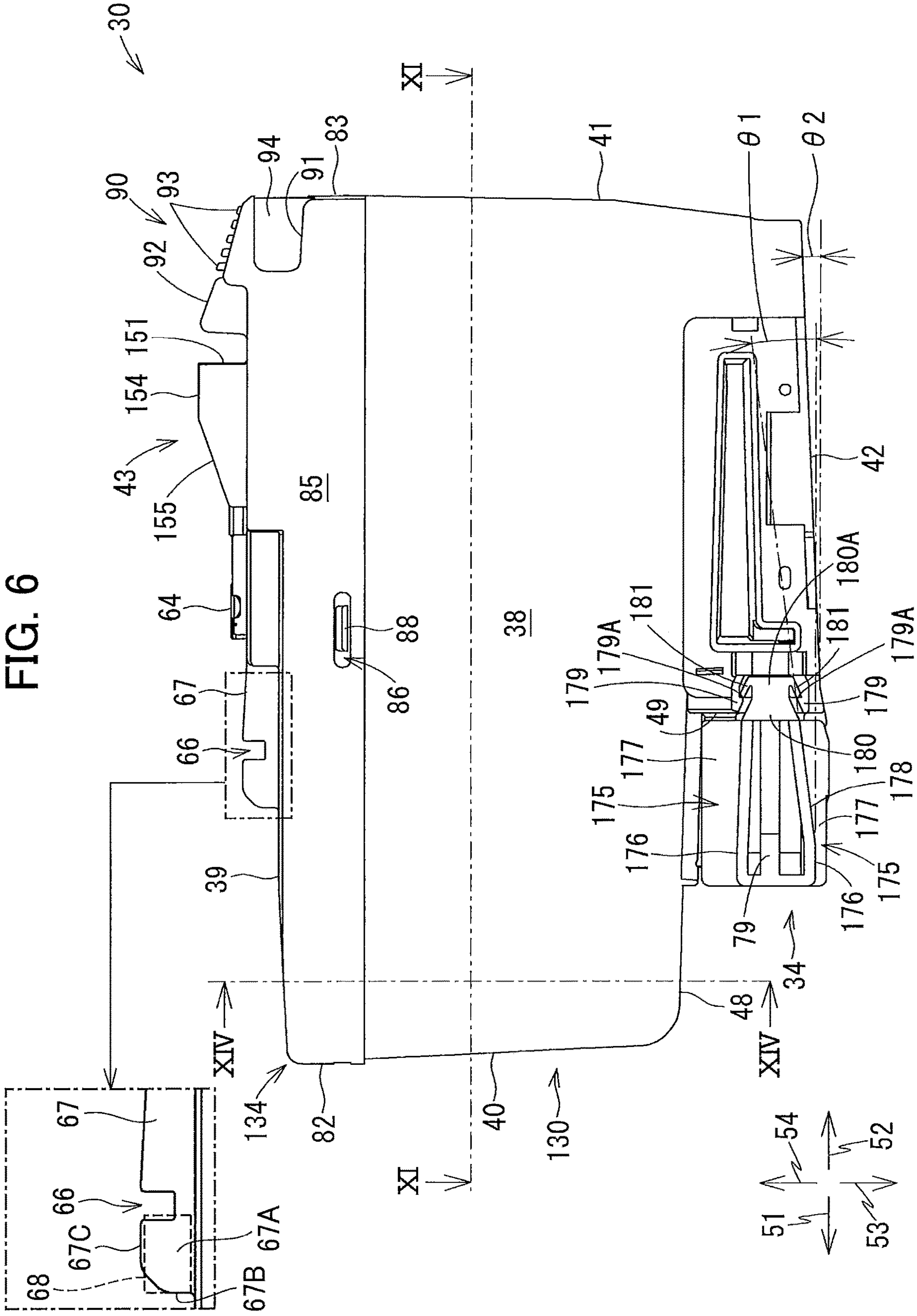
FIG. 6 is a left side view of the ink cartridge 30 according to the embodiment.

The posture of the ink cartridge 30 illustrated in FIGS. 4 to 6 is a posture of the ink cartridge 30 when the ink cartridge 30 is in the operational posture, that is, a posture of the ink cartridge 30 in a state where the ink cartridge 30 is capable of being used in the printer 10. The posture of the ink cartridge 30 illustrated in FIGS. 4 to 6 is also referred to as the "upright posture." The ink cartridge 30 includes a front wall 40, 82, a rear wall 41, 83, a top wall 39, a bottom wall 42, 48, a right side wall 37, 84, and a left side wall 38, 85.

Figure 11:
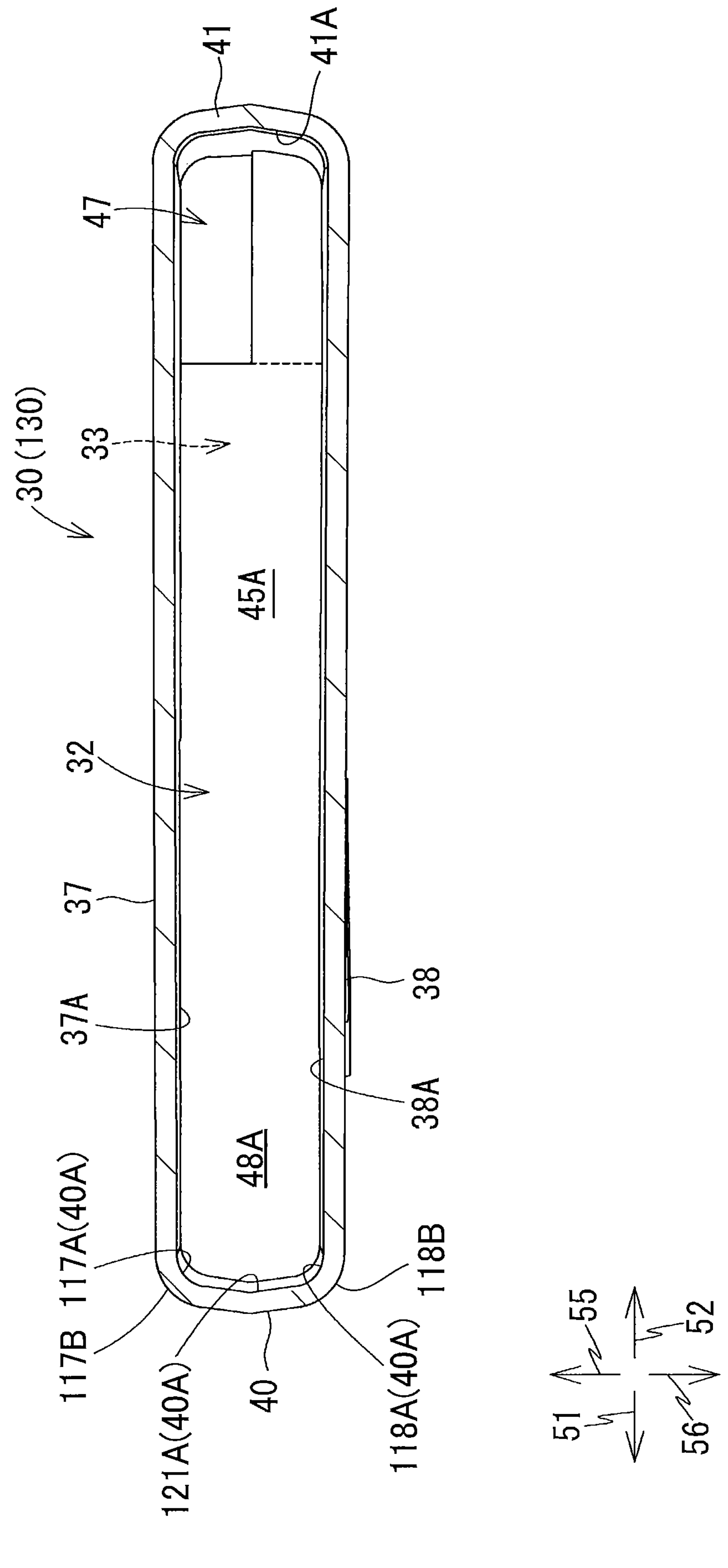
FIG. 11 is a cross-sectional view of the ink cartridge 30 according to the embodiment taken along a line XI-XI in FIG. 6.

In the operational posture of the ink cartridge 30, the front wall 40, 82 faces frontward. In the embodiment, as illustrated in FIG. 11, the front wall 40 includes an inner curved surface 117A and an outer curved surface 117B opposite to the inner curved surface 117A, and an inner curved surface 118A and an outer curved surface 118B opposite to the inner curved surface 118A.

In the operational posture of the ink cartridge 30, the rear wall 41, 83 faces rearward. In the operational posture of the ink cartridge 30, the top wall 39 faces upward. Further, in the operational posture of the ink cartridge 30, a front end of the top wall 39 is connected to an upper end of the front wall 82 and a rear end of the top wall 39 is connected to an upper end of the rear wall 83. That is, the top wall 39 extends in the front-rear direction between the front wall 40, 82 of the ink cartridge 30 and the rear wall 41, 83 of the ink cartridge 30.

Figure 10:
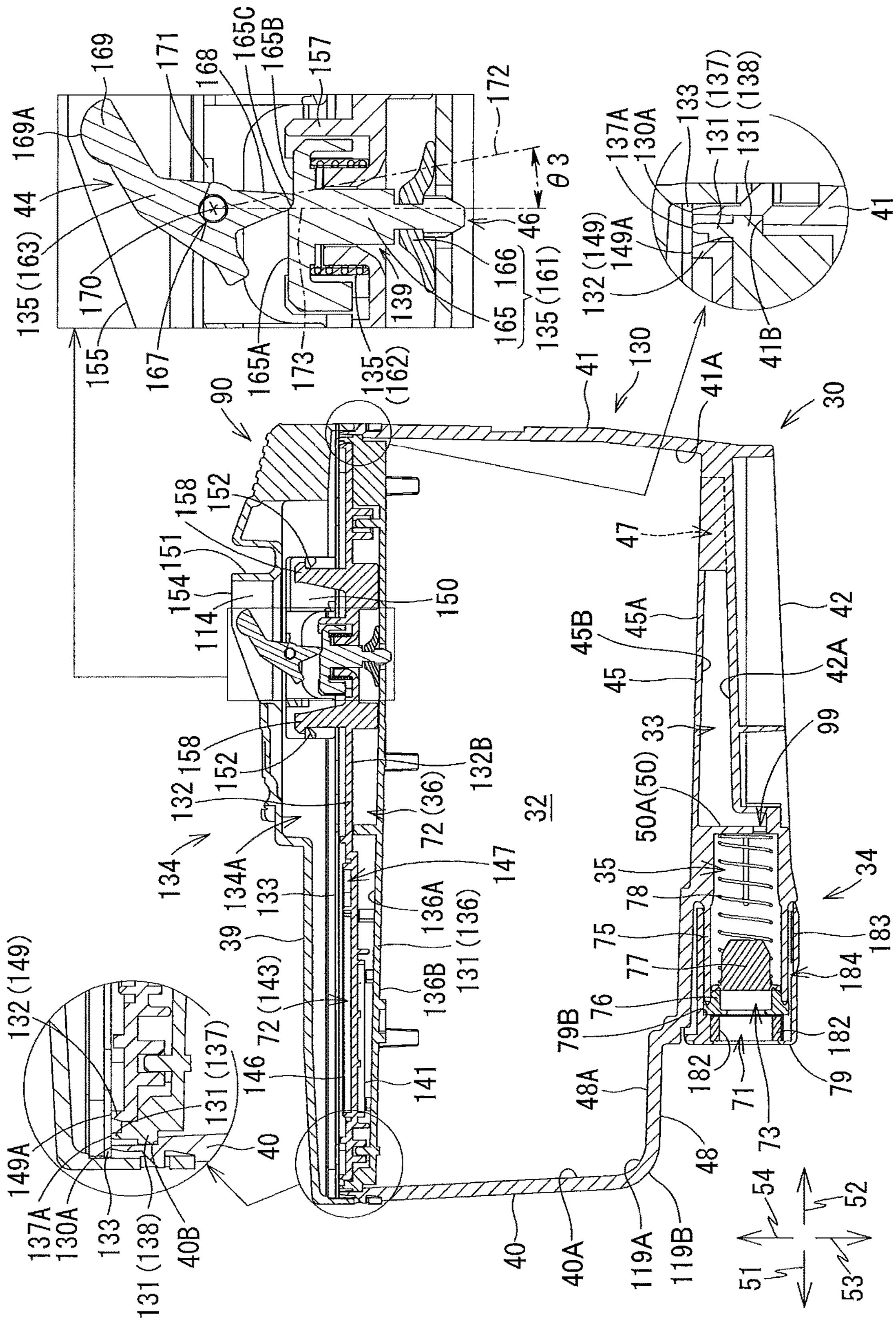
FIG. 10 is a vertical cross-sectional view of the ink cartridge 30 according to the embodiment.
Figure 14:
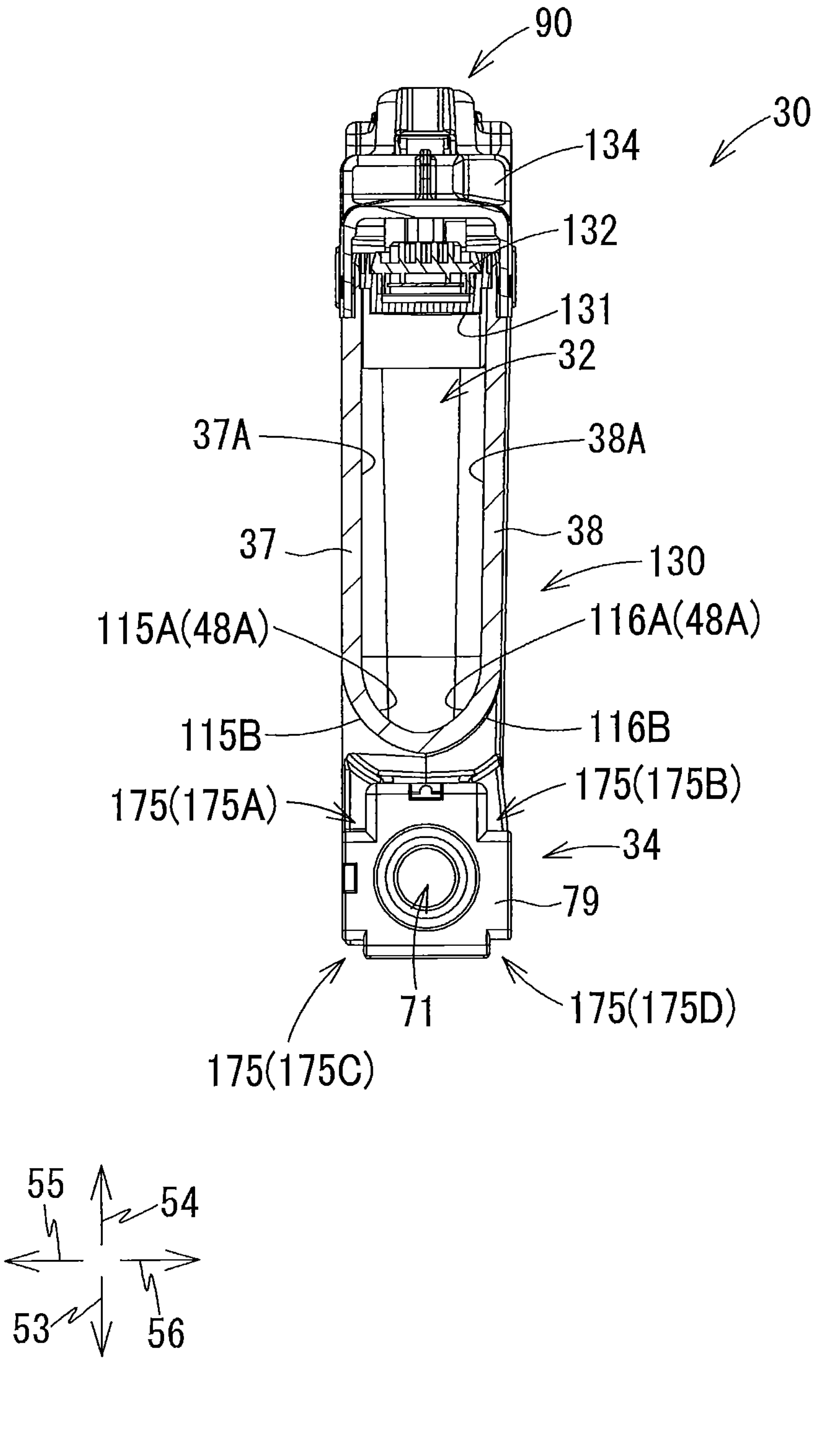
FIG. 14 is a cross-sectional view of the ink cartridge 30 according to the embodiment taken along a line XIV-XIV in FIG. 6.

In the operational posture of the ink cartridge 30, the bottom wall 42, 48 faces downward. The bottom wall 42, 48 extends in the front-rear direction between the front wall 40 and the rear wall 41. In the embodiment, the bottom wall 42, 48 includes the main bottom wall portion 42 and a subordinate bottom wall portion 48. A connecting wall 49 connects the main bottom wall portion 42 to the subordinate bottom wall 48. In the operational posture, the connecting wall 49 faces frontward. In the operational posture of the ink cartridge 30, a front end of the bottom wall 42, 48 (i.e. a front end of the subordinate bottom wall portion 48) is connected to a lower end of the front wall 40. A rear end of the bottom wall 42, 48 (i.e. a rear end of the main bottom wall portion 42) is connected to a lower end of the rear wall 41. The main bottom wall portion 42 connects the lower end of the rear wall 41 to a lower end of the connecting wall 49. The subordinate bottom wall portion 48 connects the lower end of the front wall 40 to an upper end of the connecting wall 49. In the embodiment, as illustrated in FIGS. 10 and 14, the subordinate bottom wall portion 48 includes an inner curved surface 115A and an outer curved surface 115B opposite to the inner curved surface 115A, an inner curved surface 116A and an outer curved surface 116B opposite to the inner curved surface 116A, and an inner curved surface 119A and an outer curved surface 119B opposite to the inner curved surface 119A.

When the ink cartridge 30 is in the operational posture, the right side wall 37, 84 faces rightward. Further, when the ink cartridge 30 is in the operational posture, the left side wall 38, 85 faces leftward.

When the ink cartridge 30 is in the operational posture, a direction from the rear wall 41 toward the front wall 40 coincides with the frontward direction 51, and a direction from the front wall 40 toward the rear wall 41 coincides with the rearward direction 52. Further, when the ink cartridge 30 is in the operational posture, a direction from the top wall 39 toward the bottom wall 42, 48 coincides with the downward direction 53 (i.e., the gravitational direction), and a direction from the bottom wall 42, 48 toward the top wall 39 coincides with the upward direction 54. Still further, when the ink cartridge 30 is in the operational posture, a direction from the left side wall 38 toward the right side wall 37 coincides with the rightward direction 55, and a direction from the right side wall 37 toward the left side wall 38 coincides with the leftward direction 56. When the ink cartridge 30 is in the operational posture, the frontward direction 51, the rearward direction 52, and the front-rear direction coincide a longitudinal direction of the ink cartridge 30; the downward direction 53, the upward direction 54, and the up-down direction coincide a heightwise direction of the ink cartridge 30; and the rightward direction 55, the leftward direction 56, and the left-right direction coincide a widthwise direction of the ink cartridge 30.

Moreover, when the ink cartridge 30 is attached to the cartridge attachment section 110, an outer surface (i.e. front surface) of the front wall 40, 82 faces frontward, an outer surface (i.e. rear surface) of the rear wall 41, 83 faces rearward, an outer surface (i.e. bottom surface) of the bottom wall 42, 48 faces downward, an outer surface (i.e. top surface) of the top wall 39 faces upward, an outer surface (i.e. right surface) of the right side wall 37, 84 faces rightward, and an outer surface (i.e. left surface) of the left side wall 38, 85 faces leftward.

As illustrated in FIGS. 4 to 6, the ink cartridge 30 has a generally flattened rectangular parallelepiped shape so that a dimension of the ink cartridge 30 in the left-right direction is small, and a dimension of the ink cartridge 30 in the up-down direction and a dimension of the ink cartridge 30 in the front-rear direction are greater than the dimension of the ink cartridge 30 in the left-right direction.

Figure 7:
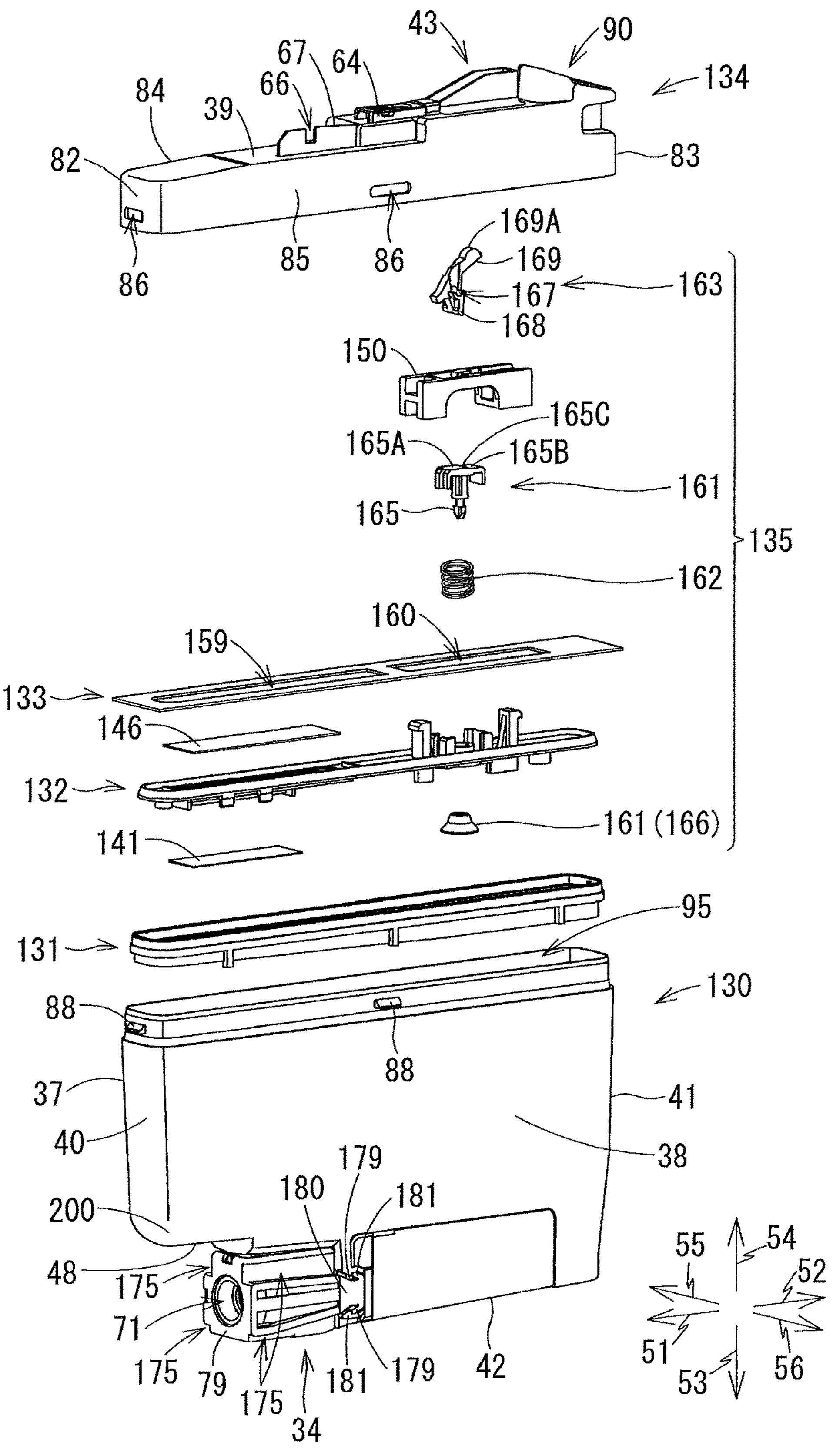
FIG. 7 is an exploded perspective view of the ink cartridge 30 according to the embodiment.

As illustrated in FIG. 7, the ink cartridge 30 includes the cartridge casing 130, a first inner lid 131, a second inner lid 132, a semipermeable membrane 141, a film 133, a film 146, an outer lid 134, a valve mechanism 135, a support member 150, and the ink supply portion 34.

<Cartridge Casing 130>

As illustrated in FIG. 7, the cartridge casing 130 has a generally box-like shape opening upward. That is, the cartridge casing 130 has an opening 95 at its top end. In the embodiment, the cartridge casing 130 is a container formed of resin. As illustrated in FIG. 10, a first storage chamber 32 and a second storage chamber 33 are formed inside the cartridge casing 130.

As illustrated in FIGS. 4 to 7, the cartridge casing 130 includes the front wall 40, the rear wall 41, the right side wall 37, the left side wall 38, the main bottom wall portion 42, the subordinate bottom wall portion 48, and the connecting wall 49. The front wall 40, the rear wall 41, the right side wall 37, the left side wall 38, the main bottom wall portion 42, the subordinate bottom wall 48, and the connecting wall 49 constitute outer walls of the cartridge casing 130. The rear wall 41 is spaced away from the front wall 40 in the front-rear direction. The left side wall 38 faces the right side wall 37 in the left-right direction. A gap distance between the front wall 40 and the rear wall 41 is greater than a gap distance between the right side wall 37 and the left side wall 38. The front wall 40, the rear wall 41, the right side wall 37, the left side wall 38, the subordinate bottom wall portion 48, and an inner bottom wall portion 45 (FIG. 10, described later) define a first storage chamber 32.

The connecting wall 49 and the front wall 40 constitute the front wall of the cartridge casing 130.

In the operational posture of the ink cartridge 30, the front surface of the front wall 40 is a surface of the cartridge casing 130 facing frontward, while the rear surface of the rear wall 41 is a surface of the cartridge casing 130 facing rearward. The front surface of the connecting wall 49 is also a surface of the cartridge casing 130 facing frontward. The right side wall 37 and the left side wall 38 respectively extend in a direction that crosses the front wall 40 and the rear wall 41. The right side wall 37 connects the front wall 40, the rear wall 41, the main bottom wall portion 42, the subordinate bottom wall portion 48, and the connecting wall 49. Likewise, the left side wall 38 connects the front wall 40, the rear wall 41, the main bottom wall portion 42, the subordinate bottom wall portion 48, and the connecting wall 49. In the operational posture of the ink cartridge 30, the outer surface of the right side wall 37 faces rightward while the outer surface of the left side wall 38 faces leftward.

Of the outer walls of the cartridge casing 130, at least the front wall 40, the rear wall 41, the right side wall 37 and the left side wall 38 are formed of a light transmissive material allowing visual recognition of the ink stored in the first storage chamber 32 and the second storage chamber 33 from an outside of the cartridge casing 130. For example, at least the front wall 40, the rear wall 41, the right side wall 37 and the left side wall 38 are made of resin, such as acrylonitrile-butadiene-styrene resin, polypropylene, or the like, substantially without containing colorant. More specifically, through at least the front wall 40, the rear wall 41, the right side wall 37, and the left side wall 38, the color of the ink stored in the first storage chamber 32, the color of the ink stored in the second storage chamber 33, and the surface level of the ink stored in the first storage chamber 32 can be visually recognized. When no or little ink remains in the first storage chamber 32, an upper surface 45A (FIG. 10) of the inner bottom wall portion 45 (described later) can be visually recognized from an outside of the ink cartridge 30 through the front wall 40, the rear wall 41, the right side wall 37, and the left side wall 38. The main bottom wall portion 42 and the subordinate bottom wall portion 48 may also be formed of a light transmissive material. In other words, the cartridge casing 130 may be made of transparent or semi-transparent resin. In the embodiment, two storage chambers, that is, the first storage chamber 32 and the second storage chamber 33, constitute a liquid storage chamber of the ink cartridge 30. Instead, the ink cartridge 30 may have a liquid storage chamber constituted by one storage chamber. In this case, the inner bottom wall portion 45 may be dispensed with.

The right side wall 37 and the left side wall 38 extend in the up-down direction and the front-rear direction. As illustrated in FIG. 14, the right side wall 37 slopes relative to the up-down direction so that its lower end is positioned further leftward than its upper end. Accordingly, an inner surface 37A of the right side wall 37 also slopes relative to the up-down direction so that its lower end is positioned further leftward than its upper end. The left side wall 38 slopes relative to the up-down direction so that its lower end is positioned further rightward than its upper end. Accordingly, an inner surface 38A of the left side wall 38 also slopes relative to the up-down direction so that its lower end is positioned further rightward than its upper end. Hence, a gap distance in the left-right direction between the inner surface 37A and the inner surface 38A is gradually decreased in the downward direction 53. In other words, a gap distance in the left-right direction between the inner surface 37A of the right side wall 37 and the inner surface 38A of the left side wall 38 at their lower ends is smaller than a gap distance in the left-right direction between the inner surface 37A of the right side wall 37 and the inner surface 38A of the left side wall 38 at their upper ends. As long as the inner surface 37A and the inner surface 38A slopes relative to the up-down direction, the right side wall 37 and the left side wall 38 may not be sloped and extend in the up-down direction. Alternatively, the right side wall 37, the left side wall 38, the inner surface 37A, and the inner surface 38A need not slope relative to the up-down direction.

As illustrated in FIG. 6, the main bottom wall portion 42 slopes relative to the front-rear direction. Specifically, a bottom surface of the main bottom wall portion 42 is a sloped surface that slopes relative to the front-rear direction so that its rear end is positioned further upward than its front end. The front end of the main bottom wall portion 42 is positioned frontward relative to the lock surface 151 (described later). The rear end of the main bottom wall portion 42 is connected to the lower end of the rear wall 41. That is, the main bottom wall portion 42 extends frontward from the lower end of the rear wall 41. The subordinate bottom wall portion 48 is positioned upward and frontward relative to the main bottom wall portion 42.

As illustrated in FIGS. 4 to 7, an upper end portion of each of the front wall 40, the rear wall 41, the right side wall 37 and the left side wall 38 has an engagement claw 88 protruding outward from the cartridge casing 130. Each engagement claw 88 is engageable with an opening 86 formed in the outer lid 134. In the embodiment, each of the engagement claws 88 is provided at each of the front wall 40, the rear wall 41, the right side wall 37, and the left side wall 38. That is, one engagement claw 88 is provided at each of the front wall 40, the rear wall 41, the right side wall 37, and the left side wall 38. However, more than one engagement claw 88 may be provided at each of the front wall 40, the rear wall 41, the right side wall 37, and the left side wall 38.

<First Inner Lid 131>

Figure 8B:
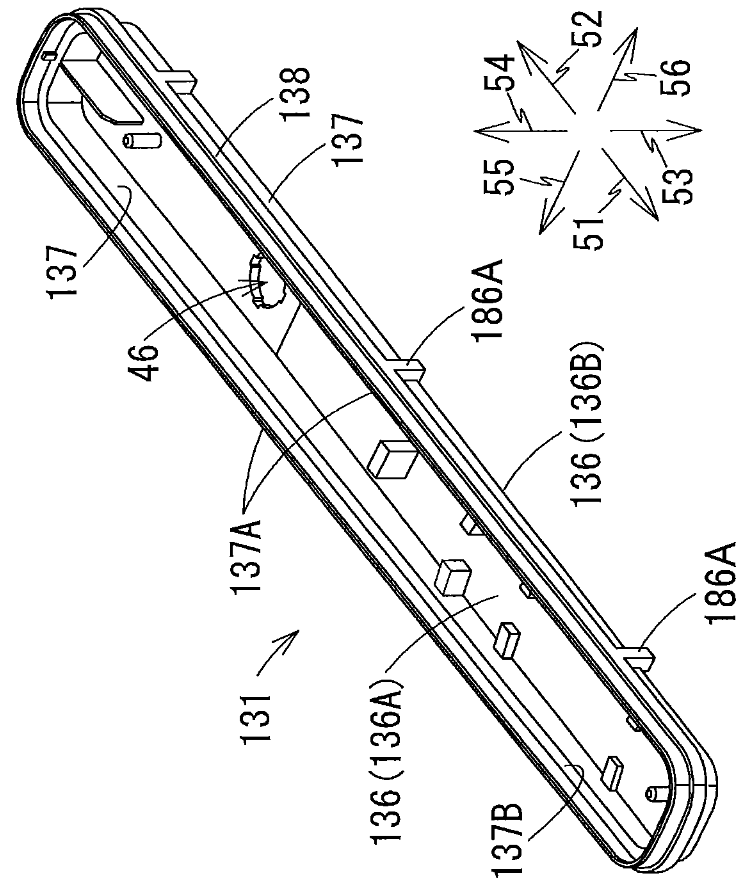
FIG. 8B is a perspective view of the first inner lid 131 as viewed from a top side thereof.
Figure 8A:
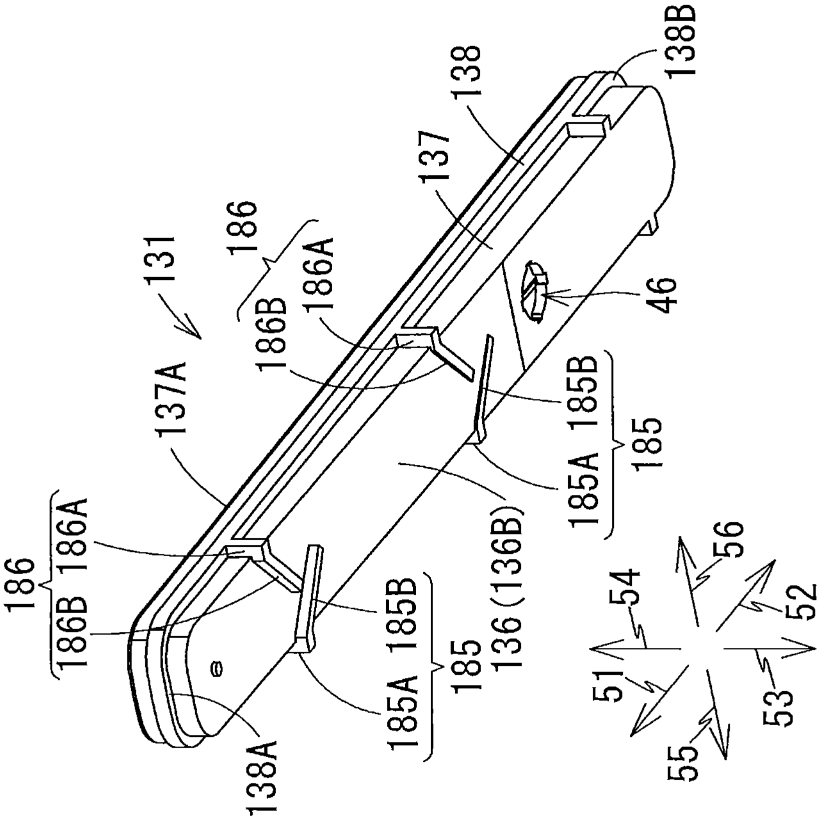
FIG. 8A is a perspective view of a first inner lid 131 of the ink cartridge 30 according to the embodiment as viewed from a bottom side thereof.

The first inner lid 131 illustrated in FIGS. 8A and 8B is adapted to close the opening 95 formed in the top end of the cartridge casing 130. As illustrated in FIGS. 8A and 8B, the first inner lid 131 has a generally box-like shape, opening upward. The first inner lid 131 includes a bottom wall 136, a peripheral wall 137 upstanding from a peripheral edge of the bottom wall 136, and a flange wall 138 protruding outward from an outer peripheral surface of the peripheral wall 137.

The bottom wall 136 has a through-hole 46 penetrating the thickness of the bottom wall 136 in the up-down direction. As illustrated in FIG. 10, the through-hole 46 is formed at a position rearward relative to a front-rear center in an air chamber 36 of an air communication passage 72 (described later). An upper surface 136A of the bottom wall 136 slopes downward toward the through-hole 46.

The through-hole 46 need not be formed at the position specified in FIGS. 3 and 10. The through-hole 46 may be formed at a position frontward relative to the front-rear center in the air chamber 36. Further, the upper surface 136A need not be sloped as described above.

As illustrated in FIG. 10, the first inner lid 131 is attached to the cartridge casing 130 through the opening 95 formed at the top end of the cartridge casing 130 from above and is disposed in an interior space of the cartridge casing 130. The first inner lid 131 is supported by the cartridge casing 130 in the interior space of the cartridge casing 130. More specifically, in a state where the first inner lid 131 is disposed in the interior space of the cartridge casing 130, a lower surface 138A of the flange wall 138 at a front end portion of the first inner lid 131 is supported by a stepped surface 40B of the front wall 40 of the cartridge casing 130. The stepped surface 40B is formed at an upper end portion of an inner surface (i.e. rear surface) of the front wall 40. Further, a lower surface 138B of the flange wall 138 at a rear end portion of the first inner lid 131 is supported by a stepped surface 41B of the rear wall 41 of the cartridge casing 130. The stepped surface 41B is formed at an upper end portion of an inner surface (i.e. front surface) of the rear wall 41. In a state where the first inner lid 131 is supported to the cartridge casing 130, a top end face 137A of the peripheral wall 137 of the first inner lid 131 and a top end face 130A of the cartridge casing 130 are positioned on the same imaginary plane that expands in the front-rear direction and the left-right direction.

As illustrated in FIGS. 8A and 8B, the first inner lid 131 further includes two first ribs 185 and two second ribs 186. The first ribs 185 and the second ribs 186 are formed at a lower surface 136B of the bottom wall 136. In other words, two sets of the first rib 185 and the second ribs 186 are provided at the lower surface 136B. The first ribs 185 and the second ribs 186 serve as guides when attaching the first inner lid 131 to the cartridge casing 130. Further, the first ribs 185 and the second ribs 186 provide rigidity to the cartridge casing 130 when the first inner lid 131 is attached to the cartridge casing 130.

The first ribs 185 and the second ribs 186 protrude downward from the lower surface 136B. The first ribs 185 and the second ribs 186 each have a protruding length from the lower surface 136B the same as one another. In other words, each of the two first ribs 185 and the two second ribs 186 has a lower end at a position the same as one another with respect to the up-down direction.

The first ribs 185 and the second ribs 186 extend along the lower surface 136B. The two first ribs 185 are arranged spaced apart from each other in the front-rear direction. The two second ribs 186 are arranged spaced apart from each other in the front-rear direction. The first ribs 185 and the second ribs 186 are positioned frontward relative to the through-hole 46. Each of the first ribs 185 and corresponding one of the second ribs 186 are arranged opposite to each other and spaced apart from each other in the left-right direction. A gap formed between the first rib 185 and the corresponding second rib 186 can facilitate flow of ink when filling the ink cartridge 30 with the ink.

Each of the first ribs 185 has an extending portion 185A and an inclining portion 185B. Similarly, each of the second ribs 186 has an extending portion 186A and an inclining portion 186B.

In a state where the first inner lid 131 is supported to the cartridge casing 130, the extending portion 185A of each first rib 185 is in contact with the inner surface 37A of the right side wall 37 while the extending portion 186A of each second rib 186 is in contact with the inner surface 38A of the left side wall 38. Each extending portion 185A extends leftward from its base end that contacts the inner surface 37A of the right side wall 37. Each extending portion 186A extends rightward from its base end that contacts the inner surface 38A of the left side wall 38.

The inclining portion 185B extends from a distal end (i.e. left end) of the extending portion 185A and inclines relative to the front-rear direction so that a left end of the inclining portion 185B is positioned further rearward than a right end of the inclining portion 185B. The inclining portion 186B extends from a distal end (i.e. right end) of the extending portion 186A and inclines relative to the front-rear direction so that a right end of the inclining portion 186B is positioned further rearward than a left end of the inclining portion 186B. That is, the inclining portion 185B extends toward the through-hole 46 from the extending portion 185A and inclines relative to the front-rear direction so that a distal end of the inclining portion 185B farthest from the extending portion 185A is positioned closer to the through-hole 46 in the left-right direction than a base end of the inclining portion 185B connected to the extending portion 185A to the through-hole 46. Similarly, the inclining portion 186B extends toward the through-hole 46 from the extending portion 186A and inclines relative to the front-rear direction so that a distal end of the inclining portion 186B farthest from the extending portion 186A is positioned closer to the through-hole 46 in the left-right direction than a base end of the inclining portion 186B connected to the extending portion 186A.

The distal end (i.e. rear end) of the inclining portion 185B of one of the first ribs 185 is positioned further rearward than the distal end (i.e. rear end) of the inclining portion 186B of corresponding one of the second ribs 186 that opposes the one of the first ribs 185 in the left-right direction. Likewise, the distal end (i.e. rear end) of the inclining portion 185B of the other of the first ribs 185 is positioned further rearward than the distal end (i.e. rear end) of the inclining portion 186B of corresponding one of the second ribs 186 that opposes the other of the first ribs 185 in the left-right direction. Hence, the distal end of the inclining portion 185B of each first rib 185 is positioned closer to the through-hole 46 than the distal end of the inclining portion 186B of the corresponding second rib 186.

Incidentally, neither the number of the first ribs 185 nor the number of the second ribs 186 is limited to two. Further, the first ribs 185 and the second ribs 186 may be formed rearward relative to the through-hole 46. Still further, the distal end of the inclining portion 186B of the second rib 186 may be positioned rearward relative to the distal end of the inclining portion 185B of the corresponding first rib 185.

<Second Inner Lid 132>

Figures 9A, 9B, 9C:
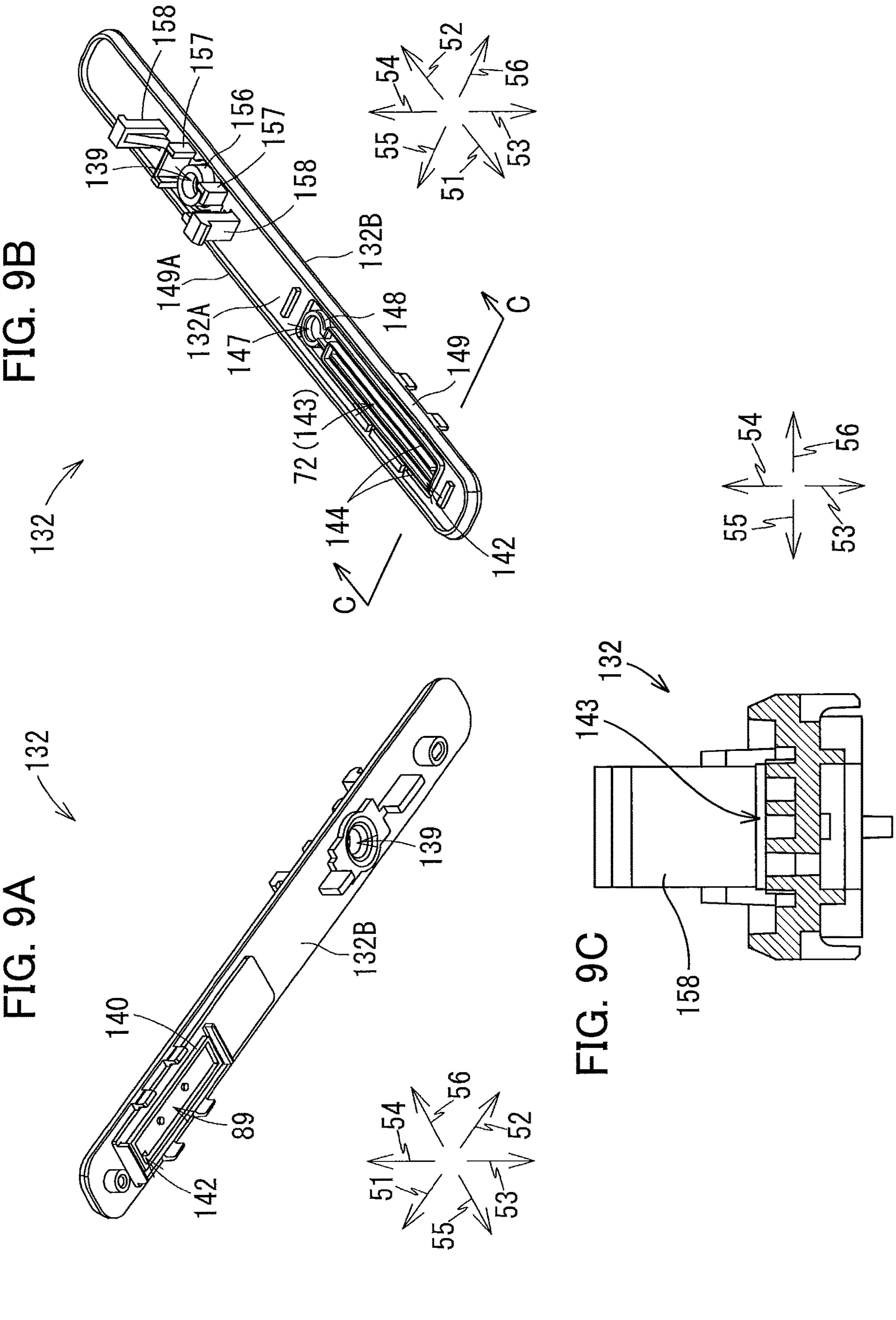
FIG. 9A is a perspective view of a second inner lid 132 of the ink cartridge 30 according to the embodiment as viewed from a bottom side thereof.
FIG. 9B is a perspective view of the second inner lid 132 as viewed from a top side thereof.
FIG. 9C is a cross-sectional view of a labyrinth path 143 formed in the second inner lid 132 taken along a line C-C in FIG. 9B.

As illustrated in FIGS. 9A and 9B, the second inner lid 132 has a plate-like shape.

The second inner lid 132 is attached to the first inner lid 131 from above through a top opening of the first inner lid 131 and is disposed in an interior space of the first inner lid 131 defined by the bottom wall 136 and the peripheral wall 137. The second inner lid 132 is supported by the first inner lid 131 in the interior space of the first inner lid 131. Specifically, in a state where the second inner lid 132 is disposed in the interior space of the first inner lid 131, a lower surface 132B of the second inner lid 132 is in contact with a stepped surface 137B (see FIG. 8B) of the peripheral wall 137 of the first inner lid 131. The stepped surface 137B is formed at an inner peripheral surface of the peripheral wall 137 and faces upward. Accordingly, the lower surface 132B contacts the stepped surface 137B from above.

The second inner lid 132 is provided with a rib 149 at its upper surface 132A. The rib 149 protrudes upward from a peripheral edge portion of the upper surface 132A. As illustrated in FIG. 10, the second inner lid 132 is supported by the first inner lid 131, and the first inner lid 131 is supported by the cartridge casing 130. In this state, a top end face 149A of the rib 149 of the second inner lid 132, the top end face 137A of the peripheral wall 137 of the first inner lid 131, the top end face 130A of the cartridge casing 130 are positioned on the same imaginary plane that expands in the front-rear direction and in the left-right direction.

As illustrated in FIG. 9, the second inner lid 132 has a through-hole 139. In a state where the second inner lid 132 is supported to the first inner lid 131, the through-hole 139 opposes the through-hole 46 of the first inner lid 131 in the up-down direction and is positioned above the through-hole 46. In other words, in a state where the second inner lid 132 is supported to the first inner lid 131, the through-hole 139 is positioned in alignment with the through-hole 46 with respect to the up-down direction.

The second inner lid 132 further includes a rib 140 at the lower surface 132B. The rib 140 protrudes downward from the lower surface 132B. The rib 140 is positioned frontward relative to the through-hole 139. The rib 140 has a rectangular frame-like shape when the second inner lid 132 is viewed from a bottom side thereof. The shape of the rib 140 is not limited to a rectangular frame-like shape, provided that the rib 140 has an enclosed shape when the second inner lid 132 is viewed from a bottom side thereof. For example, the rib 140 may have a circular shape when the second inner lid 132 is viewed from a bottom side thereof.

The semipermeable membrane 141 (see FIG. 7) is welded or melt-bonded to a lower end surface of the rib 140. The semipermeable membrane 141 is a porous film having minute holes blocking the passage of ink but allowing the passage of air. The semipermeable membrane 141 is made of fluorine resin such as polytetrafluoro ethylene, polychlorotrifluoro ethylene, tetrafuloroethylene-hexafluoropropylene copolymer, tetrafuloroethylene-perfluoroalkyl vinyl ethyl copolymer, or tetrafluoroethylene-ethylene copolymer.

Since the semipermeable membrane 141 is welded to the lower end surface of the rib 140, the rib 140, the lower surface 132B of the second inner lid 132, and the semipermeable membrane 141 define a space 89.

The second inner lid 132 also has a through-hole 142. The through-hole 142 has one open end (i.e. lower open end) formed in the lower surface 132B at a position inside the rib 140 when the second inner lid 132 is viewed from a bottom side thereof. In other words, the through-hole 142 is formed in the second inner lid 132 such that the one open end of the through-hole 142 is positioned in a portion of the lower surface 132B providing the space 89. That is, the through-hole 142 is in communication with the space 89. Hence, the through-hole 142 and the semipermeable membrane 141 oppose each other in the up-down direction, with the space 89 interposed therebetween in the up-down direction. The through-hole 142 is formed at a position frontward relative to the front-rear center of the air chamber 36 of the air communication passage 72. The through-hole 142 is positioned at a right-front end portion in a region surrounded by the rib 140.

Incidentally, the through-hole 142 need not be formed at the position specified in FIG. 9. For example, the through-hole 142 may be formed at a position rearward relative to the front-rear center of the air chamber 36. Alternatively, the through-hole 142 may be positioned at a left-front end portion or a rear end portion in the region surrounded by the rib 140.

The second inner lid 132 also has a labyrinth path 143 at the upper surface 132A, as illustrated in FIGS. 9B and 9C. The labyrinth path 143 is defined by the upper surface 132A, a plurality of ribs 144 provided at the upper surface 132A, and the film 146 (see FIG. 7) welded to upper end faces of the ribs 144.

The plurality of ribs 144 extends in the front-rear direction and is juxtaposed with each other in the left-right direction. Hence, the labyrinth path 143 is a continuous passage that extends from the right to the left, repeatedly U-turning in the front-rear direction. The labyrinth path 143 may not have the shape as illustrated in FIG. 9B. For example, the labyrinth path 143 may be a continuous passage that extends in the front-rear direction, repeatedly U-turning in the left-right direction.

The labyrinth path 143 has one end that is in communication with the through-hole 142 and the other end that is in communication with a communication hole 147.

The communication hole 147 is a circular hole that opens upward. The communication hole 147 is defined by the upper surface 132A and a rib 148. The rib 148 has a hollow cylindrical shape and protrudes upward from the upper surface 132A. The rib 148 is connected to the ribs 144. Hence, the rib 148 is connected to the labyrinth path 143. In other words, the communication hole 147 is in communication with the labyrinth path 143. The film 133 and the film 146 are formed of a material that is impermeable to liquid and air. Neither the film 146 nor the film 133 (see FIG. 7) is welded to an upper end face of the rib 148. The communication hole 147 thus opens upward and in communication with the atmosphere. The communication hole 147 constitutes an end of the air communication passage 72.

The communication hole 147 has an area when the communication hole 147 is viewed from above. This area of the communication hole 147 is greater than a cross-sectional area of the labyrinth path 143 taken along a plane perpendicular to an air flowing direction, that is, a cross-sectional area of the labyrinth path 143 taken along a plane perpendicular to the front-rear direction illustrated in FIG. 9C. In the embodiment, the area of the communication hole 147 is in a range from 3.1 square millimeters to 23.7 square millimeters while the cross-sectional arear of the labyrinth path 143 is in a range from 0.8 square millimeters to 1.0 square millimeter, for example.

Incidentally, the communication hole 147 is not limited to a circular hole. Further, the communication hole 147 may face in any directions other than the upward direction 54.

Further, the second inner lid 132 has a rib 156, a pair of ribs 157, and a pair of ribs 158 at the upper surface 132A around the through-hole 139.

The rib 156 protrudes from the upper surface 132A along a peripheral edge of the through-hole 139. The rib 156 has a hollow cylindrical shape. The rib 156 is adapted to fix the position of a rod 165 of a valve body 161 of the valve mechanism 135 (see FIGS. 7 and 10) inserted into the through-hole 139 with respect to the left-right direction and the front-rear direction.

The pair of ribs 157 is provided so that the rib 156 is interposed between the ribs 157 in the front-rear direction. Each rib 157 is U-shaped, with an opening of the "U" shape facing the rib 156 when viewed from above. The ribs 157 are adapted to fix the position of the rod 165 of the valve body 161 of the valve mechanism 135 (see FIG. 7) with respect to the left-right direction and the front-rear direction.

The pair of ribs 158 is provided so that the rib 156 and the ribs 157 are interposed between the ribs 158 in the front-rear direction. Each rib 158 is bent at its distal end. The bent portion of each rib 158 at the distal end is capable of engaging with an engagement portion 152 of the support member 150 (see FIG. 10).

<Film 133>

As illustrated in FIG. 7, the film 133 has a rectangular shape. As illustrated in FIG. 10, the film 133 is welded to the top end face 130A of the cartridge casing 130, the top end face 137A of the peripheral wall 137 of the first inner lid 131, and the top end face 149A of the rib 149 of the second inner lid 132. The film 133 does not necessarily have a rectangular shape. The film 133 may have any shape other than a rectangular shape provided that the film 133 can be welded to the top end face 130A, the top end face 137A, and the top end face 149A as described above.

As illustrated in FIG. 7, the film 133 has an opening 159 and an opening 160. The opening 159 is formed at a position corresponding to the rib 144 in a state where the film 133 is welded to the top end face 130A, the top end face 137A, and the top end face 149A. Hence, the film 146 welded to the rib 144 is exposed to an outside through the opening 159 in a state where the film 133 is welded to the top end face 130A, the top end face 137A, and the top end face 149A. The opening 160 is formed at a position corresponding to the rib 156, the ribs 157, the ribs 158 and the valve mechanism 135 in a state where the film 133 is welded to the top end face 130A, the top end face 137A, and the top end face 149A. Hence, the rib 156, the ribs 157, the ribs 158, and the valve mechanism 135 are exposed to an outside through the opening 160 in a state where the film 133 is welded to the top end face 130A, the top end face 137A, and the top end face 149A.

<Outer Lid 134>

As illustrated in FIG. 7, the outer lid 134 has a generally box-like shape opening downward. The outer lid 134 includes the top wall 39, the front wall 82, the rear wall 83, the right side wall 84, and the left side wall 85. The front wall 82 extends downward from the front end of the top wall 39. The front wall 82 has a lower end connected to the front wall 40 of the cartridge casing 130. The front wall 82 of the outer lid 134 and the front wall 40 and the connecting wall 49 of the cartridge casing 130 constitute the front wall of the ink cartridge 30. The rear wall 83 extends downward from the rear end of the top wall 39. The rear wall 83 has a lower end connected to the rear wall 41 of the cartridge casing 130. The rear wall 83 of the outer lid 134 and the rear wall 41 of the cartridge casing 130 constitute the rear wall of the ink cartridge 30. The right side wall 84 extends downward from a right end of the top wall 39 and connects the front wall 82 to the rear wall 83. The right side wall 84 has a lower end connected to the right side wall 37 of the cartridge casing 130. The right side wall 84 of the outer lid 134 and the right side wall 37 of the cartridge casing 130 constitute the right side wall of the ink cartridge 30. The left side wall 85 extends downward from a left end of the top wall 39 and connects the front wall 82 to the rear wall 83. The left side wall 85 has a lower end connected to the left side wall 38 of the cartridge casing 130. The left side wall 85 of the outer lid 134 and the left side wall 38 of the cartridge casing 130 constitute the left side wall of the ink cartridge 30.

Each of the front wall 82, the rear wall 83, the right side wall 84 and the left side wall 85 has the opening 86. The engagement claws 88 of the cartridge casing 130 can engage with the openings 86, respectively. By engaging the engagement claws 88 with the openings 86, the outer lid 134 covers the cartridge casing 130 from above. In the embodiment, the openings 86 are formed in the outer lid 134 while the engagement claws 88 are provided at the cartridge casing 130. However, the engagement claws 88 may be provided at the outer lid 134 while the openings 86 may be formed in the cartridge casing 130.

As illustrated in FIGS. 4 and 5, the top wall 39 has an opening 44 that extends in the front-rear direction. The opening 44 is formed at a position upward of the rib 156, the ribs 157 and the ribs 158 of the second inner lid 132.

The outer lid 134 includes the protruding portion 43 that protrudes upward from the top wall 39. The protruding portion 43 is provided on the top wall 39 so as to surround the opening 44 from right, left and rear sides thereof. The lock shaft 145 (FIG. 3) can access the protruding portion 43 from an outside.

As illustrated in FIG. 6, the protruding portion 43 has a rear end whose rear surface faces rearward. The rear surface of the protruding portion 43 serves as the lock surface 151. The lock surface 151 is positioned upward relative to the top surface of the top wall 39. The lock surface 151 extends in the up-down direction and in the left-right direction. In a state where the ink cartridge 30 is attached to the cartridge attachment section 110, the lock surface 151 facing rearward is in contact with the lock shaft 145. Since the lock surface 151 facing rearward abuts on the lock shaft 145, the ink cartridge 30 is held in the cartridge attachment section 110 against the urging force of the coil spring 78. Accessed components or members, such as the protruding portion 43, can be accessed from the outside of the ink cartridge 30 in a state where the ink cartridge 30 is attached to the cartridge attachment section 110.

As illustrated in FIGS. 4 and 5, the protruding portion 43 includes the pair of walls 114. The pair of walls 114 is positioned frontward of the lock surface 151, with the opening 44 interposed therebetween. Each of the walls 114 has an upper end surface including a horizontal surface 154 and a sloped surface 155. The horizontal surface 154 has a rear end continuous to the lock surface 151. The sloped surface 155 is positioned frontward relative to the horizontal surface 154. The sloped surface 155 is continuous to a front end of the horizontal surface 154. The sloped surface 155 faces upward and frontward. The sloped surface 155 slopes so that its front end is positioned further downward than its rear end. Since the horizontal surface 154 connects the lock surface 151 to the sloped surface 155, the lock surface 151 and the sloped surface 155 do not provide a ridge-like shape. Hence, during the insertion process of the ink cartridge 30 into the cartridge attachment section 110, the lock shaft 145 is smoothly guided by the sloped surface 155 and the horizontal surface 154 toward a position further rearward than the lock surface 151 while contacting the sloped surface 155 and the horizontal surface 154.

The outer lid 134 further includes an operation portion 90. The operation portion 90 is provided on the top wall 39 at a position rearward relative to the lock surface 151. The operation portion 90 may be manipulated by a user. The top wall 39 has a subordinate upper surface 91 at its rear end portion. The operation portion 90 is disposed above the subordinate upper surface 91 and spaced apart from the subordinate upper surface 91. The operation portion 90 has a generally flat plate-like shape. Specifically, the operation portion 90 protrudes upward from a boundary region between the subordinate upper surface 91 and a remaining upper surface of the top wall 39 to a height the same as the protruding portion 43. An upper end of the operation portion 90 is positioned further frontward than a lower end of the operation portion 90. As illustrated in FIGS. 5 and 6, a rib 94 is provided between the operation portion 90 and the subordinate upper surface 91. The rib 94 connects the operation portion 90 to the subordinate upper surface 91. The rib 94 extends rearward from the boundary region between the subordinate upper surface 91 and the remaining upper surface. The rib 94 has a dimension in the left-right direction smaller than a dimension in the left-right direction of the operation portion 90 and also smaller than a dimension in the left-right direction of the subordinate upper surface 91. The rib 94 can suppress deformation of a rear portion of the operation portion 90 in the up-down direction.

The operation portion 90 has a surface facing upward and rearward. This surface serves as an operation surface 92. A rear portion of the operation surface 92 and the subordinate upper surface 91 are positioned so as to overlap with each other in the front-rear direction. In other words, when the ink cartridge 30 is viewed from above, the rear portion of the operation surface 92 overlaps with the subordinate upper surface 91. On the operation surface 92, a plurality of projections, e.g., a plurality of projecting ribs 93, extending in the left-right direction is formed. The projecting ribs 93 are spaced apart from one another in the front-rear direction. The projecting ribs 93 as a plurality of projections allow the user to physically recognize the operation surface 92. The projecting ribs 93 can also serve to prevent the user's finger from slipping over the operation surface 92 when the user manipulates the operation surface 92. As described above, the accessed components or members can be accessed from the outside of the ink cartridge 30 in a state where the ink cartridge 30 is attached to the cartridge attachment section 110. However, the accessed components may be components to be accessed by the user for manipulating the same in a state where the ink cartridge 30 is attached to the cartridge attachment section 110.

The operation surface 92 can be visually recognized when the ink cartridge 30 is viewed from an upper side thereof. The operation surface 92 can also be visually recognized when the ink cartridge 30 is viewed from a rear side thereof. The user manipulates the operation surface 92 in order to remove the ink cartridge 30 attached to the cartridge attachment section 110 therefrom. Incidentally, in the embodiment, the operation portion 90 is formed integrally with the outer lid 134. Hence, the operation portion 90 is fixed to the outer lid 134 and immovable relative to the outer lid 134. Thus, the operation portion 90 does not pivotally move relative to the outer lid 134. Therefore, a force applied from the user to the operation surface 92 is directly transmitted to the outer lid 134 without changing a direction of the force.

The outer surface of each of the front wall 40, 82, the rear wall 41, 83, the top wall 39, the bottom wall 42, 48, the right side wall 37, 84, and the left side wall 38, 85 constituting the ink cartridge 30 need not be configured as one flat surface. That is, the front surface (i.e. the outer surface of the front wall) of the ink cartridge 30 can be any surface(s) that is visible when the ink cartridge 30 in its operational posture is viewed from its front side and that is positioned frontward relative to a front-rear center of the ink cartridge 30 in its operational state. Accordingly, a front surface of the connecting wall 49 may constitute a part of the front surface of the front wall of the ink cartridge 30. The rear surface (i.e. the outer surface of the rear wall) of the ink cartridge 30 can be any surface(s) that is visible when the ink cartridge 30 in its operational posture is viewed from its rear side and that is positioned rearward relative to the front-rear center of the ink cartridge 30. The top surface (i.e. the outer surface of the top wall) of the ink cartridge 30 can be any surface(s) that is visible when the ink cartridge 30 in its operational posture is viewed from above and that is positioned upward relative to an up-down (vertical) center of the ink cartridge 30. The bottom surface (i.e. the outer surface of the bottom wall) of the ink cartridge 30 can be any surface(s) that is visible when the ink cartridge 30 in its operational posture is viewed from below and that is positioned downward relative to the up-down center of the ink cartridge 30. The same is applied to the right surface (i.e. the outer surface of the right side wall) of the ink cartridge 30 and the left surface (i.e. the outer surface of the left side wall) of the ink cartridge 30. The right surface of the ink cartridge 30 can be any surface(s) that is visible when the ink cartridge 30 in its operational posture is viewed from its right side and that is positioned rightward relative to a left-right center of the ink cartridge 30. The left surface of the ink cartridge 30 can be any surface(s) that is visible when the ink cartridge 30 in its operational posture is viewed from its left side and that is positioned leftward relative to the left-right center of the ink cartridge 30.

As illustrated in FIGS. 4 to 6, the outer lid 134 further includes a light-blocking plate 67. The light-blocking plate 67 is provided on the top surface (outer surface) of the top wall 39. The light-blocking plate 67 protrudes upward from the top surface of the top wall 39. The light-blocking plate 67 has a flat plate-like shape that extends in the front-rear direction. The light-blocking plate 67 is integral with the top wall 39. The light-blocking plate 67 may not be integral with the top wall 39. The light-blocking plate 67 is positioned frontward relative to the protruding portion 43. The light-blocking plate 67 is also positioned frontward relative to the IC board 64 (described later). In the embodiment, the light-blocking plate 67 is a resin plate containing a colored material capable of absorbing light (such as, black pigment, carbon black pigment, or black dye). Alternatively, the light-blocking plate 67 may be configured by attaching a material that cannot transmit light, such as aluminum, to side surfaces of a plate capable of transmitting light.

The light-blocking plate 67 has a cutout 66 as illustrated in FIG. 6. The cutout 66 is recessed downward from an upper edge 67C of the light-blocking plate 67 and extends in the front-rear direction. The cutout 66 is formed in the light-blocking plate 67 at a position in alignment with the optical sensor 113 in the left-right direction when the ink cartridge 30 is completely attached to the cartridge attachment section 110. The light-blocking plate 67 has left and right surfaces serving as a light-blocking surface 67A. Light emitted from an outside of the ink cartridge 30 and travelling in the left-right direction can access the light-blocking surface 67A. Specifically, the light-blocking surface 67A includes a light-blocking portion 68 adapted to block light emitted from the optical sensor 113 and travelling in the left-right direction (see FIGS. 2 and 6) during the attachment and removal process of the ink cartridge 30 relative to the cartridge attachment section 110. In other words, the light-blocking portion 68 is configured to either prevent a light from passing therethrough or to alter a path of the light when the light-blocking portion 68 receives the light. The light-blocking portion 68 is provided at a region of the light-blocking surface 67A from a front edge 67B of the light-blocking plate 67 to a front edge of the cutout 66. During the attachment and removal process of the ink cartridge 30 relative to the cartridge attachment section 110, the light emitted from the light emitter of the optical sensor 113 is incident on the light-blocking portion 68 before the light arrives at the light receiver of the optical sensors 113. At this time, the intensity of light received at the light receiver is less than a predetermined intensity, for example, zero. Note that the light-blocking portion 68 may completely block the light traveling in the left-right direction, or may partially attenuate the light. Alternatively, the light-blocking portion 68 may refract the light to change a traveling direction thereof, or may fully reflect the light. The phrase "to block light" herein implies that the light emitted from the light emitter is prevented from reaching the light receiver in an amount that the light receiver can detect the light-blocking plate 67. When the ink cartridge 30 is completely attached to the cartridge attachment section 110, the cutout 66 opposes the optical sensors 113, so that the light emitted from the light emitter of the optical sensor 113 can pass through the cutout 66 to reach the light receiver of the optical sensors 113.

The light-blocking plate 67 may not be formed with the cutout 66. Depending on types of the ink cartridge 30, the light-blocking plate 67 may or may not have the cutout 66. In other words, depending on types of the ink cartridge 30, the light-blocking plate 67 may or may not be detected through the optical sensor 113 in a state where the ink cartridge 30 is attached to the cartridge attachment section 110. Specifically, the types of the ink cartridge 30 imply that colors of ink stored in the ink cartridge 30, types of ink (pigment ink or dye ink) stored in the ink cartridge 30 and initial amounts of ink (large amount or small amount) stored in the ink cartridge 30, for example.

Figure 22:
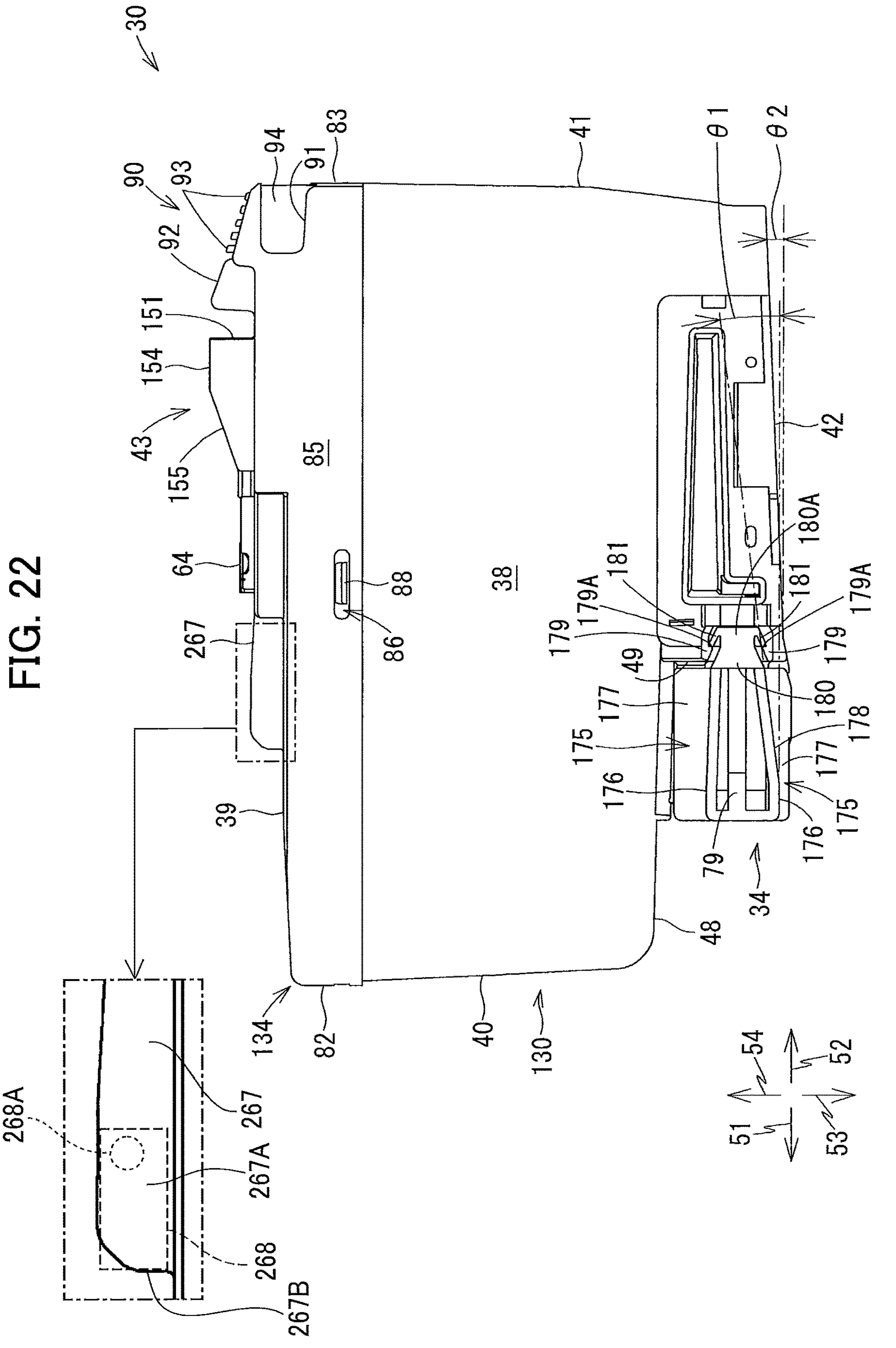
FIG. 22 is a left side view of the ink cartridge 30 illustrating a variation of the light-blocking plate 67.

As illustrated in FIG. 22, a light-blocking plate 267 has a flat plate-like shape that extends in the front-rear direction. No cutout is formed in the light-blocking plate 267. The light-blocking plate 267 has a configuration the same as that of the light-blocking plate 67 except that the cutout 66 is not formed. The light-blocking plate 267 has a light-blocking surface 267A including a light-blocking portion 268. The light blocking portion 268 is provided in a region of the light-blocking surface 267A from a front edge 267B of the light-blocking plate 267 to a position where the optical sensor 113 opposes when the ink cartridge 30 is completely attached to the cartridge attachment section 110. In this case, during the attachment and removal process of the ink cartridge 30 relative to the cartridge attachment section 110, the light emitted from the light emitter of the optical sensor 113 is blocked, attenuated, refracted, or reflected by the light-blocking portion 268. Further, since the light-blocking portion 268 has a portion 268A opposing the optical sensor 113 in a state where the ink cartridge 30 is attached to the cartridge attachment section 110, the light emitted from the light emitter of the optical sensor 113 is blocked, attenuated, refracted, or reflected by the light-blocking portion 268 when the ink cartridge 30 is completely attached to the cartridge attachment section 110.

With the light-blocking plate 67, the printer 10 can determine, for example, whether the ink cartridge 30 has been attached to the cartridge attachment section 110 based on the intensity of the light received by the light receiver of the optical sensor 113 during the attachment and removal process of the ink cartridge 30 relative to the cartridge attachment section 110. In terms of the ink cartridge 30 with the light-blocking plate 267, the printer 10 may determine whether the ink cartridge 30 has been attached to the cartridge attachment section 110 based on whether or not the light emitted from the light emitter of the optical sensor 113 is blocked by the light-blocking plate 267, that is, the light-blocking plate 267 is detected, when the ink cartridge 30 has been attached to the cartridge attachment section 110.

Further, the printer 10 can determine the type of the ink cartridge 30 attached to the cartridge attachment section 110 based on the presence or absence of the cutout 66, that is, based on whether the light emitted from the light emitter of the optical sensor 113 passes through the cutout 66 to be received by the light receiver of the optical sensors 113. The user also may visually determine the type of the ink cartridge 30 based on the presence or absence of the cutout 66. Further, the printer 10 may determine the information on the ink cartridge 30 attached to the cartridge attachment section 110 based on change of detection signals outputted from the optical sensor 113 during the attachment process of the ink cartridge 30 to the cartridge attachment section 110 and when the ink cartridge 30 has been attached to the cartridge attachment section 110.

As illustrated in FIGS. 4 to 6, the IC board 64 is disposed at the top surface of the top wall 39. The IC board 64 is positioned between the light-blocking plate 67 and the protruding portion 43 in the front-rear direction. The IC board 64 is positioned closer to the ink supply portion 34 than the protruding portion 43 is to the ink supply portion 34 in the front-rear direction. In other words, at the top wall 39, the light-blocking plate 67, the IC board 64, and the protruding portion 43 are arranged in this order from the front side to the rear side of the top wall 39. Specifically, at the top wall 39, the light-blocking surface 67A of the light-blocking plate 67, upper surfaces of the electrodes 65 of the IC board 64, and the lock surface 151 of the protruding portion 43 are arranged in this order from the front side to the rear side of the top wall 39. The IC board 64 is electrically connected to the four contacts 106 during the insertion process of the ink cartridge 30 into the cartridge attachment section 110. In a state where the ink cartridge 30 is attached to the cartridge attachment section 110, electrical connection between the IC board 64 and the four contacts 106 are maintained.

The IC board 64 includes a substrate, an IC (not illustrated), and the four electrodes 65. The substrate supports the IC. The four electrodes 65 are mounted on the substrate. The four electrodes 65 are electrically connected to the IC. The four electrodes 65 extend in the front-rear direction and are arrayed in the left-right direction. The four electrodes 65 are disposed on an upper surface of the substrate and exposed to an outside to allow electrical access thereto from above. The upper surfaces of the four electrodes 65 can directly contact the four contacts 106 of the case 101, respectively when the ink cartridge 30 has been attached to the cartridge attachment section 110. The IC is a semiconductor integrated circuit. The IC readably stores data indicative of information on the ink cartridge 30, such as a lot number, a manufacturing date, a color of the ink, the number of printable sheets of paper, and the like. Incidentally, the substrate may be a rigid substrate or a flexible substrate having flexibility.

<Internal Configuration of Ink Cartridge 30>

As illustrated in FIG. 10, the ink cartridge 30 includes the first storage chamber 32, the second storage chamber 33, an ink valve chamber 35, and the air communication passage 72. The first storage chamber 32, the second storage chamber 33, the ink valve chamber 35, and the air communication passage 72 are provided inside the ink cartridge 30.

The inner bottom wall portion 45 is provided inside the ink cartridge 30. More specifically, the cartridge casing 130 has the inner bottom wall portion 45. The inner bottom wall portion 45 extends in the front-rear direction and the left-right direction. In a state where the cartridge casing 130 supports the first inner lid 131, the inner bottom wall portion 45 opposes the bottom wall 136 of the first inner lid 131 in the up-down direction. The upper surface 45A of the inner bottom wall portion 45 is continuous with the upper surface 48A of the subordinate bottom wall portion 48.

An upper end of the first storage chamber 32 is defined by the lower surface 136B of the bottom wall 136 of the first inner lid 131. A lower end of the first storage chamber 32 is defined by the upper surface 45A of the inner bottom wall portion 45 and an upper surface 48A of the subordinate bottom wall portion 48. A front end of the first storage chamber 32 is defined by an inner surface 40A of the front wall 40. A rear end of the first storage chamber 32 is defined by an inner surface 41A of the rear wall 41. A left end of the first storage chamber 32 is defined by the inner surface 38A of the left side wall 38. A right end of the first storage chamber 32 is defined by the inner surface 37A of the right side wall 37. Thus, the first storage chamber 32 is a space defined by the lower surface 136B of the bottom wall 136 of the first inner lid 131, the upper surface 45A of the inner bottom wall portion 45, the upper surface 48A of the subordinate bottom wall portion 48, the inner surface 40A of the front wall 40, the inner surface 41A of the rear wall 41, the inner surface 37A of the right side wall 37, and the inner surface 38A of the left side wall 38. A dimension in the front-rear direction of the first storage chamber 32 is greater than a dimension in the left-right direction of the first storage chamber 32. Gaps between the front wall 40, the rear wall 41, the right side wall 37 and the left side wall 38, and the first inner lid 131 are sealed liquid-tightly with the film 133.

The first ribs 185 and the second ribs 186 protrude into the first storage chamber 32 from the lower surface 136B of the bottom wall 136 of the first inner lid 131. The lower surface 136B is one of the surfaces defining the first storage chamber 32.

The ribs 185, 186 protrude from the lower surface 136B. However, no ribs protrude from the surfaces defining the first storage chamber 32 other than the lower surface 136B. That is, none of the upper surface 45A of the inner bottom wall portion 45, the upper surface 48A of the subordinate bottom wall portion 48, the inner surface 40A of the front wall 40, the inner surface 41A of the rear wall 41, the inner surface 37A of the right side wall 37, and the inner surface 38A of the left side wall 38 has an inwardly protruding portion, such as a rib, protruding or extending therefrom toward the first storage chamber 32. Preferably, no inwardly protruding portion should be formed on the upper surface 45A of the inner bottom wall portion 45, the upper surface 48A of the subordinate bottom wall portion 48, the inner surface 40A of the front wall 40, the inner surface 41A of the rear wall 41, the inner surface 37A of the right side wall 37, and the inner surface 38A of the left side wall 38. However, inwardly protruding portions may be formed on these surfaces.

At the time of manufacturing the ink cartridge 30, the ink stored in the first storage chamber 32 is in contact with the upper surface 45A of the inner bottom wall portion 45, the upper surface 48A of the subordinate bottom wall portion 48, the inner surface 40A of the front wall 40, the inner surface 41A of the rear wall 41, the inner surface 37A of the right side wall 37, and the inner surface 38A of the left side wall 38.

As described above, the through-hole 46 is formed in the bottom wall 136 of the first inner lid 131. Through the through-hole 46, the first storage chamber 32 is in communication with the air chamber 36 of the air communication passage 72.

The second storage chamber 33 is provided in the interior space of the cartridge casing 130 at a position downward relative to the first storage chamber 32 when the ink cartridge 30 is in its operational posture. The second storage chamber 33 is adapted to store ink therein. The second storage chamber 33 has a volume smaller than that of the first storage chamber 32. Thus, a smaller amount of ink can be stored in the second storage chamber 33 than in the first storage chamber 32.

An upper end of the second storage chamber 33 is defined by a lower surface 45B of the inner bottom wall portion 45. A lower end of the second storage chamber 33 is defined by an upper surface 42A of the main bottom wall portion 42. A rear end of the second storage chamber 33 is defined by the inner surface 41A of the rear wall 41. A left end of the second storage chamber 33 is defined by the inner surface 38A of the left side wall 38 while a right end of the second storage chamber 33 is defined by the inner surface 37A of the right side wall 37. The second storage chamber 33 and the ink valve chamber 35 are partitioned by a partitioning wall 50. A front end of the second storage chamber 33 is defined by a surface 50A of the partitioning wall 50. The surface 50A is a rear surface of the partitioning wall 50 and is closer to the second storage chamber 33 than to a front surface of the partitioning wall 50. The second storage chamber 33 is a space defined by the lower surface 45B of the inner bottom wall portion 45, the upper surface 42A of the main bottom wall portion 42, the inner surface 41A of the rear wall 41, the inner surface 37A of the right side wall 37, the inner surface 38A of the left side wall 38, and the surface 50A of the partitioning wall 50.

At the time of manufacturing the ink cartridge 30, the ink stored in the second storage chamber 33 is in contact with the lower surface 45B of the inner bottom wall portion 45, the upper surface 42A of the main bottom wall portion 42, the inner surface 41A of the rear wall 41, the inner surface 37A of the right side wall 37, the inner surface 38A of the left side wall 38, and the surface 50A of the partitioning wall 50.

The second storage chamber 33 is in communication with the first storage chamber 32 through a communication hole 47 (FIGS. 10 and 11) formed in the inner bottom wall portion 45. As illustrated in FIG. 11, the communication hole 47 is formed at a rear-right end portion of the inner bottom wall portion 45. In other words, an open end of the communication hole 47 is open to the upper surface 45A of the inner bottom wall portion 45. As illustrated in FIG. 10, the second storage chamber 33 is also in communication with the ink valve chamber 35 through a through-hole 99 formed in the partitioning wall 50. The ink valve chamber 35 extends from the second storage chamber 33 in the frontward direction 51.

As illustrated in FIG. 10, the upper surface 45A of the inner bottom wall portion 45 and the upper surface 48A of the subordinate bottom wall portion 48 are sloped. The upper surface 45A of the inner bottom wall portion 45 and the upper surface 48A of the subordinate bottom wall portion 48 slope relative to the front-rear direction so that a front end of the upper surface 48A of the subordinate bottom wall portion 48 is positioned further upward than a rear end of the upper surface 45A of the inner bottom wall portion 45. That is, the upper surface 45A of the inner bottom wall portion 45 and the upper surface 48A of the subordinate bottom wall portion 48 slope downward toward the communication hole 47.

The communication hole 47 need not be formed in the rear-right end portion of the inner bottom wall portion 45. The communication hole 47 may be formed in a front-rear center portion of the inner bottom wall portion 45, for example. Alternatively, the communication hole 47 may be formed in the inner bottom wall portion 45 across an entire region in the left-right direction, or may be formed in the subordinate bottom wall portion 48.

In the embodiment, the upper surface 45A of the inner bottom wall portion 45 slopes relative to the front-rear direction, that is, slopes downward toward the communication hole 47. However, the upper surface 45A of the inner bottom wall portion 45 need not slope as described above.

As illustrated in FIGS. 10 and 14, the upper surface 48A includes the curved surface 115A, the curved surface 116A, and the curved surface 119A.

The curved surface 115A extends downward from the lower end of the inner surface 37A of the right side wall 37. That is, the curved surface 115A is continuously connected to the lower end of the inner surface 37A of the right side wall 37. The curved surface 116A extends downward from the lower end of the inner surface 38A of the left side wall 38. That is, the curved surface 116A is continuously connected to the lower end of the inner surface 38A of the left side wall 38. The curved surface 115A and the curved surface 116A are provided by the upper surface 48A of the subordinate bottom wall portion 48. Although not illustrated in the drawings, the upper surface 45A includes a curved region continuously connected to the inner surface 37A of the right side wall 37, and another curved region continuously connected to the inner surface 38A of the left side wall 38. Each of the curved surface 115A and the curved surface 116A has a radius of curvature that is greater than that of the curved regions of the upper surface 45A. The curved surface 115A is curved so that its lower end is positioned further leftward than its upper end. The curved surface 116A is curved so that its lower end is positioned further rightward than its upper end. The curved surface 115A and the curved surface 116A are curved so as to expand outward of the cartridge casing 130. The lower end of the curved surface 115A is connected to the lower end of the curved surface 116A. Here, the lower end of the curved surface 115A and the lower end of the curved surface 116A provide a lowermost portion of the first storage chamber 32 at its front portion, that is, a lowermost portion of the upper surface 48A. In other words, the lower end of the curved surface 115A is connected to the lower end of the curved surface 116A (i.e. the lowermost portion of the upper surface 48A as well as the lowermost portion of the first storage chamber 32 at its front portion), and the lower end of the curved surface 116A is connected to the lower end of the curved surface 115A (i.e. the lowermost portion of the upper surface 48A as well as the lowermost portion of the first storage chamber 32 at its front portion). Accordingly, at the front portion of the first storage chamber 32, a curved inner surface having a U-shaped cross-section is formed by the upper surface 48A, and the U-shaped curved inner surface (i.e. the upper surface 48A) connects the inner surface 37A of the right side wall 37 to the inner surface 38A of the left side wall 38.

The outer curved surface 115B of the subordinate bottom wall portion 48 is curved in a direction substantially parallel to a direction that the inner curved surface 115A is curved. In other words, the outer curved surface 115B is curved in a direction the same as a direction that the inner curved surface 115A is curved. The outer curved surface 116B of the subordinate bottom wall portion 48 is curved in a direction substantially parallel to a direction that the inner curved surface 116A is curved. In other words, the outer curved surface 116B is curved in a direction the same as the inner curved surface 116A is curved. Incidentally, the outer curved surfaces 115B and 116B need not be curved. For example, the outer curved surfaces 115B and 116B may be bent.

As illustrated in FIG. 10, the curved surface 119A extends downward from the lower end of the inner surface 40A of the front wall 40. That is, the curved surface 119A is continuously connected to the lower end of the inner surface 40A of the front wall 40. The curved surface 119A is provided by the upper surface 48A of the subordinate bottom wall portion 48. The curved surface 119A is curved so that its lower end is positioned further rearward than its upper end. The curved surface 119A is curved so as to expand outward of the cartridge casing 130. The outer curved surface 119B of the subordinate bottom wall portion 48 is curved in a direction substantially parallel to a direction that the inner curved surface 119A is curved. In other words, the outer curved surface 119B is curved in a direction the same as a direction that the inner curved surface 119A is curved. Incidentally, the outer curved surface 119B need not be curved. For example, the outer curved surface 119B may be bent.

As illustrated in FIG. 11, the inner surface 40A includes the curved surface 117A, the curved surface 118A, and an intermediate surface 121A between the curved surface 117A and the curved surface 118A. The curved surface 117A extends frontward from the front end of the inner surface 37A of the right side wall 37. That is, the curved surface 117A is continuously connected to the front end of the inner surface 37A of the right side wall 37. The curved surface 118A extends frontward from the front end of the inner surface 38A of the left side wall 38. That is, the curved surface 118A is continuously connected to the front end of the inner surface 38A of the left side wall 38. The curved surface 117A has a front end continuously connected to a right end of the intermediate surface 121A of the inner surface 40A. The curved surface 118A has a front end continuously connected to a left end of the intermediate surface 121A of the inner surface 40A. The curved surface 117A and the curved surface 118A are provided by the inner surface 40A of the front wall 40. The curved surface 117A is curved so that its front end is positioned further leftward than its rear end. The curved surface 118A is curved so that its front end is positioned further rightward than its rear end. The curved surface 117A and the curved surface 118A are curved so as to expand outward of the cartridge casing 130. The inner surface 40A of the front wall 40 has a left-right center portion that constitutes a frontmost portion of the first storage chamber 32. That is, the intermediate surface 121A includes the frontmost portion of the first storage chamber 32. The front end of the curved surface 117A and the front end of the curved surface 118A are connected to the intermediate surface 121A that includes the frontmost portion of the first storage chamber 32.

The outer curved surface 117B of the front wall 40 is curved in a direction substantially parallel to a direction that the inner curved surface 117A is curved. In other words, the outer curved surface 117B is curved in a direction the same as a direction that the inner curved surface 117A is curved. The outer curved surface 118B of the front wall 40 is curved substantially parallel to a direction that the inner curved surface 118A is curved. In other words, the outer curved surface 118B is curved in a direction the same as a direction that the inner curved surface 118A is curved. Incidentally, the outer curved surfaces 117B and 118B need not be curved. For example, the outer curved surfaces 117B and 118B may be bent.

The inner curved surface 115A, the inner curved surface 117A, and the inner curved surface 119A are smoothly and continuously connected to each other to provide a boundary region formed with a substantially spherical surface. Similarly, the inner curved surface 116A, the inner curved surface 118A, and the inner curved surface 119A are smoothly and continuously connected to each other to provide a boundary region formed with a substantially spherical surface. Further, the outer curved surface 115B, the outer curved surface 117B, and the outer curved surface 119B are smoothly and continuously connected to each other to provide a boundary region formed with a spherical surface. Still further, the outer curved surface 116B, the outer curved surface 118B, and the outer curved surface 119B are smoothly and continuously connected to each other to provide a boundary region formed with a substantially spherical surface. In FIG. 7, the spherical surface of the boundary region between the outer curved surface 116B, the outer curved surface 118B, and the outer curved surface 119B is designated by a reference sign 200.

In the embodiment, the curved surface 115A and the curved surface 116A are continuously connected to each other at their lower ends. However, as will be described later in the ink cartridge 30K according to the variation of the embodiment, the lower end of the curved surface 115A and the lower end of the curved surface 116A may not be continuously connected to each other.

Further, in the embodiment, the front end of the curved surface 117A and the front end of the curved surface 118A are connected to the intermediate surface 121A. However, the front end of the curved surface 117A and the front end of the curved surface 118A may be continuously connected to each other. In this case, the connecting portion between the curved surface 117A and the curved surface 118A constitutes the frontmost portion of the first storage chamber 32.

Figure 21:
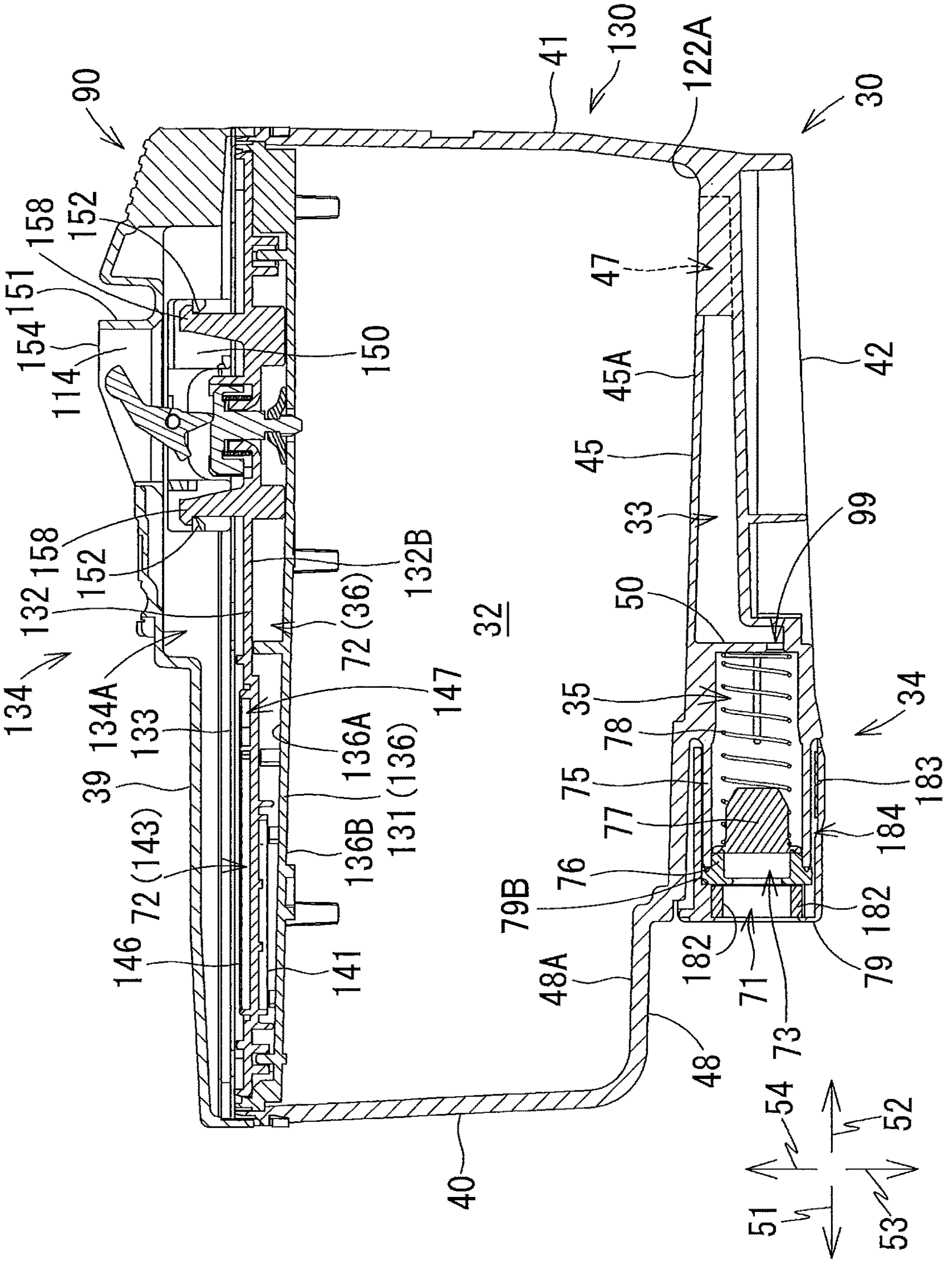
FIG. 21 is a vertical cross-sectional view of the ink cartridge 30 illustrating a variation of the cartridge casing 130.

Further, in the embodiment, the upper surface 48A of the subordinate bottom wall portion 48 includes the curved surface 115A connected to the lower end of the inner surface 37A of the right side wall 37, the curved surface 116A connected to the lower end of the inner surface 38A of the left side wall 38, and the curved surface 119A connected to the lower end of the front surface 40A of the front wall 40. Further, in the embodiment, the inner surface 40A of the front wall 40 includes the curved surface 117A connected to the front end of the inner surface 37A of the right side wall 37, and the curved surface 118A connected to the front end of the inner surface 38A of the left side wall 38. However, an inner curved surface(s) may be provided so as to be connected to the rear end of the inner surface 37A of the right side wall 37, the rear end of the inner surface 38A of the left side wall 38, the inner surface 40A of the front wall 40, the inner surface 41A of the rear wall 41, the upper surface 42A of the main bottom wall portion 42, the upper surface 45A of the inner bottom wall portion 45, and the upper surface 48A of the subordinate bottom wall portion 48. For example, as illustrated in FIG. 21, the upper surface 45A may include a curved surface 122A continuously connected to the inner surface 41A of the rear wall 41. Further, a curved surface may extend from one end of an inner surface of at least one of the right side wall 37, the left side wall 38, the front wall 40, the rear wall 41, the main bottom wall portion 42, the subordinate bottom wall portion 48, and the inner bottom wall portion 45.

Further, the inner curved surface 115A and the inner curved surface 116A each have a radius of curvature of, for example, not less than 1 mm. More specifically, the inner curved surface 115A and the inner curved surface 116A each have a radius of the curvature in a range from 1 mm to 3 mm. The outer curved surface 115B and the outer curved surface 116B each have a radius of curvature of, for example, not less than 7 mm.

<Air Communication Passage 72>

The air communication passage 72 is a space that provides communication between the first storage chamber 32 and an exterior of the ink cartridge 30. The air communication passage 72 is positioned above the cartridge casing 130. As illustrated in FIG. 10, the air communication passage 72 includes the air chamber 36, the through-hole 142 (see FIGS. 9A and 9B), and the labyrinth path 143 described above.

The air chamber 36 is a space formed in the air communication passage 72. The air chamber 36 communicates with the first storage chamber 32 at one end and communicates with the labyrinth path 143 at the other end. The air chamber 36 has a portion positioned above the first storage chamber 32 and below the labyrinth path 143. The air chamber 36 has a lower end defined by the upper surface 136A of the bottom wall 136 of the first inner lid 131 and an upper end defined by the lower surface 132B of the second inner lid 132. The air chamber 36 has a front end, a rear end, a right end, and a left end defined by the inner peripheral surface of the peripheral wall 137 (see FIGS. 8A and 8B) of the first inner lid 131. A gap between the second inner lid 132 and the peripheral wall 137 of the first inner lid 131 is sealed liquid-tightly with the film 133.

As described above, the upper end of the first storage chamber 32 is defined by the lower surface 136B of the bottom wall 136 of the first inner lid 131. That is, the first storage chamber 32 and the air chamber 36 are partitioned by the bottom wall 136.

The air chamber 36 is in communication with the first storage chamber 32 through the through-hole 46 penetrating the bottom wall 136 in the up-down direction. Further, the air chamber 36 is in communication with the labyrinth path 143 through the through-hole 142 (see FIGS. 9A and 9B) formed in the second inner lid 132. As described above, the semipermeable membrane 141 (see FIG. 7) is welded to the lower end surface of the rib 140 of the second inner lid 132. With this structure, ink flowing from the first storage chamber 32 through the through-hole 46 is blocked by the semipermeable membrane 141 and does not reach the through-hole 142. Hence, the semipermeable membrane 141 prevents ink from flowing into the labyrinth path 143.

As described above, the labyrinth path 143 is defined by the upper surface 132A, the plurality of ribs 144 (see FIG. 9B), and the film 146 (see FIG. 7). The labyrinth path 143 is a continuous passage that extends in the left-right direction, repeatedly U-turning in the front-rear direction. The labyrinth path 143 is provided in a form of a groove covered with the film 146 at its top end. The labyrinth path 143 has one end in communication with the through-hole 142 and another end in communication with the communication hole 147. The labyrinth path 143 is in communication with the air chamber 36 through the through-hole 142 formed in the second inner lid 132. The labyrinth path 143 is provided at a surface (i.e. upper surface 132A) of the second inner lid 132, the surface being opposite to a surface (i.e. lower surface 132B) of the second inner lid 132 that defines the upper end of the air chamber 36. In the embodiment, the surface defining the upper end of the air chamber 36 is an inner surface of the second inner lid 132. The labyrinth path 143 is positioned upward relative to the air chamber 36. The labyrinth path 143 is in communication with an interior space 134A (see FIG. 10) of the outer lid 134 through the communication hole 147 (see FIG. 7). The interior space 134A is in communication with the outside of the ink cartridge 30 through the opening 44 (see FIG. 4) formed in the top wall 39 of the outer lid 134 and through a gap between the outer lid 134 and the cartridge casing 130. That is, the labyrinth path 143 can communicates with the atmosphere through the communication hole 147.

<Valve Mechanism 135 and Support Member 150>

The valve mechanism 135 has a function for interrupting and establishing communication between the first storage chamber 32 and the atmosphere. The configuration of the valve mechanism 135 according to the embodiment will be described in detail below. The valve mechanism 135 may have a different configuration, provided that the valve mechanism 135 can perform the function for interrupting and establishing communication between the first storage chamber 32 and the atmosphere. For example, the valve mechanism 135 may be so configured that the valve body 161 (described later) is movable in a direction other than the up-down direction.

As illustrated in FIGS. 7 and 10, the valve mechanism 135 includes the valve body 161, a coil spring 162, and the lever 163. The valve body 161 includes the rod 165 and a seal member 166 fitted onto the rod 165. As illustrated in FIG. 10, the seal member 166 and a part of the rod 165 are disposed in the air communication passage 72. The coil spring 162 and the remaining part of the rod 165 are disposed in the interior space 134A of the outer lid 134. Incidentally, the arrangement of the components in the valve mechanism 135 is not limited to the above. For example, all the components of the valve mechanism 135 may be disposed in the air communication passage 72.

The support member 150 illustrated in FIG. 7 is adapted to pivotally movably support the valve mechanism 135, more specifically, the lever 163 (described later) of the valve mechanism 135. The support member 150 has an internal space in which a part of the valve mechanism 135 can be disposed. As illustrated in FIG. 10, the support member 150 includes two engagement portions 152, with one at a front end and the other at a rear end. Upon engagement of the engagement portions 152 with the bent portions of the distal ends of the ribs 158 of the second inner lid 132, the support member 150 is supported to the second inner lid 132.

The rod 165 is disposed between the pair of ribs 157 (see FIG. 9B) of the second inner lid 132. The rod 165 has an upper surface including a front portion 165A, a rear portion 165B, and a sloped portion 165C connecting the front portion 165A to the rear portion 165B. The sloped portion 165C slopes downward from its front end to its rear end so that the front portion 165A is positioned further upward than the rear portion 165B.

The rod 165 extends in the up-down direction. The rod 165 is inserted into the through-hole 139 (see FIG. 9A) formed in the second inner lid 132. The seal member 166 is formed of an elastic material such as rubber. The seal member 166 is in pressure contact with the rod 165 without a gap between the seal member 166 and the rod 165. With this structure, no gap is formed between the seal member 166 and the rod 165.

Figure 16:
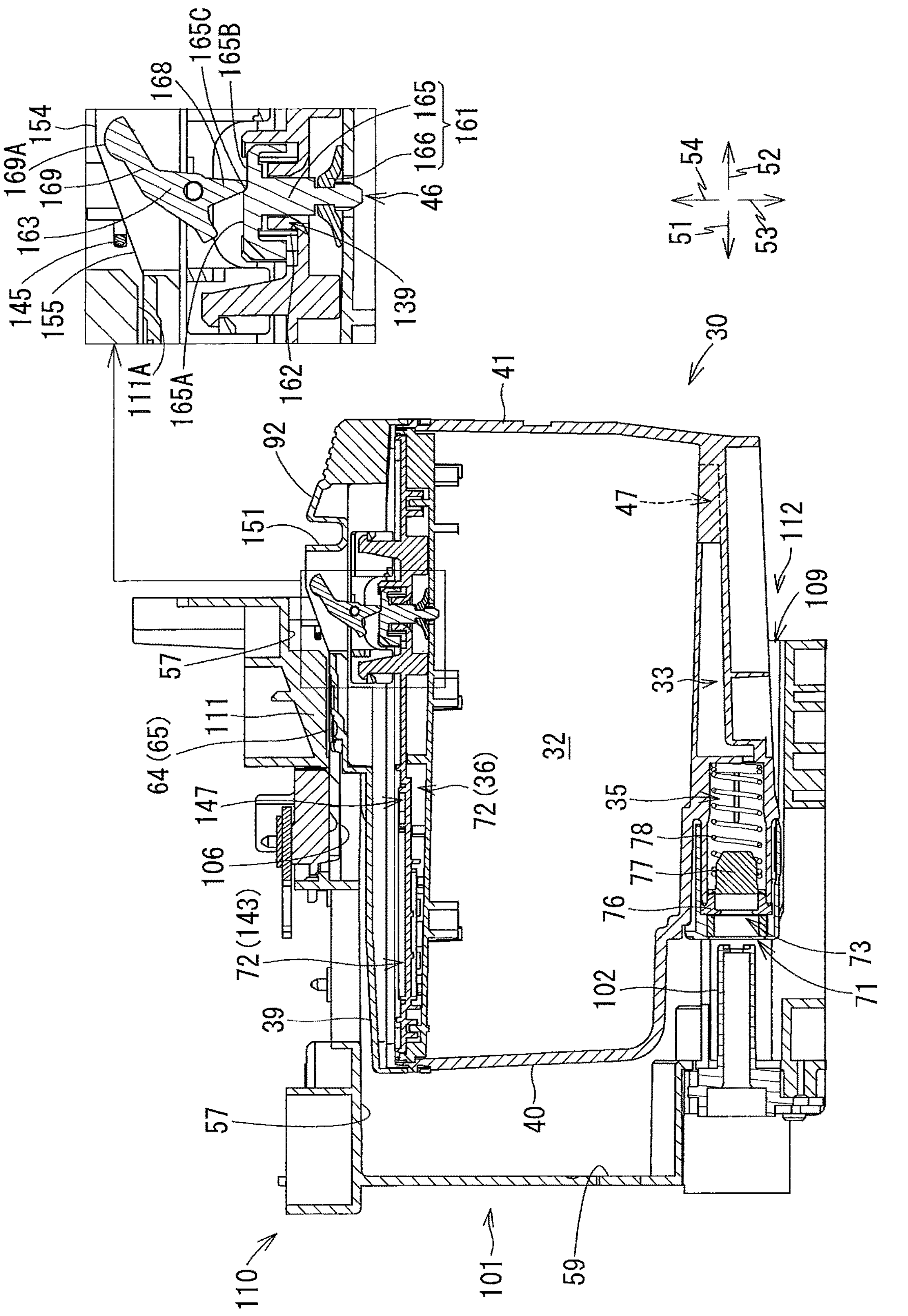
FIG. 16 is a vertical cross-sectional view of the cartridge attachment section 110 and the ink cartridge 30 during the attachment process of the ink cartridge 30 to the cartridge attachment section 110 according to the embodiment.
Figure 17:
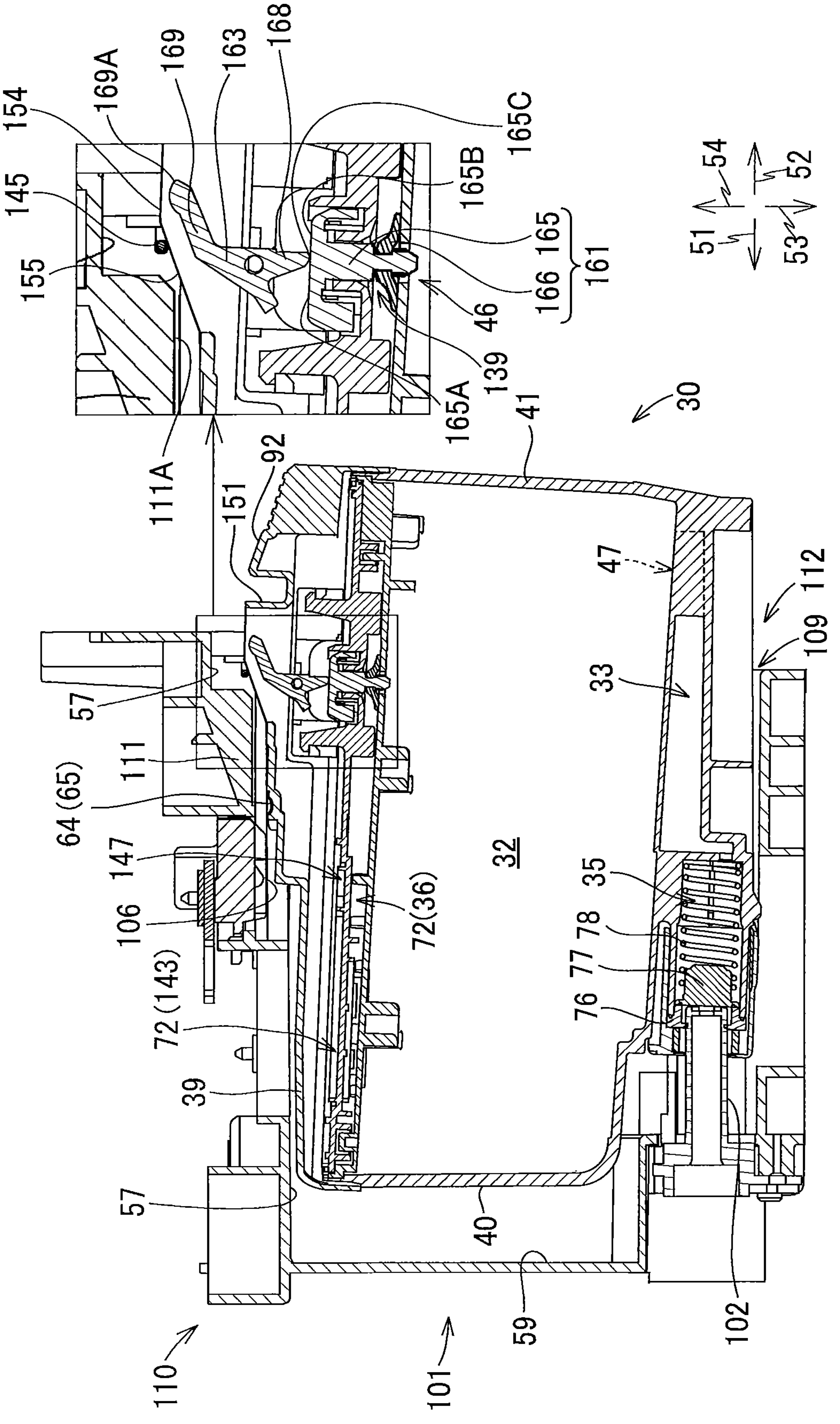
FIG. 17 is a vertical cross-sectional view of the cartridge attachment section 110 and the ink cartridge 30 during the attachment process of the ink cartridge 30 to the cartridge attachment section 110 according to the embodiment, illustrating a state where the ink supply portion 34 has been connected to an ink needle 102 but a valve body 161 has not yet been moved to its open position.
Figure 18:
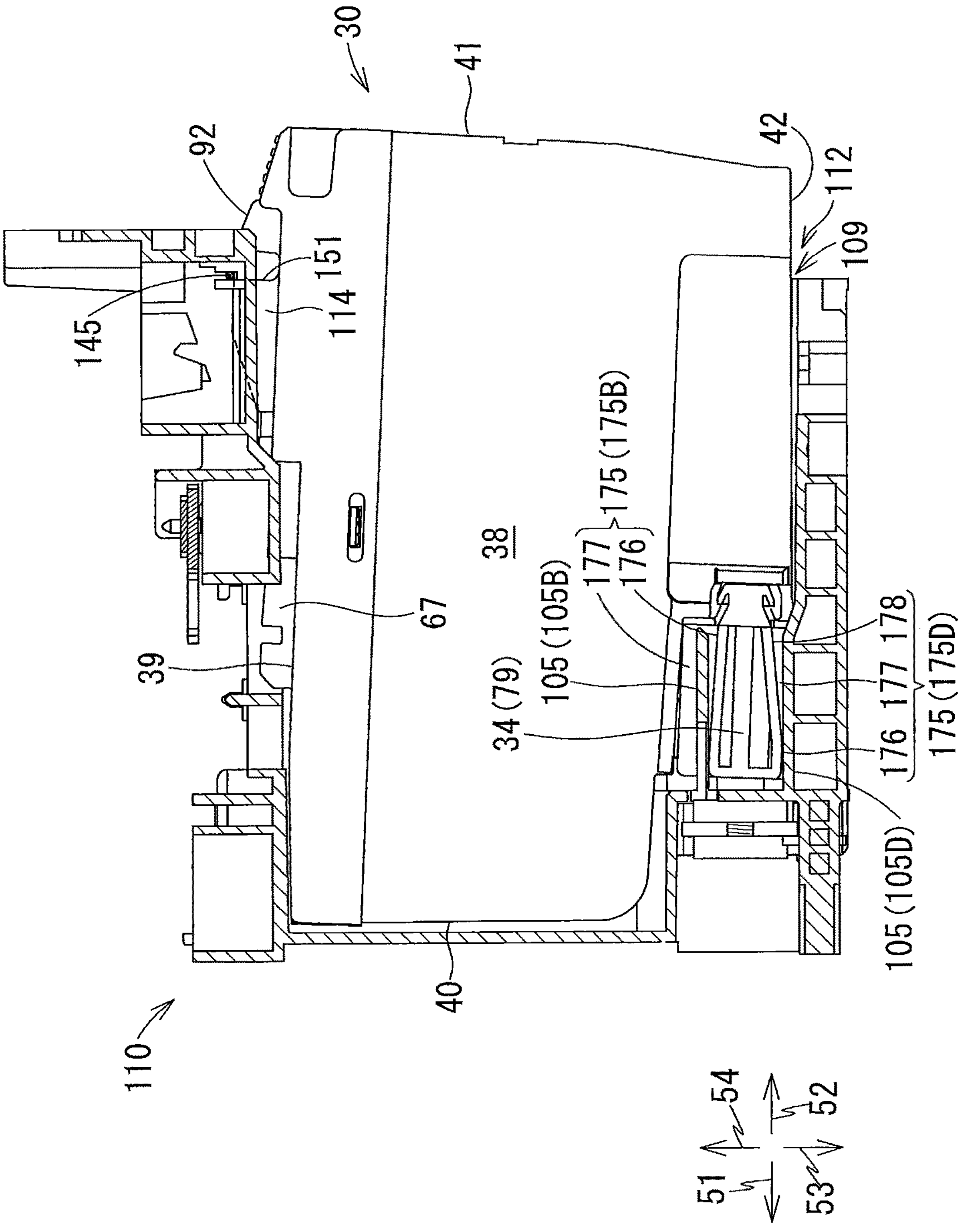
FIG. 18 is a vertical cross-sectional view of the cartridge attachment section 110 and a left side view of the ink cartridge 30 during the attachment process of the ink cartridge 30 to the cartridge attachment section 110 according to the embodiment, illustrating a state where the ink cartridge 30 has been pivotally moved within the cartridge attachment section 110.

The valve body 161 is movable in the up-down direction from a closed position illustrated in FIGS. 10 and 16 to an open position illustrated in FIG. 3. Movement of the valve body 161 in the left-right direction and in the front-rear direction is restricted by the rib 156 and the ribs 157 of the second inner lid 132 (see FIG. 9B).

The rod 165 has protruding portions that protrude frontward and rearward, respectively. As illustrated in FIGS. 10 and 16, in a state where the valve body 161 is in the closed position, the rod 165 is supported by the second inner lid 132 such that lower surfaces of the protruding portions of the valve body 161 contact the upper surface 132A of the second inner lid 132. Further, in a state where the valve body 161 is in the closed position, the seal member 166 covers a peripheral edge portion of the through-hole 46. A gap between the through-hole 46 and the seal member 166 is thus closed. That is, the through-hole 46 is air-tightly and liquid-tightly closed by the rod 165 and the seal member 166. Accordingly, communication between the first storage chamber 32 and the outside of the ink cartridge 30 (i.e. the atmosphere) is interrupted.

As illustrated in FIG. 3, the valve body 161 in the open position is positioned further upward than the valve body 161 in the closed position (see FIGS. 10 and 16). In a state where the valve body 161 is in the open position, the lower surfaces of the protruding portions of the rod 165 is spaced apart upward from the upper surface 132A of the second inner lid 132. Further, the seal member 166 is spaced apart upward from the peripheral edge portion of the through-hole 46. Hence, the through-hole 46 is open. As a result, communication between the first storage chamber 32 and the outside of the ink cartridge 30 (i.e. the atmosphere) through the through-hole 46 is established. At this time, the seal member 166 pressingly contacts the through-hole 139 from below and covers a peripheral edge portion of the through-hole 139. A gap between the seal member 166 and the through-hole 139 is thus closed. That is, the through-hole 139 is air-tightly and liquid-tightly closed by the rod 165 and the seal member 166.

As illustrated in FIG. 10, the coil spring 162 is fitted around the rod 165. The coil spring 162 has an upper end that is in contact with the rod 165 of the valve body 161 and a lower end that is in contact with the upper surface 132A of the second inner lid 132. In a state where the valve body 161 is in the closed position, the coil spring 162 has a length shorter than its natural length. Hence, when the valve body 161 is in the closed position, the coil spring 162 urges the valve body 161 upward, that is, urges the valve body 161 in a direction from the closed position to the open position. Incidentally, a member for urging the valve body 161 is not limited to the coil spring 162. In place of the coil spring 162, the valve body 161 may be urged by a leaf spring or an elastic member such as rubber.

As illustrated in FIGS. 7 and 10, the lever 163 has a through-hole serving as a pivot shaft portion 167. The lever 163 includes a first projection 168 and a second projection 169. The first projection 168 and the second projection 169 extend outward from the pivot shaft portion 167.

As illustrated in FIG. 10, the support member 150 is provided with a pair of protrusions 170. One of the pair of protrusions 170 protrudes from an inner right surface of the support member 150 defining a right end of the internal space of the support member 150. The other of the pair of protrusions 170 protrudes from an inner left surface of the support member 150 defining a left end of the internal space of the support member 150. The protrusions 170 are inserted into the pivot shaft portion 167. More specifically, the protrusion 170 protruding from the inner right surface of the support member 150 is inserted into the pivot shaft portion 167 from the right, and the protrusion 170 protruding from the inner left surface of the support member 150 is inserted into the pivot shaft portion 167 from the left. With this structure, the lever 163 is supported by the support member 150 so as to be pivotally movable relative to the support member 150 about an axis of the pivot shaft portion 167. Incidentally, the pivot shaft portion 167 may be a protrusion that protrudes from the lever 163 rightward and leftward. In this case, the inner left and right surfaces of the support member 150 have openings, respectively, and the protrusion as the pivot shaft portion 167 is inserted in the openings.

As illustrated in FIGS. 7 and 10, the first projection 168 and the second projection 169 extend in opposite directions with respect to the pivot shaft portion 167. The first projection 168 and the second projection 169 are substantially positioned on opposite sides of the pivot shaft portion 167. The first projection 168 extends in a direction away from the pivot shaft portion 167, and the second projection 169 extends in a direction substantially opposite to the extending direction of the first projection 168.

The lever 163 is pivotally movable from a first position illustrated in FIGS. 10 and 16 to a second position illustrated in FIG. 3. The axis of the pivot shaft portion 167 functions as a pivot center when the lever 163 is pivotally moved between the first position and the second position.

When the lever 163 is in the first position, the first projection 168 extends downward. A rear edge of a distal end (i.e. lower end) of the first projection 168 is positioned rearward relative to the axis of the pivot shaft portion 167. More specifically, as illustrated in FIG. 10, an imaginary line 172 connecting the axis of the pivot shaft portion 167 and the rear edge of the distal end of the first projection 168 is inclined rearward at a prescribed angle $\theta 3$ relative to an imaginary line 173 that extends from the axis of the pivot shaft portion 167 in the gravitational direction. In the embodiment, the prescribed angle $\theta 3$ is 5 degrees. The lower end of the first projection 168 contacts the rear portion 165B at the upper surface of the rod 165 of the valve body 161 to press the valve body 161 downward. Hence, the valve body 161 is placed in the closed position. Further, when the lever 163 is in the first position, the second projection 169 extends upward, more specifically, diagonally upward and rearward. The second projection 169 is positioned so as to be interposed between the pair of walls 114 of the protruding portion 43. The second projection 169 does not extend upward beyond the pair of walls 114. That is, an upper end of the second projection 169 is positioned downward relative to an upper end of the pair of walls 114.

When the lever 163 is in the first position, pivotal frontward movement of the first projection 168, i.e. pivotal clockwise movement of the lever 163 in FIG. 10 toward the second position, is restricted by the sloped portion 165C of the rod 165 of the valve body 161, and also restricted by the distal end of the first projection 168 positioned further rearward than the axis of the pivot shaft portion 167. Note that, in order to restrict the pivotal frontward movement of the first projection 168, the coil spring 162 is designed so as to have an upward urging force greater than a force required to move the first projection 168 from the rear portion 165B of the upper surface of the rod 165 of the valve body 161 to the front portion 165A thereof. Incidentally, the sloped portion 165C may be provided or may not be provided at the upper surface of the rod 165. Even if the sloped portion 165C is not provided and the rod 165 has a flat upper surface, the pivotal clockwise movement of the lever 163 in FIG. 10 toward the second position can be restricted as long as the distal end of the first projection 168 is positioned rearward relative to the axis of the pivot shaft portion 167.

Pivotal rearward movement of the first projection 168, i.e. pivotal counterclockwise movement of the lever 163 in FIG. 10, is restricted upon abutment of the lever 163 against a projection 171 provided on the inner right surface of the support member 150. The lever 163 is therefore maintained in the first position. The lever 163 in the first position restricts the valve body 161 from moving to the open position against the urging force of the coil spring 162 and maintains the valve body 161 at the closed position.

As illustrated in FIG. 3, when the lever 163 is in the second position, the lever 163 is spaced apart from the projection plate 111. The first projection 168 extends frontward. The second projection 169 extends downward, more specifically, diagonally downward and rearward. Further, the valve body 161 is in the open position.

<Ink Supply Portion 34>

As illustrated in FIG. 6, the ink supply portion 34 extends frontward from the connecting wall 49 at a position downward of the subordinate bottom wall portion 48 and frontward of the main bottom wall portion 42. As illustrated in FIG. 10, the ink supply portion 34 is positioned downward of the inner bottom wall portion 45. Further, the ink supply portion 34 is positioned downward and rearward of the front wall 40.

Figure 12:
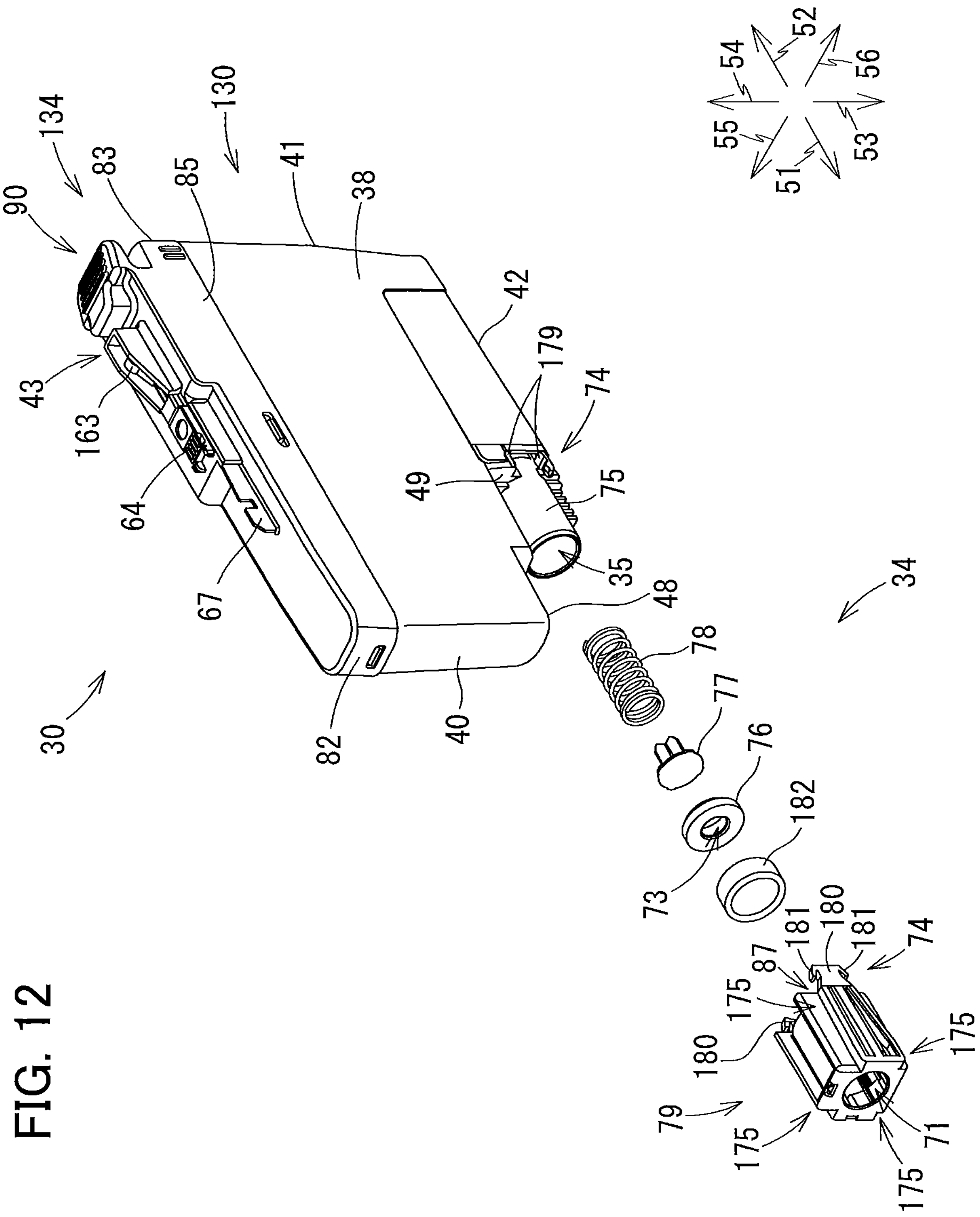
FIG. 12 is an exploded perspective view of an ink supply portion 34 of the ink cartridge 30 according to the embodiment as viewed from a front side thereof.

As illustrated in FIG. 12, the ink supply portion 34 includes a cylinder 75, a packing 76, a valve 77, the coil spring 78, a cap 79, and a snap-fit mechanism 74.

The cylinder 75 has an outer shape that is generally tubular or hollow cylindrical. The shape of the cylinder 75 is not limited to a circular cylindrical shape. The cylinder 75 may have any shape as long as the cylinder 75 is hollow. The cylinder 75 has a distal end (i.e. front end) directed frontward. The distal end of the cylinder 75 is positioned downward and rearward of the front wall 40. The cylinder 75 has an opening at its front end. The cylinder 75 defines an internal space serving as the ink valve chamber 35. The ink valve chamber 35 extends in the frontward direction 51 from the second storage chamber 33.

The packing 76 is a disc-shape member and has a through-hole 73 at its center region. The packing 76 is made of an elastic material such as rubber or elastomer. As illustrated in FIG. 10, the packing 76 is disposed at the front end of the cylinder 75 so as to cover the front opening of the cylinder 75. The through-hole 73 penetrates the center region of the packing 76 in the front-rear direction to provide a tubular-shaped inner peripheral surface. The through-hole 73 has an inner diameter slightly smaller than an outer diameter of the ink needle 102.

As illustrated in FIG. 10, the valve 77 and the coil spring 78 are accommodated in the ink valve chamber 35. The valve 77 can contact and separate from the packing 76 by moving in the front-rear direction. When the valve 77 contacts the packing 76, the through-hole 73 formed in the center region of the packing 76 is closed. When the valve 77 separates from the packing 76, the through-hole 73 is open. The coil spring 78 urges the valve 77 frontward. Accordingly, the valve 77 closes the through-hole 73 of the packing 76 while no external force is applied to the valve 77.

Figure 13A:
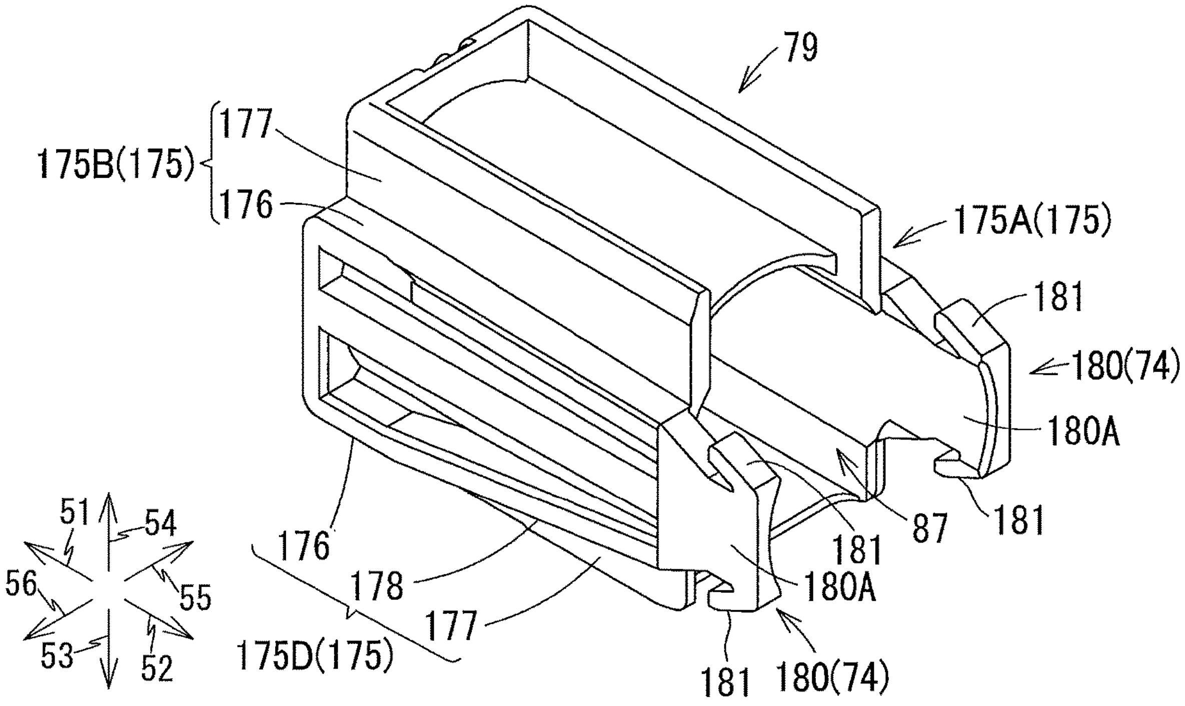
FIG. 13A is a perspective view of a cap 79 of the ink cartridge 30 according to the embodiment as viewed from a rear side thereof.
Figure 13B:
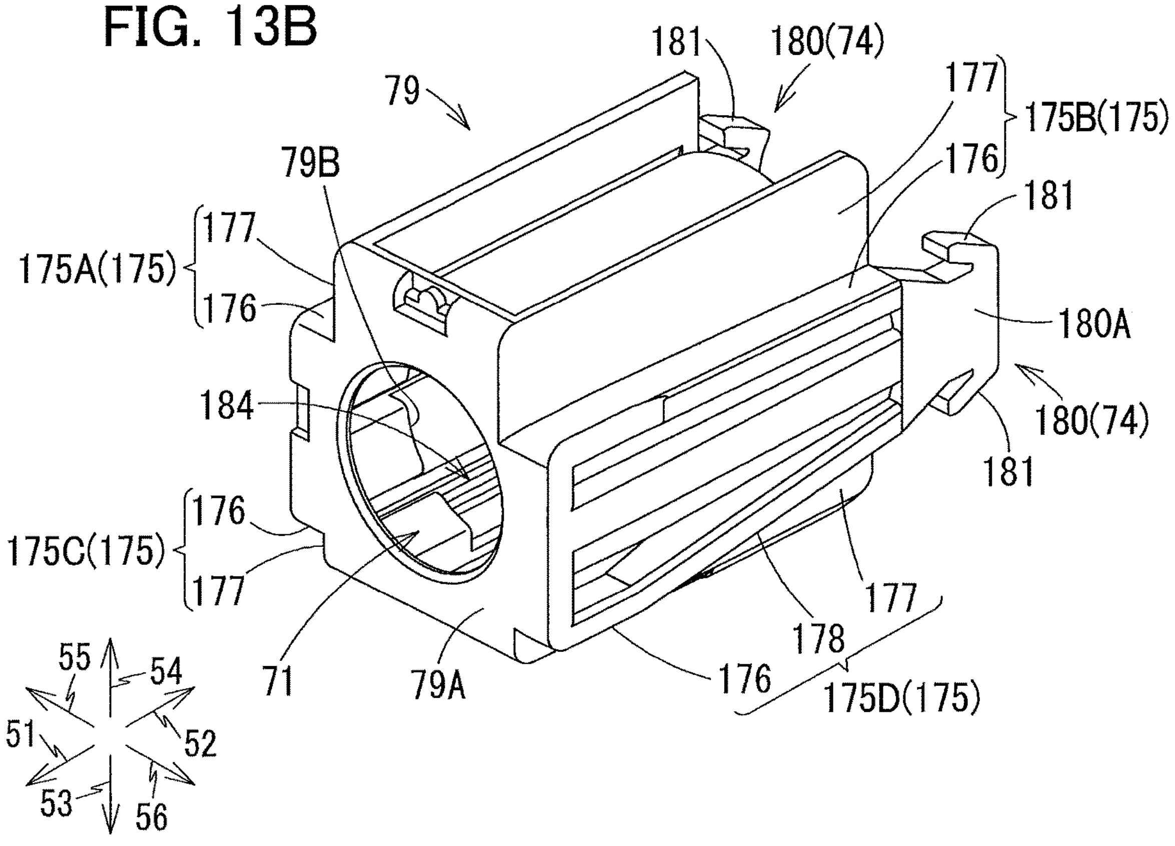
FIG. 13B is a perspective view of the cap 79 as viewed from a front side thereof.

As illustrated in FIGS. 13A and 13B, the cap 79 has an outer shape that is generally rectangular parallelepiped. The cap 79 has a hollow configuration. Incidentally, the cap 79 may have an outer shape other than a rectangular parallelepiped provided that the cap 79 is a hollow member whose front end and rear end are open.

The cap 79 has a rear end formed with an opening 87. The cylinder 75 and the packing 76 are inserted into an inner space of the cap 79 through the opening 87. Accordingly, the cap 79 covers the cylinder 75 and the packing 76 from a front side thereof. As illustrated in FIG. 10, in a state where the cap 79 covers the cylinder 75, a lower end of the cap 79 is provided at a position substantially the same as a lower end of the cartridge casing 130 with respect to the up-down direction.

The cap 79 has a front end wall having a front surface 79A. The front end wall of the cap 79 is formed with an ink supply port 71. In a state where the cap 79 covers the cylinder 75 and the packing 76, the ink valve chamber 35 is in communication with the outside of the ink cartridge 30 through the through-hole 73 of the packing 76 and the ink supply port 71 of the cap 79.

The ink supply portion 34 further includes a first absorbing member 182 and a second absorbing member 183. As illustrated in FIG. 10, the first absorbing member 182 and the second absorbing member 183 are disposed in the inner space of the cap 79. The first absorbing member 182 and the second absorbing member 183 are formed of a porous material such as polyurethane foam. The first absorbing member 182 and the second absorbing member 183 have minute holes provided by the porous material. Ink enters the minute holes, so that the ink is absorbed by the first absorbing member 182 and the second absorbing member 183. The first absorbing member 182 and the second absorbing member 183 are thus adapted to absorb ink.

The first absorbing member 182 has an annular shape, as illustrated in FIG. 12. The first absorbing member 182 is disposed along a circumferential edge defining the ink supply port 71. That is, the first absorbing member 182 is disposed adjacent to a circumferential edge portion of the ink supply port 71. Incidentally, the first absorbing member 182 may not have an annular shape. For example, the first absorbing member 182 may have a rectangular shape. In this case, the first absorbing member 182 may be disposed only at a position downward of the circumferential edge defining the ink supply port 71.

The second absorbing member 183 has a plate-like shape. The second absorbing member 183 is positioned rearward relative to the first absorbing member 182. The second absorbing member 183 is supported by an inner lower surface of the cap 79 so as to be disposed in a lower portion of the inner space of the cap 79, that is, at a position downward relative to the ink valve chamber 35. The inner lower surface of the cap 79 is a surface defining a lower end of the inner space of the cap 79. Incidentally, the second absorbing member 183 need not have a plate-like shape. Further, the second absorbing member 183 may be disposed over an entire inner peripheral surface of the cap 79 defining the inner space of the cap 79.

As illustrated in FIGS. 10 and 13B, at least one groove 184 extending in the front-rear direction is formed at the inner peripheral surface of the cap 79, more specifically, the inner lower surface of the cap 79. The groove 184 has a front end connected to the first absorbing member 182. The front end of the groove 184 may be positioned in proximity to the first absorbing member 182. The groove 184 has a rear end connected to the second absorbing member 183. The rear end of the groove 184 may be positioned in proximity to the second absorbing member 183. That is, the groove 184 is formed in the cap 79 at a region from the circumferential edge portion of the ink supply port 71 to the second absorbing member 183. With this configuration, even if ink is leaked from the cylinder 75 to the inner space of the cap 79, the ink can be introduced to the second absorbing member 183 through the groove 184 to be absorbed by the second absorbing member 183.

Note that the first absorbing member 182 and the second absorbing member 183 may not be disposed in the inner space of the cap 79. Further, the groove 184 may not be formed at the inner lower surface of the cap 79. In a state where the cap 79 covers the cylinder 75 and the packing 76, the inner peripheral surface of the cap 79 and an outer peripheral surface of the cylinder 75 provide a gap therebetween. Even if the groove 184 is not formed at the inner lower surface of the cap 79, ink leaked from the cylinder 75 is introduced to the second absorbing member 183 via the gap.

As illustrated in FIGS. 13A and 13B, the cap 79 has an outer peripheral surface extending rearward from the front surface 79A. The outer peripheral surface of the cap 79 is formed with four guide grooves 175A, 175B, 175C, and 175D. Each of the four grooves 175A, 175B, 175C, and 175D has a front edge that opens on the front surface 79A. The guide groove 175A is provided at an upper-right end portion of the cap 79. The guide groove 175B is provided at an upper-left end portion of the cap 79. The guide groove 175C is provided at a lower-right end portion of the cap 79. The guide groove 175D is provided at a lower-left end portion of the cap 79. In other words, the guide groove 175A and the guide groove 175D are disposed on opposite sides of the ink valve chamber 35 in a first perpendicular direction perpendicular to the front-rear direction. Further, the guide groove 175B and the guide grove 175C are disposed on opposite sides of the ink valve chamber 35 in a second perpendicular direction perpendicular to the front-rear direction and the first perpendicular direction. Specifically, in the embodiment, the first perpendicular direction is a direction connecting from the upper-right side of the cap 79 to the lower-left side of the cap 79, and the second perpendicular direction is a direction connecting from the upper-left side of the cap 79 to the lower-right side of the cap 79. As described above, the outer shape of the cap 79 is generally rectangular parallelepiped. That is, when projected in the front-rear direction, the cap 79 has a projection plane having a generally rectangular shape defined by four sides and four corners connecting two adjacent sides. The four guide grooves 175A, 175B, 175C, and 175D are formed at the four corners, respectively. Specifically, the front surface 79A of the cap 79 has a generally rectangular shape in a front view, more specifically, when the front surface 79A is viewed from its front side, and the front edges of the four guide grooves 175A, 175B, 175C, and 175D are formed respective corners of the front surface 79A. In other words, the guide grooves 175A, 175B, 175C, and 175D are each defined by two protrusions formed at the outer peripheral surface of the cap 79. Specifically, the cap 79 has four protrusions at the outer peripheral surface thereof. Of the four protrusions, two protrusions protrude rightward and leftward, respectively, such that the ink supply port 71 is disposed between the two protrusions in the left-right direction. The two protrusions have respective upper end surfaces serving as a first guide surface 176 of the guide grooves 175A and a first guide surface 176 of the guide groove 175B, respectively. The two protrusions have respective lower end surfaces serving as a first guide surface 176 of the guide grooves 175C and a first guide surface 176 of the guide groove 175D, respectively.

Hereinafter, the four guide grooves 175A, 175B, 175C, and 175D will be collectively referred to as "guide grooves 175." The guide grooves 175 are elongated in the front-rear direction. Hence, a longitudinal direction of the guide grooves 175 is aligned with the front-rear direction.

The guide grooves 175A and 175C are positioned rightward relative to the IC board 64. The guide grooves 175B and 175D are positioned leftward relative to the IC board 64. That is, of the four guide grooves 175, two guide grooves 175 are positioned outward of the IC board 64 in one of the rightward direction 55 and the leftward direction 56, while the remaining two guide grooves 175 are positioned outward of the IC board 64 in the other of the rightward direction 55 and the leftward direction 56. Incidentally, each of the four guide grooves 175 need not be positioned outward of the IC board 64 in the left-right direction.

The guide groove 175A has a shape and arrangement that is symmetrical to the guide groove 175B with respect to the left-right direction. Each of the guide grooves 175A and 175B has the first guide surface 176 and a second guide surface 177. The guide groove 175C has a shape and arrangement that is symmetrical to the guide groove 175D with respect to the left-right direction. Each of the guide grooves 175C and 175D has the first guide surface 176, the second guide surface 177, and a third guide surface 178. Note that the third guide surface 178 of the guide groove 175C does not appear in FIG. 13B. However, the third guide surface 178 of the guide groove 175C is identical with the third guide surface 178 of the guide groove 175D.

The first guide surface 176 extends in the front-rear direction and the left-right direction. The third guide surface 178 extends in the left-right direction and a direction sloped relative to the front-rear direction so that its rear end is positioned further upward than its front end. That is, the third guide surface 178 is sloped relative to the front-rear direction. In each of the guide grooves 175C and 175D, the third guide surface 178 is positioned rearward relative to the first guide surface 176. Further, in each of the guide grooves 175C and 175D, the first guide surface 176 has a rear end continuous to a front end of the third guide surface 178. The second guide surface 177 extends in the front-rear direction and the up-down direction. In each of the guide grooves 175A and 175B, the second guide surface 177 is connected to the first guide surface 176. In each of the guide grooves 175C and 175D, the second guide surface 177 is connected to both the first guide surface 176 and the third guide surface 178. However, the first guide surface 176, the second guide surface 177, and the third guide surface 178 need not be connected to each other.

As illustrated in FIG. 6, the third guide surface 178 is inclined relative to the front-rear direction at an angle θ1, and the bottom surface of the main bottom wall portion 42 is inclined relative to the front-rear direction at an angle θ2. The angle θ1 is greater than the angle θ2.

The rear end of the first guide surface 176 of each guide grooves 175 is positioned rearward relative to a front end of the packing 76.

The first guide surface 176 of each of the guide grooves 175A and 175B faces upward. The first guide surface 176 of each of the guide grooves 175C and 175D faces downward. The third guide surface 178 of each of the guide grooves 175C and 175D faces downward. The second guide surface 177 of each of the guide grooves 175A and 175C faces rightward. The second guide surface 177 of each of the guide grooves 175B and 175D faces leftward.

When viewed in the front-rear direction, each of the guide grooves 175A, 175B, 175C, and 175D is provided in a form of an L-shaped recess constituted by the first guide surface 176 and the second guide surface 177. That is, the front edge of each of the guide grooves 175A, 175B, 175C, and 175D forms an L-shape on the front surface 79A in the front view, more specifically, when the front surface 79A is viewed from its front side. No surface is formed in the cap 79 at positions confronting each of the first guide surfaces 176, each of the second guide surfaces 177, and each of the third guide surfaces 178. That is, each of the guide grooves 175A, 175B, 175C, and 175D is open in a direction perpendicular to the first guide surface 176. Further, each of the guide grooves 175A, 175B, 175C, and 175D is open in a direction perpendicular to the second guide surface 177. Still further, each of the guide grooves 175C and 175D is open in a direction perpendicular to the third guide surface 178. That is, each of the first guide surfaces 176 is open in a direction perpendicular thereto. Further, each of the second guide surfaces 177 is open in a direction perpendicular thereto. Still further, each of the third guide surfaces 178 is open in a direction perpendicular thereto. More specifically, the first guide surface 176 of each of the guide grooves 175A and 175B is open upward, and the first guide surface 176 of each of the guide grooves 175C and 175D is open downward. Further, the second guide surface 177 of each of the guide grooves 175A and 175C is open rightward, and the second guide surface 177 of each of the guide grooves 175B and 175D is open leftward. Still further, the third guide surface 178 of each of the guide grooves 175C and 175D is open downward. In each of the guide grooves 175A, 175B, 175C, and 175D, the first guide surface 176 forms a prescribed angle with the second guide surface 177. For example, an angle formed by the first guide surface 176 and the second guide surface 177 is 90 degrees. In each of the guide grooves 175A, 175B, 175C, and 175D, the second guide surface 177 has a dimension in the up-down direction greater than a dimension of the first guide surface 176 in the left-right direction.

During the insertion process of the ink cartridge 30 into the cartridge attachment section 110, the ink cartridge 30 is inserted into the cartridge attachment section 110 in the frontward direction 51. At this time, the projection 105A disposed at the upper-right side relative to the ink needle 102 enters the guide groove 175A, the projection 105B disposed at the upper-left side relative to the ink needle 102 enters the guide groove 175B, the projection 105C disposed at the lower-right side relative to the ink needle 102 enters the guide groove 175C, and the projection 105D disposed at the lower-left side relative to the ink needle 102 enters the guide groove 175D. In this way, the guide grooves 175A, 175B, 175C, and 175D are guided by the projections 105A, 105B, 105C, and 105D, respectively.

More specifically, the first guide surface 176 of the guide groove 175A is guided by the first guide surface 196 of the projection 105A, and the second guide surface 177 of the guide groove 175A is guided by the second guide surface 197 of the projection 105A. Further, the first guide surface 176 of the guide groove 175B is guided by the first guide surface 196 of the projection 105B, and the second guide surface 177 of the guide groove 175B is guided by the second guide surface 197 of the projection 105B. Still further, the first guide surface 176 of the guide groove 175C is guided by the first guide surface 196 of the projection 105C, and the second guide surface 177 of the guide groove 175C is guided by the second guide surface 197 of the projection 105C. Moreover, the first guide surface 176 of the guide groove 175D is guided by the first guide surface 196 of the projection 105D, and the second guide surface 177 of the guide groove 175D is guided by the second guide surface 197 of the projection 105D.

As the ink cartridge 30 is further inserted forward into the cartridge attachment section 110, the third guide surface 178 of the guide groove 175C is positioned above the projection 105C disposed at the lower-right side relative to the ink needle 102, and the third guide surface 178 of the guide groove 175D is positioned above the projection 105D disposed at the lower-left side relative to the ink needle 102. As a result, a space is formed between the first guide surface 196 of the projection 105C and the third guide surface 178 of the guide groove 175C in the up-down direction. A space is also formed between the first guide surface 196 of the projection 105D and the third guide surface 178 of the guide groove 175D in the up-down direction. The spaces formed between the first guide surfaces 196 and the third guide surfaces 178 allow the ink cartridge 30 to be pivotally movable in the case 101.

The guide grooves 175 need not be formed at the upper-right end portion, the upper-left end portion, the lower-right end portion, and the lower-left end portion of the cap 79 provided that the guide grooves 175 are respectively formed in the cap 79 at positions corresponding to the projections 105 of the cartridge attachment section 110. For example, the guide grooves 175 may be respectively formed at a left-right center portion of an upper surface of the cap 79, a left-right center portion of a lower surface of the cap 79, a vertical (up-down) center portion of a right surface of the cap 79, and a vertical (up-down) center portion of a left surface of the cap 79. Further, three or less guide grooves 175, or five or more guide grooves 175 may be formed at the cap 79. That is, the cap 79 may be formed with at least one guide groove 175.

That is, the cap 79 may be formed with two guide grooves 175, instead of four guide grooves 175. In this case, the two guide grooves 175 may be formed so as to be arranged in the up-down direction or in the left-right direction. In case that the two guide grooves 175 are arranged in the up-down direction, the guide grooves 175A and 175C may be formed in the cap 79; or the guide grooves 175B and 175D may be formed in the cap 79. Alternatively, in case that the two guide grooves 175 are arranged in the left-right direction, the guide grooves 175A and 175B may be formed at the cap 79; or the guide grooves 175C and 175D may be formed at the cap 79.

Each of the guide grooves 175 may have a surface that opposes the first guide surface 176. In this case, the guide groove 175 is defined by at least the surface opposing the first guide surface 176, the first guide surface 176, and the second guide surface 177. The first guide surface 176 is not open in the direction perpendicular to the first guide surface 176 in this case. Further, each of the guide grooves 175 may have a surface that opposes the second guide surface 177. In this case, the guide groove 175 is defined by at least the surface opposing the second guide surface 177, the first guide surface 176, and the second guide surface 177. The second guide surface 177 is not open in the direction perpendicular to the second guide surface 177 in this case.

Moreover, each of the guide grooves 175C and 175D need not have the third guide surface 178. In this case, each of the guide grooves 175C and 175D is defined only by the first guide surface 176 and the second guide surface 177, similar to the guide grooves 175A and 175B.

The snap-fit mechanism 74 illustrated in FIG. 12 is configured to engage the cap 79 with one of the cartridge casing 130 and the cylinder 75. In the embodiment, the snap-fit mechanism 74 engages the cap 79 with the cartridge casing 130.

The snap-fit mechanism 74 includes four projecting portions 179 and two projections 180. Two of the four projecting portions 179 are provided at the right side wall 37 of the cartridge casing 130, and the remaining two of the four projecting portions 179 are provided at the left side wall 38 of the cartridge casing 130. Accordingly, in the embodiment, the four projecting portions 179 are provided at the cartridge casing 130. The two projections 180 are provided at the cap 79.

Specifically, the two projecting portions 179 protrude rightward from the right side wall 37 and are spaced apart from each other in the up-down direction. The two projecting portions 179 protruding from the right side wall 37 do not appear in FIG. 12. As illustrated in FIG. 12, the remaining two projecting portions 179 protrude leftward from the left side wall 38 and are spaced apart from each other in the up-down direction. Note that a set of the two projecting portions 179 provided at the right side wall 37 has a shape and arrangement that is symmetrical to a set of the remaining two projecting portions 179 with respect to the left-right direction. In other words, each of the left side wall 37 and the right side wall 38 is formed with a recess that is recessed rearward. Each recess is adapted to receive corresponding projection 180. That is, the snap-fit mechanism 74 includes the two projections 180, and the two recesses adapted to receive the corresponding projections 180. As will be described later, the projecting portions 179 may protrude from the cylinder 75 of the ink supply portion 34. As illustrated in FIG. 6, each of the projecting portions 179 has an engagement surface 179A facing rearward.

As illustrated in FIG. 13A, each of the two projections 180 protrudes in an axial direction of the cap 79 from an edge portion defining the opening 87 of the cap 79. In the operational posture of the ink cartridge 30, the axial direction of the cap 79 coincides with the front-rear direction, and the projections 180 protrude rearward from the cap 79. Incidentally, the projections 180 may protrude in a direction other than the rearward direction 52 provided that the cap 79 is capable of being engaged with the casing 130 by means of snap-fitting.

One of the two projections 180 protrudes rearward from the cap 79 at a position rightward of the opening 87. The remaining one of the two projections 180 protrudes rearward from the cap 79 at a position leftward of the opening 87.

That is, the two projections 180 are arranged to oppose each other in the left-right direction such that the opening 87 is interposed between the two projections 180. In a state where the cap 79 covers the cylinder 75, the one of the two projections 180 faces the right side wall 37 in the left-right direction, and the remaining one of the two projections 180 faces the left side wall 38 in the left-right direction. In other words, in a state where the cap 79 covers the cylinder 75, the two projections 180 are arranged to oppose each other in the left-right direction, with the cartridge casing 130 interposed therebetween.

Each of the two projections 180 has an upper end positioned downward relative to an upper end of the cap 79, and a lower end positioned upward relative to a lower end of the cap 79. When the cap 79 is viewed from its rear side, the two projections 180 does not protrude outward of an outer peripheral edge of the cap 79. In other words, when the cap 79 is viewed from its rear side, the two projections 180 are positioned inward of the outer peripheral edge of the cap 79.

Incidentally, each of the projections 180 may have a portion positioned outward of the outer peripheral edge of the cap 79 when the cap 79 is viewed from its rear side. For example, the upper end of each projection 180 may be positioned upward relative to the upper end of the cap 79. Alternatively, the lower end of each projection 180 may be positioned downward relative to the lower end of the cap 79.

Each of the projections 180 has a length in the up-down direction so that the length in the up-down direction at its rear end is smaller than the length in the up-down direction at its front end. That is, each projection 180 has such a tapered shape that its length in the up-down direction is gradually reduced toward its distal end (i.e. rear end). Incidentally, each of the projections 180 may not have a tapered shape described above.

Each of the projections 180 has a distal end portion 180A and a pair of engagement pawls 181. One of the pair of engagement pawls 181 protrudes upward (more specifically, diagonally upward and forward) from an upper surface of the distal end portion 180A. The remaining one of the pair of engagement pawls 181 protrudes downward (more specifically, diagonally downward and forward) from a lower surface of the distal end portion 180A. Each of the engagement pawls 181 has a shape narrower than that of the distal end portion 180A. In other words, each engagement pawl 181 has a length in the up-down direction smaller than that of the remaining part of the projection 180. With this configuration, each engagement pawl 181 is resiliently deformable so as to be movable relative to the distal end portion 180A of the projection 180. More specifically, each engagement pawl 181 is configured to be resiliently deformed so as to be pivotally movable in the up-down direction about a base end thereof (i.e., a portion connected to the distal end portion 180A).

In a state where the cap 79 covers the cylinder 75 and the packing 76 from a front side thereof, each protrusion 180 is received in the corresponding recess provided at the casing 130, and each engagement pawl 181 is engaged with the engagement surface 179A of the corresponding projecting portion 179 (see FIG. 6). More specifically, the pair of engagement pawls 181 of the projection 180 disposed rightward of the opening 87 is engaged with the engagement surfaces 179A of the two projecting portions 179 protruding rightward from the right side wall 37, while the pair of engagement pawls 181 of the projection 180 disposed leftward of the opening 87 is engaged with the engagement surfaces 179A of the two projecting portions 179 protruding leftward from the left side wall 38. By virtue of these engagements, the cap 79 is retained at the attached state to the cartridge casing 130.

As illustrated in FIG. 10, in a state where the cap 79 covers the cylinder 75 and the packing 76 from a front side thereof, an inner surface 79B of the front end wall of the cap 79 (i.e. a surface opposite to the front surface 79A) is positioned frontward relative to the packing 76 and in pressure contact with the packing 76. Further, in a state where the cap 79 covers the cylinder 75 and the packing 76 from a front side thereof, the front end of the cylinder 75 is positioned rearward relative to the packing 76 and in pressure contact with the packing 76. Therefore, the packing 76 is fixed between the cap 79 and the cylinder 75, while interposed therebetween. A gap between the packing 76 and the cylinder 75, and a gap between the packing 76 and the cap 79 are liquid-tightly sealed.

In a state where the cap 79 covers the cylinder 75 and the packing 76 from a front side thereof, the cap 79 is positioned downward and rearward relative to the front wall 40.

In the embodiment, the snap-fit mechanism 74 engages the cap 79 with the cartridge casing 130. However, as described above, the snap-fit mechanism 74 may engage the cap 79 with the cylinder 75 of the ink supply portion 34. In this case, the projecting portions 179 may protrude from an outer circumferential surface of the cylinder 75. Further, in a state where the cap 79 covers the cylinder 75, the two projections 180 are arranged to oppose each other such that the cylinder 75 is interposed between the two projections 180.

<Operations for Attaching and Removing Ink Cartridge 30 Relative to Cartridge Attachment Section 110>

Next, an operation for attaching the ink cartridge 30 to the cartridge attachment section 110 will be described with reference to FIGS. 3, 10, and 15-20.

As illustrated in FIG. 10, in the ink cartridge 30 prior to attachment to the cartridge attachment section 110, the valve 77 is in contact with the packing 76 to close the through-hole 73. Accordingly, at this time, ink flow from the ink valve chamber 35 to the outside of the ink cartridge 30 is interrupted. Further, the lever 163 is in the first position. The valve body 161 is in the closed position as the first projection 168 of the lever 163 in the first position presses the rod 165 of the valve body 161 downward. In this state, the through-hole 46 is closed by the rod 165 and the seal member 166 of the valve body 161. Therefore, the first storage chamber 32 is not opened to the atmosphere. That is, communication between the first storage chamber 32 and the outside of the ink cartridge 30 is interrupted.

As illustrated in FIGS. 15 and 16, the ink cartridge 30 is inserted into the case 101 through the opening 112 of the cartridge attachment section 110, with the front wall 40, 82 facing frontward and the top wall 39 facing upward. That is, the ink cartridge 30 is attached to the case 101 while moved in the frontward direction 51 (i.e. attachment direction). The user inserts the ink cartridge 30 into the cartridge attachment section 110, while pushing the rear wall 41, 83 frontward. The lower end portion of the ink cartridge 30 enters the guide groove 109 formed in the bottom wall of the case 101.

As the ink cartridge 30 is inserted into the case 101, the projections 105 advance into the corresponding guide grooves 175 of the ink supply portion 34 as illustrated in FIG. 15. The guide grooves 175 are thus guided by the projections 105, respectively.

As the projections 105 advance into the guide grooves 175, respectively, the first guide surface 176 of the guide groove 175C and the first guide surface 176 of the guide groove 175D are supported by the projection 105C disposed at the lower-right side relative to the ink needle 102 and the projection 105D disposed at the lower-left side relative to the ink needle 102, respectively. Further, the projection 105A disposed at the upper-right side relative to the ink needle 102 and the projection 105B disposed at the upper-left side relative to the ink needle 102 are positioned in proximity to and above the first guide surface 176 of the guide groove 175A and the first guide surface 176 of the guide groove 175B, respectively. As a result, the ink supply portion 34 is fixed in position relative to the case 101 with respect to the up-down direction.

As the projections 105 advance into the guide grooves 175, the projection 105A disposed at the upper-right side relative to the ink needle 102 and the projection 105C disposed at the lower-right side relative to the ink needle 102 are positioned in proximity to and rightward of the second guide surface 177 of the guide groove 175A and the second guide surface 177 of the guide groove 175C, respectively. Further, the projection 105B disposed at the upper-left side relative to the ink needle 102 and the projection 105D disposed at the lower-left side relative to the ink needle 102 are positioned in proximity to and leftward of the second guide surface 177 of the guide groove 175B and the second guide surface 177 of the guide groove 175D, respectively. As a result, the ink supply portion 34 is fixed in position relative to the case 101 with respect to the left-right direction.

As the ink cartridge 30 is further inserted into the case 101, the ink needle 102 advances into the inner space of the cap 79 through the ink supply port 71 to be press-fitted into the through-hole 73 of the packing 76. As described above, at this time, the ink supply portion 34 is fixed in position relative to the case 101 in the up-down direction and in left-right direction. Hence, the ink needle 102 can pass through a center portion of the ink supply port 71, without abutting against the cap 79.

Figure 19:
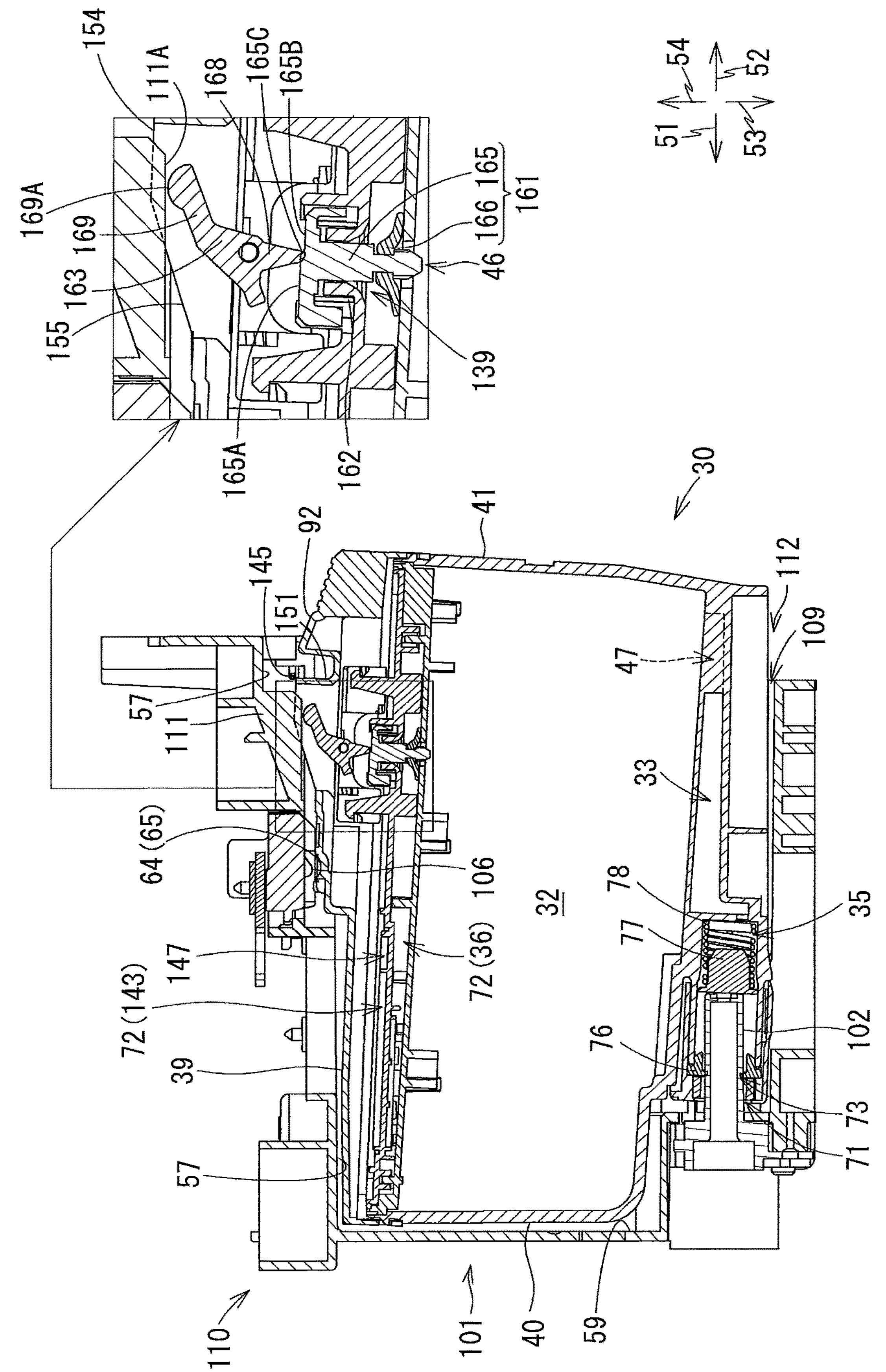
FIG. 19 is a vertical cross-sectional view of the cartridge attachment section 110 and the ink cartridge 30 during the attachment process of the ink cartridge 30 to the cartridge attachment section 110 according to the embodiment, illustrating a state where the ink cartridge 30 has been pivotally moved within the cartridge attachment section 110 according to the embodiment.

As the ink cartridge 30 is still further inserted into the case 101, the ink needle 102 enters the ink valve chamber 35 and moves the valve 77 away from the packing 76 against the urging force of the coil spring 78 (see FIG. 19). The ink needle 102 is thus connected to the ink supply portion 34 to allow communication with each other. Hence, the ink is allowed to flow from the first storage chamber 32 and the second storage chamber 33 into the inner space of the ink needle 102 through the ink valve chamber 35. In this state, the urging force of the coil spring 78 is exerted on the ink cartridge 30 to urge the ink cartridge 30 rearward.

Thereafter, when the ink cartridge 30 is further inserted into the case 101, the rear ends of the projections 105C, 105D moves past the first guide surfaces 176 of the guide grooves 175C, 175D and are positioned downward of the third guide surfaces 178 of the guide grooves 175C, 175D, respectively. Spaces are respectively formed in the up-down direction between the third guide surfaces 178 of the guide grooves 175C, 175D and the projections 105C, 105D. Further, as described above, the main bottom wall portion 42 of the cartridge casing 130 slopes relative to the front-rear direction such that the bottom end at the front end portion of the main bottom wall portion 42 is positioned downward relative to the bottom end at the rear end portion of the main bottom wall portion 42. Hence, a space is formed in the up-down direction between the main bottom wall portion 42 and the bottom of the case 101. These spaces permit the ink cartridge 30 to be pivotally movable about the through-hole 73 of the packing 76 so that the rear portion of the ink cartridge 30 is moved downward in a state where the ink needle 102 is force-fitted into the through-hole 73 and is in contact with the through-hole 73. The through-hole 73 at this time serves as a pivot center of this pivotal movement of the ink cartridge 30.

When the ink cartridge 30 is further inserted into the case 101 after the ink cartridge 30 is placed in a state capable of pivotally moving, the lock shaft 145 of the cartridge attachment section 110 contacts the sloped surfaces 155 of the pair of walls 114 and is guided along the sloped surfaces 155 (see FIG. 15). At this time, the sloped surfaces 155 receive a downward reaction force from the lock shaft 145. As a result, the ink cartridge 30 is pivotally moved, with the rear portion of the ink cartridge 30 moved downward (see FIGS. 18 and 19).

As the ink cartridge 30 is further inserted into the case 101 and the front wall 40, 82 of the ink cartridge 30 approaches a position near the inner end surface 59 of the case 101, the projection plate 111 of the case 101 enter the space between the pair of walls 114 as illustrated in FIG. 19. However, since the rear portion of the ink cartridge 30 has been moved downward as a result of the pivotal movement of the ink cartridge 30, the lever 163 has also been moved downward. At this state, the bottom surface 111A of the projection plate 111 has not yet contacted the lever 163 although the bottom surface 111A is positioned above the lever 163.

Figure 20:
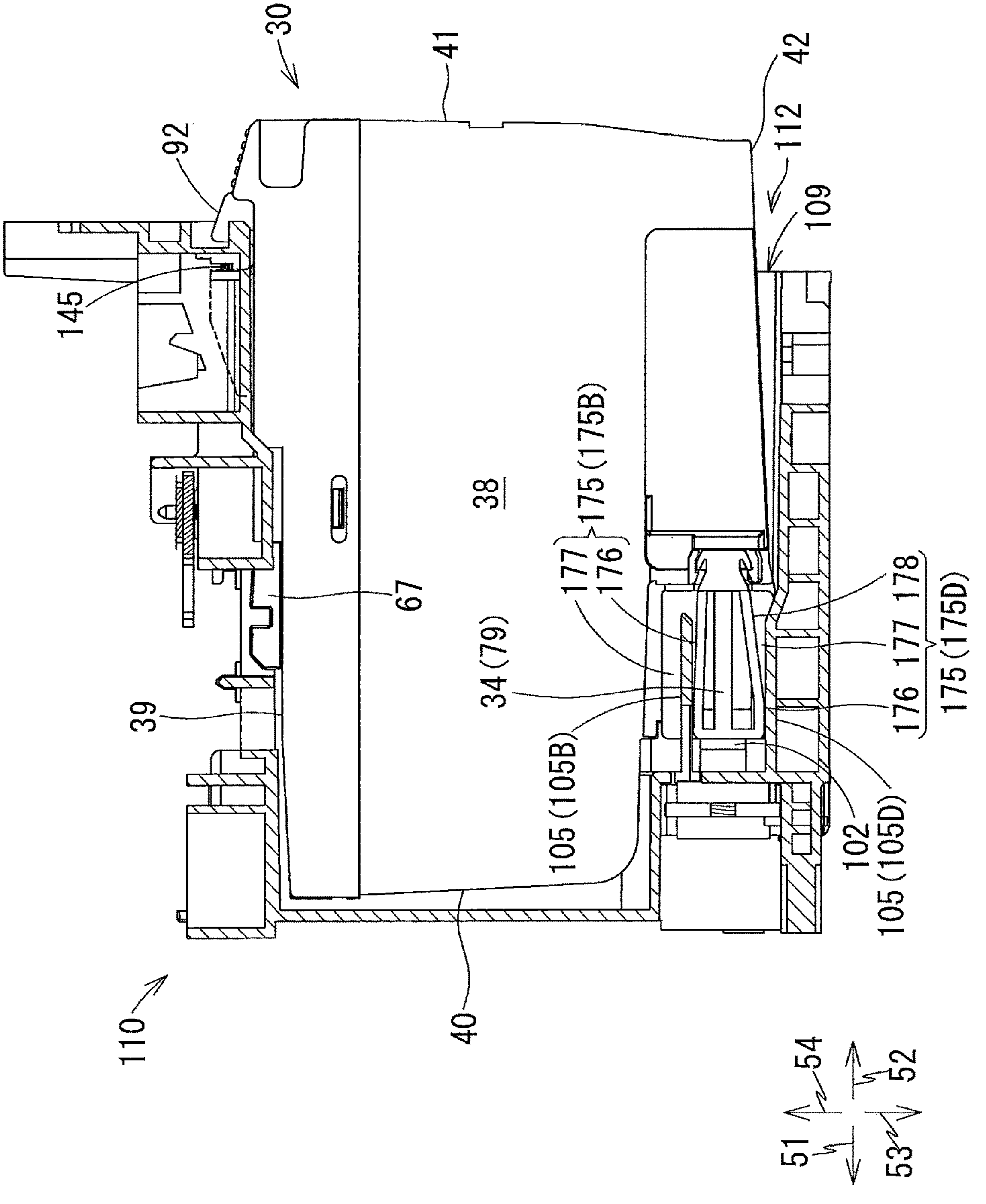
FIG. 20 is a vertical cross-sectional view of the cartridge attachment section 110 and a left side view of the ink cartridge 30 according to the embodiment, illustrating a state where the ink cartridge 30 has been completely attached to the cartridge attachment section 110.

Further, when the front wall 40, 82 of the ink cartridge 30 approaches the position near the inner end surface 59 of the case 101, the lock shaft 145 moves past the sloped surfaces 155 and the horizontal surfaces 154 and is positioned further rearward than the lock surface 151 as illustrated in FIG. 19. In other words, the lock shaft 145 is slightly spaced apart from the ink cartridge 30. Further, at this time, a space is formed below the lock shaft 145. The ink cartridge 30 therefore receives no reaction force from the lock shaft 145. As a result, the ink cartridge 30 is pivotally moved about the through-hole 73 of the packing 76 so that the rear portion of the ink cartridge 30 moves upward (see FIGS. 3 and 20). Note that the posture of the ink cartridge 30 illustrated in FIGS. 3 and 20 is the operational posture, that is, the upright posture.

As the rear portion of the ink cartridge 30 is moved upward as a result of the pivotal movement of the ink cartridge 30, the lever 163 is also moved upward. Accordingly, a surface 169A at the distal end (i.e. upper end) of the second projection 169 of the lever 163 contacts the bottom surface 111A of the projection plate 111 from below. In other words, the lever 163 can access the projection plate 111 while moving upward. Note that the lever 163 comes into contact with the bottom surface 111A of the projection plate 111 after the ink needle 102 enters the ink valve chamber 35, that is, after the ink needle 102 is connected to the ink supply portion 34 (see FIGS. 3, 17, and 19).

When the surface 169A at the upper end of the second projection 169 of the lever 163 contacts the bottom surface 111A of the projection plate 111, the second projection 169 receives a downward reaction force from the projection plate 111. In other words, the lever 163 receives a force pivotally moving in a clockwise direction in FIG. 19. This force is greater than a force required to move the first projection 168 from the rear portion 165B at the upper surface of the rod 165 of the valve body 161 to the front portion 165A thereof. The lever 163 can therefore pivotally move in the clockwise direction in FIG. 19 from the first position toward the second position (see also FIG. 3). At this time, the first projection 168 of the lever 163 moves over the sloped portion 165C at the upper surface of the rod 165 of the valve body 161, and thus, moves from the rear portion 165B thereof to the front portion 165A thereof. At the same time, the valve body 161 slightly moves downward as the rod 165 is pushed downward by the lever 163. As a result, the first projection 168 of the lever 163 stops pushing the valve body 161 downward. Hence, the lever 163 no longer maintains the valve body 161 in the closed position. That is, the lever 163 in the second position releases restriction against the movement of the valve body 161 to the open position. In this state, the valve body 161 moves upward from the closed position to the open position by virtue of the urging force of the coil spring 162 (see FIG. 3), thereby opening the through-hole 46. Consequently, the first storage chamber 32 is open to the atmosphere through the through-hole 46, the air chamber 36, the labyrinth path 143, and the communication hole 147. That is, the valve body 161 in the open position allows communication between the first storage chamber 32 and the air communication passage 72.

As described above, the lever 163 in the second position is spaced apart from the projection plate 111. Further, the seal member 166 is in pressure contact with the through-hole 139 from below, covering the peripheral edge portion of the through-hole 139. The gap between the seal member 166 and the through-hole 139 is air-tightly and liquid-tightly closed.

As described above, in order to allow the first storage chamber 32 to be opened to the atmosphere, the valve body 161 needs to be first pushed downward and then moved upward. This configuration can suppress unintentional movement of the valve body 161 to the open position. Note that the movement of the lever 163 is irreversible. That is, the lever 163 can be moved from the first position to the second position by abutting against the projection plate 111. However, even if the ink cartridge 30 is removed from the case 101, the lever 163 cannot be returned to the first position once the lever 163 is moved into the second position. The movement of the valve body 161 is also irreversible, accordingly.

Further, when the ink cartridge 30 is placed into the state illustrated in FIGS. 3 and 20 after the pivotal movement of the ink cartridge 30, the light-blocking plate 67 (specifically, the portion of the light-blocking plate 67 where the cutout 66 is formed) is positioned between the light emitter and the light receiver of the optical sensor 113 (see FIG. 2). Hence, the printer 10 can determine that the ink cartridge 30 has been attached to the cartridge attachment section 110. Incidentally, in FIGS. 3 and 15 to 20, the optical sensor 113 is not illustrated.

Further, when the ink cartridge 30 is placed into the state illustrated in FIGS. 3 and 20 after the pivotal movement of the ink cartridge 30, each electrode 65 of the IC board 64 electrically contacts the corresponding contact 106 while resiliently deforming the contact 106 upward.

When the ink cartridge 30 is pivotally moved so that the rear portion of the ink cartridge 30 moves upward, the lock surface 151 also moves upward. Then, when the ink cartridge 30 is placed into the state illustrated in FIGS. 3 and 20, the lock surface 151 faces rearward and opposes the lock shaft 145. When the user stops pushing the ink cartridge 30 frontward in this state, the ink cartridge 30 moves rearward due to the urging force of the coil spring 78. Since the lock surface 151 faces rearward and opposes the lock shaft 145, the lock shaft 145 abuts on the lock surface 151 and engages with the lock surface 151 when the ink cartridge 30 moves rearward. This engagement between the lock shaft 145 and the lock surface 151 restricts the ink cartridge 30 from moving further rearward. In this way, the ink cartridge 30 is held in the attached position by the engagement between the lock shaft 145 and the lock surface 151. The ink cartridge 30 can thus adopt the operational posture as a result of access of the lock surface 151 (ink cartridge 30) to the lock shaft 145 (more specifically, a surface at a front end of the lock shaft 145) in the upward direction 54.

In other words, when the ink cartridge 30 has been attached to the cartridge attachment section 110 as a result of insertion, in the frontward direction 51, of the ink needle 102 into the ink supply portion 34 and as a result of engagement of the lock surface 151 with the lock shaft 145, the ink cartridge 30 takes an attachment posture. When the ink cartridge 30 takes the attachment posture, the ink cartridge 30 is capable of supplying ink to the recording head 21 and being operated by the printer 10 for recording images.

In order to remove the ink cartridge 30 from the cartridge attachment section 110, the user pushes the operation surface 92 downward in a state illustrated in FIGS. 3 and 20. As the operation surface 92 is pushed downward, the ink cartridge 30 is pivotally moved about the through-hole 73 of the packing 76 as the pivot center, with its rear portion moving downward (see FIGS. 18 and 19). The lock surface 151 is thus moved to a position downward relative to the lock shaft 145. As a result, the ink cartridge 30 is no longer restricted from moving rearward. Hence, the ink cartridge 30 moves rearward relative to the cartridge attachment section 110 by the urging force of the coil spring 78. Accordingly, the user can take the ink cartridge 30 out of the cartridge attachment section 110 while holding the cartridge casing 130. Note that the first storage chamber 32 remains opened to the atmosphere even after the ink cartridge 30 is removed from the cartridge attachment section 110 since the valve body 161 remains in the open position.

<Variations and Modifications>

<Ink Cartridge 30K>

Figure 23:
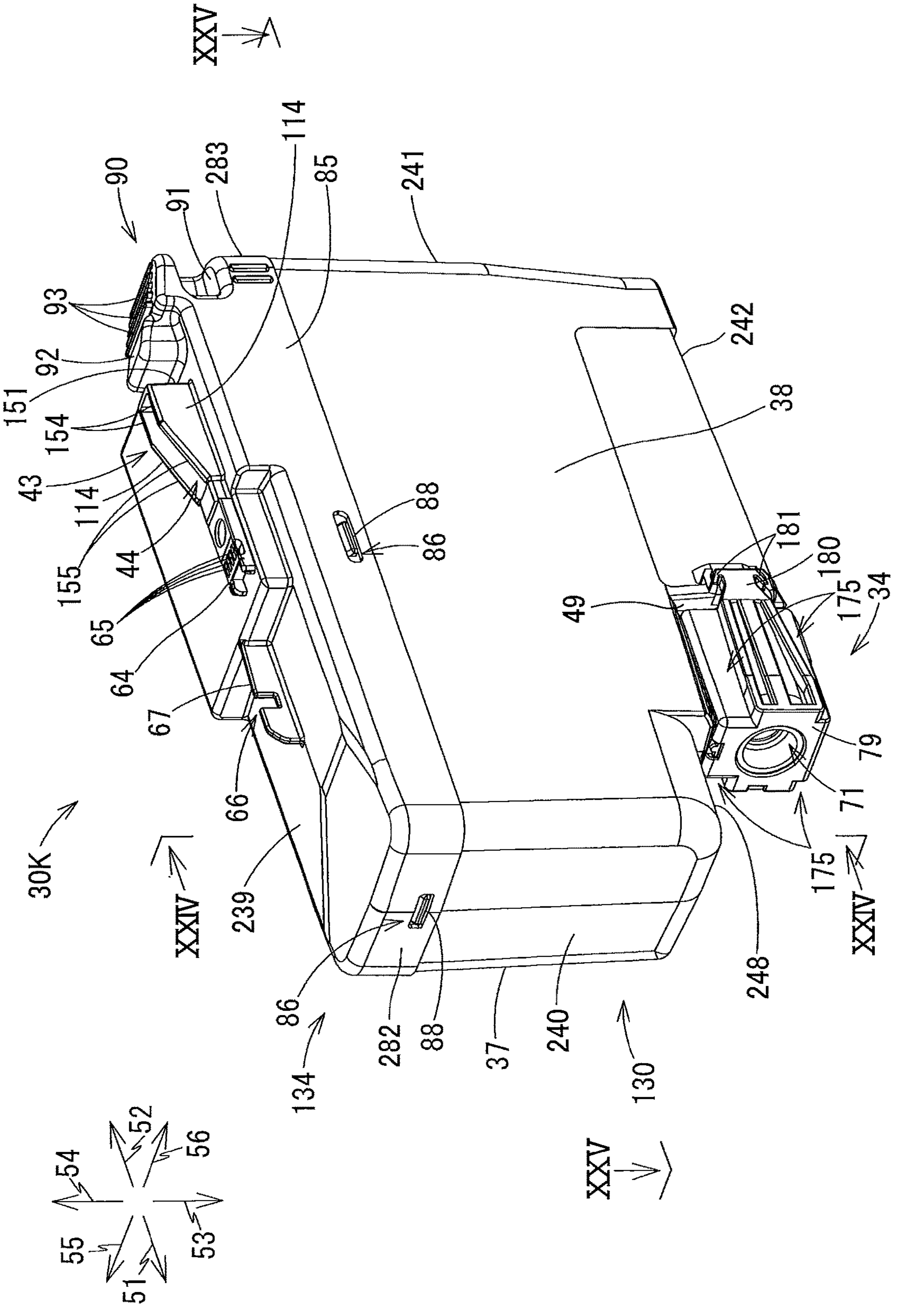
FIG. 23 is a perspective view of an ink cartridge 30K, in which black ink is stored, according to one variation of the ink cartridge 30 as viewed from a front side thereof.

Next, the ink cartridge 30K corresponding to a color of black will be described while referring to FIGS. 23 to 25. As illustrated in FIG. 23, the ink cartridge 30K includes a front wall 240, 282, a rear wall 241, 283, a top wall 239, a bottom wall 242, 248, the right side wall 37, 84, and the left side wall 38, 85. The front wall 240, 282 and the rear wall 241, 283 of the ink cartridge 30K have dimensions in the left-right direction greater than those of the front wall 40, 82 and the rear wall 41, 83 of the respective three ink cartridges 30 corresponding to three colors of cyan, magenta, and yellow (see FIG. 4), respectively. In other words, compared to the ink cartridges 30 corresponding to the colors of cyan, magenta, and yellow, the front wall 240, 282 and the rear wall 241, 283 of the ink cartridge 30K expand rightward. Accordingly, the ink supply portion 34, the IC board 64, the protruding portion 43 and the operation portion 90 of the ink cartridge 30K are positioned leftward relative to a left-right center of the ink cartridge 30K. However, the light-blocking plate 67 of the ink cartridge 30K is positioned at the left-right center of the ink cartridge 30K.

As described above, the ink cartridge 30K corresponding to a color of black differs from the ink cartridges 30 corresponding to respective colors of cyan, magenta, and yellow in that the front wall 240, 282 and the rear wall 241, 283 of the ink cartridge 30K expand rightward. Hereinafter, a structure of the ink cartridge 30K different from the ink cartridges 30 corresponding to colors of cyan, magenta, and yellow will be described in detail.

Figure 24:
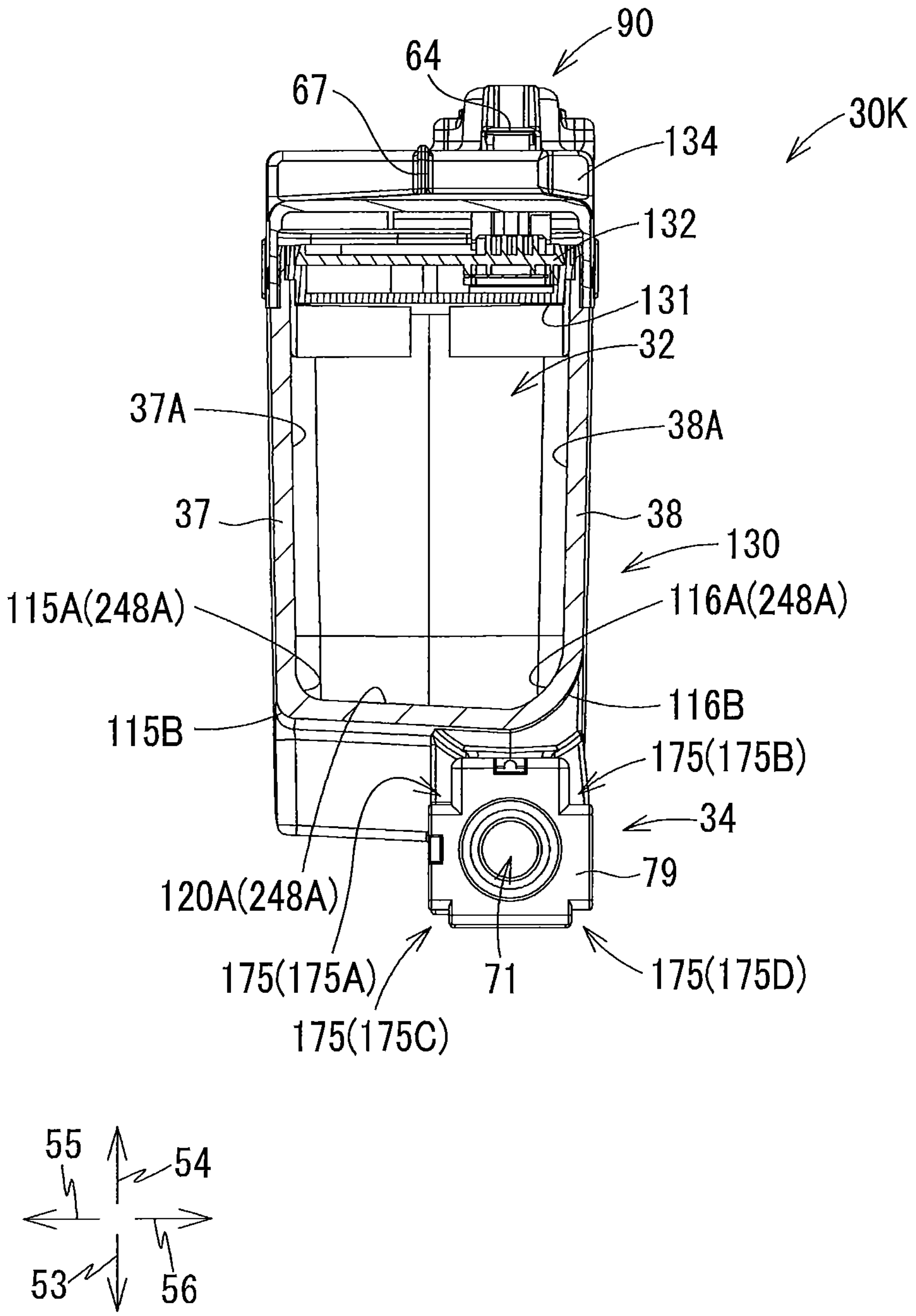
FIG. 24 is a cross-sectional view of the ink cartridge 30K according to the variation taken along a line XXIV-XXIV in FIG. 23.

As illustrated in FIG. 24, the ink cartridge 30K has a subordinate bottom wall portion 248 having an upper surface 248A. The upper surface 248A is continuous with an upper surface 245A of an inner bottom wall portion 245, as illustrated in FIG. 25. The upper surface 248A includes the curved surface 115A, the curved surface 116A, and an intermediate surface 120A. The intermediate surface 120A is a flat surface, and is connected to the curved surface 115A at its right end and to the curved surface 116A at its left end. The intermediate surface 120A of the upper surface 248A slopes relative to the left-right direction so that its left end is positioned further downward than its right end. Thus, the left end of the intermediate surface 120A of the upper surface 248A is a lowermost portion of the upper surface 248A. That is, the left end of the intermediate surface 120A of the upper surface 248A is a lowermost portion of the first storage chamber 32 at its front portion. Incidentally, the intermediate surface 120A of the upper surface 248A may slope relative to the left-right direction so that its right end is positioned further downward than its left end. Alternatively, the intermediate surface 120A of the upper surface 248A may not slope relative to the left-right direction, that is, may be a non-sloped flat surface parallel to the horizontal direction. The intermediate surface 120A of the upper surface 248A is made to be flat and connected to the inner surface 38A of the left side wall 38 via the curved surface 116A, thereby enlarging a dimension in the widthwise direction (i.e. left-right direction) of the first storage chamber 32 of the ink cartridge 30K. Hence, a larger amount of ink can be stored in the first storage chamber 32 of the ink cartridge 30K than in the first storage chamber 32 of the ink cartridge 30 illustrated in FIG. 14.

As illustrated in FIG. 24, the curved surface 115A extends downward from the lower end of the inner surface 37A of the right side wall 37, and the curved surface 116A extends downward from the lower end of the inner surface 38A of the left side wall 38. In other words, the curved surface 115A is continuously connected to the lower end of the inner surface 37A of the right side wall 37, and the curved surface 116A is continuously connected to the lower end of the inner surface 38A of the left side wall 38. The curved surface 115A has a lower end connected to the right end of the intermediate surface 120A. The curved surface 116A has a lower end connected to the left end of the intermediate surface 120A. Here, the left end of the intermediate surface 120A of the subordinate bottom wall portion 248 constitutes the lowermost portion of the front portion of the first storage chamber 32 of the ink cartridge 30K. That is, the lower end of the curved surface 115A and the lower end of the curved surface 116A are connected to the intermediate surface 120A of the upper surface 248A of the subordinate bottom wall portion 248 that includes the lowermost portion of the front portion of the first storage chamber 32.

The upper surface 248A further includes the curved surface 119A (see FIG. 10) continuously connected to a lower end of the inner surface 241A of the rear wall 241.

Figure 25:
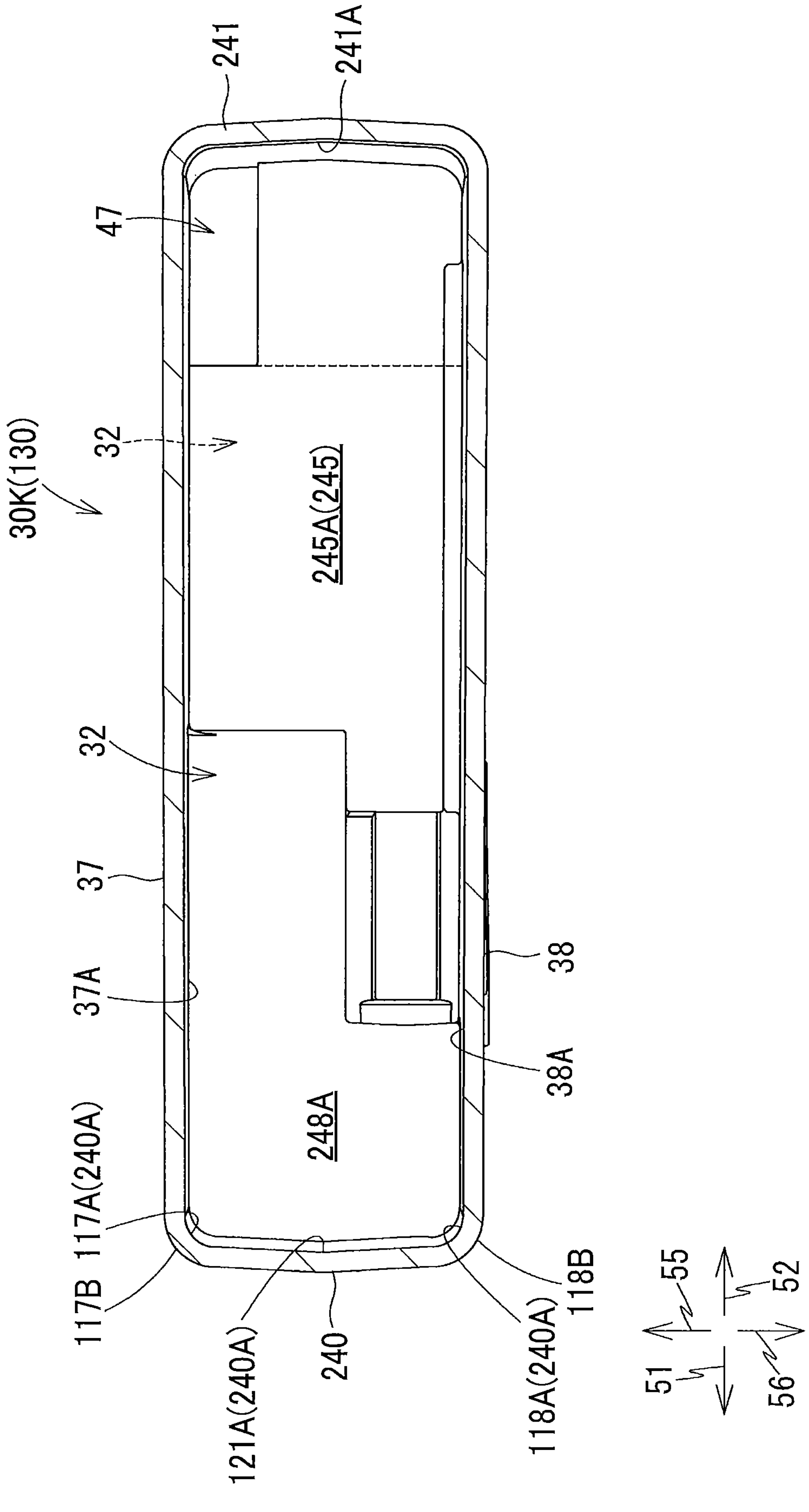
FIG. 25 is a cross-sectional view of the ink cartridge 30K according to the variation taken along a line XXV-XXV in FIG. 23.

The inner curved surface 117A, the inner curved surface 118A, and the inner curved surface 119A of the ink cartridge 30K each have a configuration the same as that in the embodiment described above, except that an inner surface 240A of the front wall 240 has a dimension in the left-right direction greater than that of the inner surface 40A of the front wall 40 of the ink cartridge 30 (see FIG. 25).

In the ink cartridge 30K, the lower end of the curved surface 115A and the lower end of the curved surface 116A are connected to the intermediate surface 120A of the upper surface 248A of the subordinate bottom wall portion 248. However, the lower end of the curved surface 115A and the lower end of the curved surface 116A may be continuously connected to each other.

Incidentally, the upper surface 245A may include a curved surface continuously connected to a lower end of an inner surface 241A of the rear wall 241 as in the embodiment.

<Other Modifications>

In the above-described embodiment, the first ribs 185 and the second ribs 186 have shapes as illustrated in FIGS. 8A and 8B. However, as long as each of the first ribs 185 and the corresponding second rib 186 are spaced apart from each other in the left-right direction and have at least the inclining portion 185B and the inclining portion 186B, respectively, the first ribs 185 and the second ribs 186 may not have the shapes illustrated in FIGS. 8A and 8B.

Figure 26A:
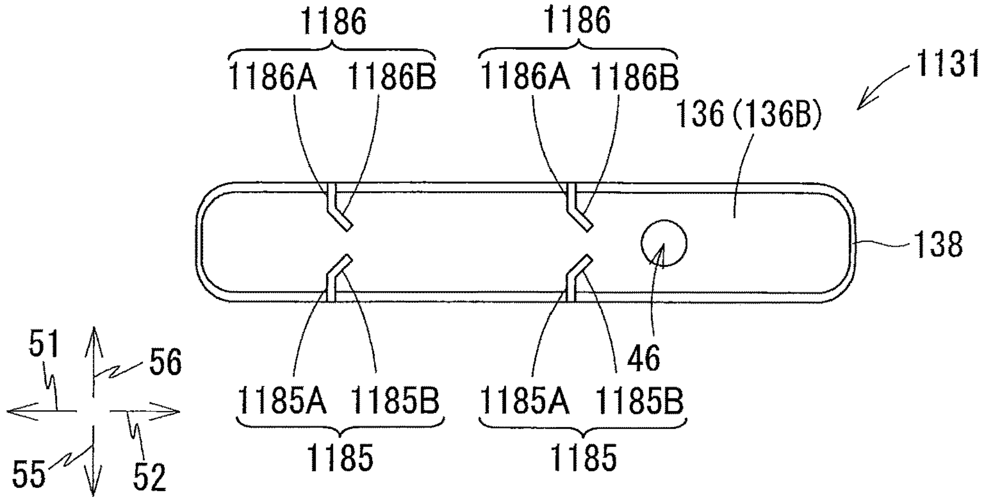
FIG. 26A is a bottom view of a first inner lid 1131 according to a first variation of the first inner lid 131.

FIG. 26A illustrates a first inner lid 1131 including first ribs 1185 and second ribs 1186 according to a first variation to the embodiment. Each of the first ribs 1185 includes an extending portion 1185A and an inclining portion 185B. Each of the second ribs 1186 includes an extending portion 1186A and an inclining portion 1186B. Each one of the first ribs 1185 opposes corresponding one of the second ribs 1186 in the left-right direction. A distal end (i.e. rear end) of an inclining portion 1185B of each first rib 1185 may be arranged at the same position in the front-rear direction as a distal end (i.e. rear end) of an inclining portion 1186B of the corresponding second rib 1186.

Figure 26B:
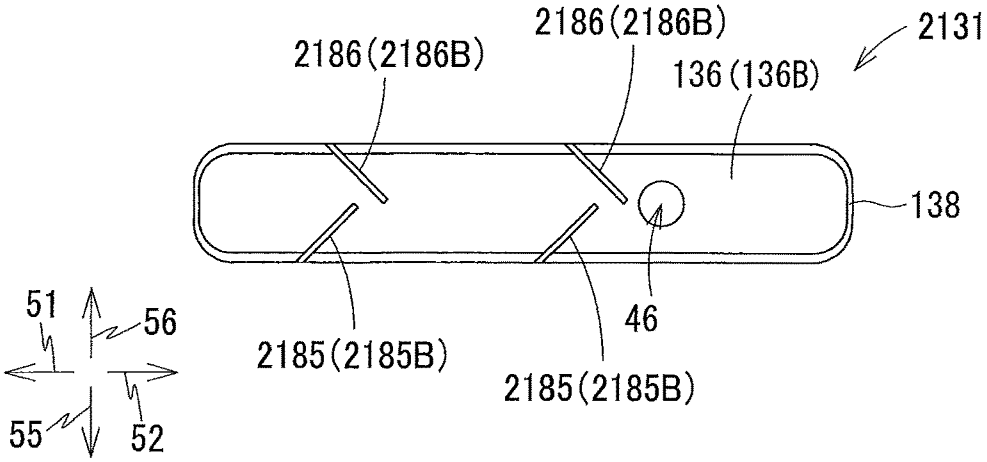
FIG. 26B is a bottom view of a first inner lid 2131 according to a second variation of the first inner lid 131.
Figure 26C:
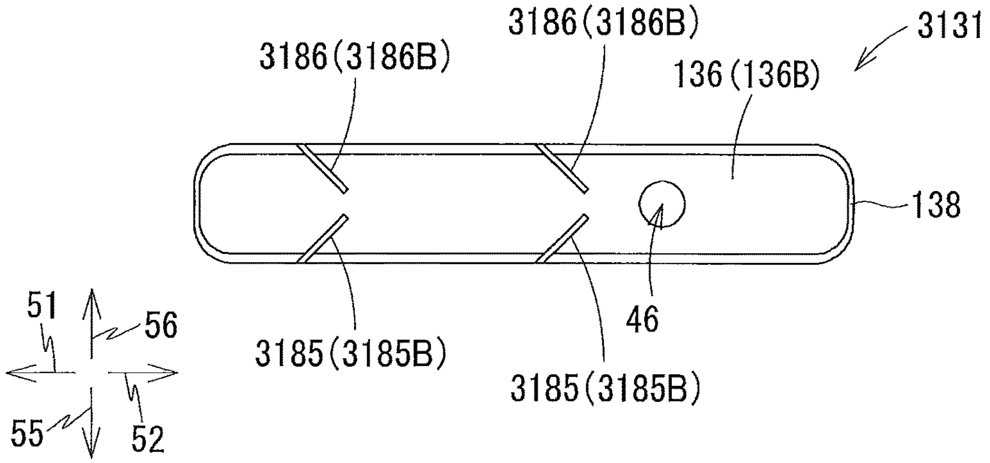
FIG. 26C is a bottom view of a first inner lid 3131 according to a third variation of the first inner lid 131.

FIG. 26B illustrates a first inner lid 2131 including first ribs 2185 and second ribs 2186 according to a second variation to the embodiment. Each of the first ribs 2185 includes an inclining portion 2185B. Each of the second ribs 2186 includes an inclining portion 2186B. Further, FIG. 26C illustrates a first inner lid 3131 including first ribs 3185 and second ribs 3186 according to a third variation to the embodiment. Each of the first ribs 3185 includes an inclining portion 3185B. Each of the second ribs 3186 includes an inclining portion 3186B.

As illustrated in FIG. 26B, at least one of the first rib 2185 and the second rib 2186 need not have the extending portion. Likewise, as illustrated in FIG. 26C, at least one of the first rib 3185 and the second rib 3186 need not have the extending portion. Note that FIGS. 26B and 26C illustrate configurations in which each of the first ribs 2185, 3185 does not have the extending portion and each of the second ribs 2186, 3186 does not have the extending portion.

In the above-described embodiment, the lower ends of the first ribs 185 and the lower ends of the second ribs 186 are provided at heights the same as one another. However, the lower ends of the first ribs 185 and the lower ends of the second ribs 186 may be provided at heights different from one another. For example, of the plurality of first ribs 185 and the second ribs 186, the ribs 185, 186 positioned closer to the front-rear center of the side walls 37, 38 may protrude further downward.

The protruding length of the first rib 185 may not be uniform across the entire region thereof. Likewise, the protruding length of the second rib 186 may not be uniform across the entire region thereof. For example, of the first ribs 185 and the second ribs 186, the base ends of the extending portions 185A, 186A respectively contacting the inner surfaces 37A, 38A of the side walls 37, 38 and portions near the distal ends of the extending portions 185A, 186A (that is, base end portions) may protrude further downward than any other portions than the base end portions.

In the above-described embodiment, the front wall 40, the rear wall 41, the right side wall 37, and the left side wall 38 of the cartridge casing 130 has translucency so that the surface level of the ink stored in the first storage chamber 32 and the surface level of the ink stored in the second storage chamber 33 can be visually recognized from the outside of the ink cartridge 30. Further, the front wall 40, the rear wall 41 and the right side wall 37, and the left side wall 38 are exposed to an outside and constitute the outer surfaces of the cartridge casing 130, except for their upper end portions engaged with the outer lid 134.

However, each of the front wall 40, the rear wall 41, the right side wall 37, and the left side wall 38 may have at least a portion forming the outer wall of the cartridge casing 130, that is, the wall of the cartridge casing 130 whose outer surface is exposed to the outside.

For example, a label may be adhered to a portion of the outer surface of one of the front wall 40, the rear wall 41, the right side wall 37, and the left side wall 38, and the portion to which the label is adhered may degrade visual recognition to the surface level of the ink stored in each of the first storage chamber 32 and the second storage chamber 33 from the outside of the ink cartridge 30. In this case, a portion of each of the front wall 40, the rear wall 41, the right side wall 37, and the left side wall 38 except for the portion to which the label is adhered constitutes the outer wall of the cartridge casing 130. Thus, the liquid storage chamber (e.g. the first storage chamber 32 and the second storage chamber 33) in the ink cartridge 30 need not be visually recognized from the outside of the ink cartridge 30 in any direction. However, it is preferable that the front wall 40, the rear wall 41, the right side wall 37, and the left side wall 38 each have a region through which the surface level of the ink stored in the first storage chamber 32 can be recognized.

Further, the cartridge casing 130 may be covered with a cover, for example. In this case, however, the cover needs to be configured so as to expose a part of the front wall 40, a part of the rear wall 41, a part of the right side wall 37, and a part of the left side wall 38 to an outside. For example, the cover may have four openings at positions opposing the part of the front wall 40, the part of the rear wall 41, the part of the right side wall 37, and the part of the left side wall 38, respectively. If this is the case, the parts of the front wall 40, the rear wall 41, the right side wall 37, and the left side wall 38, those exposed to an outside through the openings, form the outer walls of the cartridge casing 130.

Incidentally, in a case where only a part of the front wall 40, a part of the rear wall 41, a part of the right side wall 37, and a part of the left side wall 38 constitute the outer walls of the cartridge casing 130, it is preferable that a lower part of each of the front wall 40, the rear wall 41, the right side wall 37, and the left side wall 38 is exposed to an outside.

In the above-described embodiment, the cartridge casing 130, the first inner lid 131, the second inner lid 132, the outer lid 134, and the support member 150 are assembled to provide the ink cartridge 30. However, at least some of the cartridge casing 130, the first inner lid 131, the second inner lid 132, the outer lid 134, and the support member 150 may be integrally formed. For example, the cartridge casing 130 and the outer lid 134 may be integrally formed. Alternatively, the second inner lid 132 and the support member 150 may be integrally formed.

In the above-described embodiment, contact between the lock shaft 145 and the lock surface 151 holds the ink cartridge 30 in the attached position. However, the ink cartridge 30 may not be held in the attached position by the contact between the lock shaft 145 and the lock surface 151. Any other known configuration may be employed to hold the ink cartridge 30 in the attached position.

In the above-described embodiment, the semipermeable membrane 141 is welded to the lower end surface of the rib 140. However, the semipermeable membrane 141 may be welded at any other portion as long as the semipermeable membrane 141 is welded to a portion capable of preventing ink drawn into the air chamber 36 through the through-hole 46 from flowing into the labyrinth path 143. Further, in the above-described embodiment, the semipermeable membrane 141 is welded. However, the semipermeable membrane 141 need not be welded.

In the above-described embodiment, the two projections 180 provided at the cap 79 oppose each other in the left-right direction. However, the projections 180 may oppose each other in any direction other than the left-right direction. For example, the projections 180 may oppose each other in the up-down direction.

In the above-described embodiment, the valve mechanism 135 is configured to interrupt communication between the first storage chamber 32 and the atmosphere by closing the through-hole 46 and to provide communication between the first storage chamber 32 and the atmosphere by opening the through-hole 46. However, the valve mechanism 135 may be configured to open and close a portion of the air communication passage 72 other than the through-hole 46.

Further, in the above-described embodiment, the valve mechanism 135 moves away from the through-hole 46 as the ink cartridge 30 is in the process of being moved upward (i.e. in a direction opposite to the gravitational direction) to engage the lock surface 151 with the lock shaft 145. However, the valve mechanism 135 may so move as the ink cartridge 30 is in the process of being moved in an attachment direction to the cartridge attachment section 110, that is, in a direction crossing the gravitational direction.

In the above-described embodiment, the ink supply portion 34 is provided with the cylinder 75 and the cap 79 covering the cylinder 75. However, the ink supply portion 34 need not be provided with the cap 79. In case the ink supply portion 34 does not include the cap 79, the guide grooves 175 may be formed in an outer circumferential surface of the cylinder 75.

In the above-described embodiment, communication between the interior and the exterior of the ink supply portion 34 is interrupted and provided by the valve 77. However, the opening in the front end of the cylinder 75 may be formed by piercing, with a needle or the like, a seal member formed of elastic resin and having no through-hole, and may be closed by the elasticity of the seal member as the needle is retracted from the seal member.

In the above-described embodiment, the dimension in the front-rear direction of the main bottom wall portion 42 is greater than the dimension in the front-rear direction of the subordinate bottom wall portion 48. However, the dimension in the front-rear direction of the main bottom wall portion 42 may be shorter than the dimension in the front-rear direction of the subordinate bottom wall portion 48. The connecting wall 49 may be disposed at a front-rear center portion of the ink cartridge 30. Alternatively, the connecting wall 49 may be disposed at a position closer to the rear wall 41 than to the front wall 40.

In the above-described embodiment, the ink cartridge 30 has the outer shape as illustrated in FIGS. 4 and 5. Further, the ink supply portion 34 extends frontward from the connecting wall 49 and positioned downward and rearward of the front wall 40. However, the ink cartridge 30 need not be so shaped and the ink supply portion 34 need not be so positioned as illustrated in FIGS. 4 and 5.

For example, the gap distance between the right side wall 37 and the left side wall 38 may be greater than the gap distance between the front wall 40 and the rear wall 41. Further, the ink cartridge 30 may have a simple, rectangular outer shape. Still further, the ink supply portion 34 may extends frontward from the front wall 40. Alternatively, the ink supply portion 34 may extend downward from the main bottom wall portion 42 and may have a bent or curved distal end to allow the ink supply port 71 to open frontward.

Figure 27A:
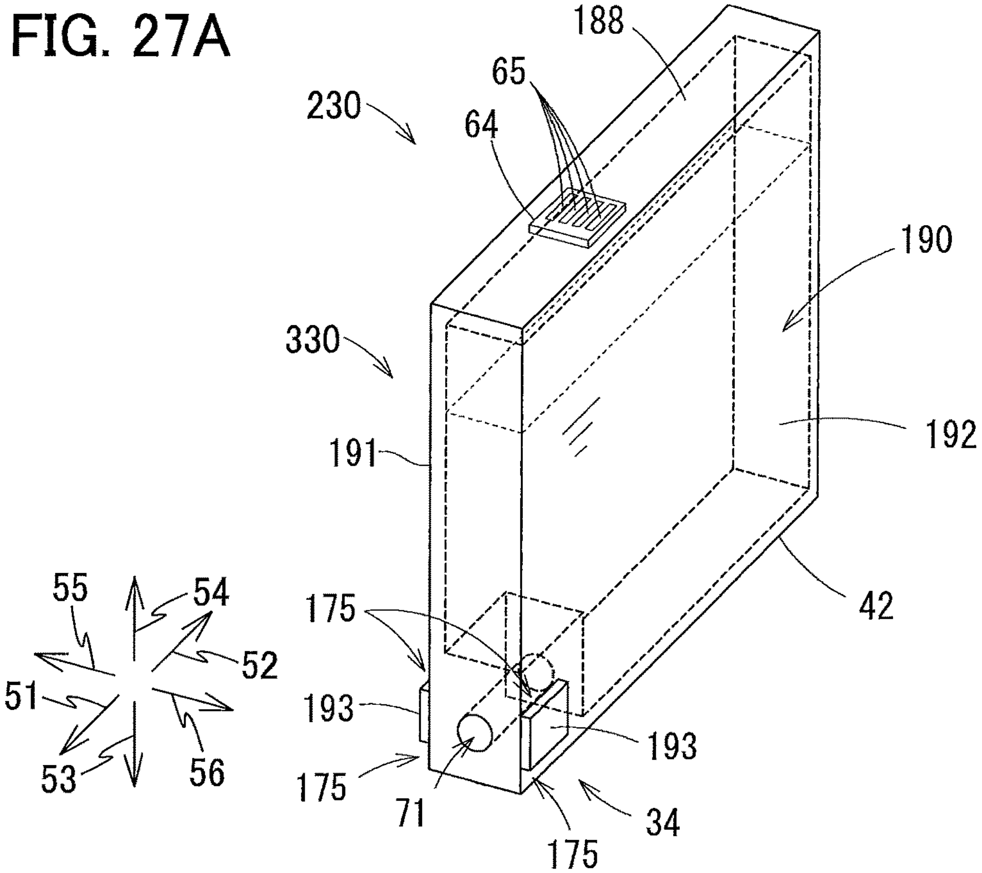
FIG. 27A is a perspective view of an ink cartridge 230 according to a first modification of the ink cartridge 30 as viewed from a front side thereof.

FIG. 27A illustrates an ink cartridge 230 according to a first modification to the embodiment. The ink cartridge 230 has an outer shape defined by a cartridge casing 330. The cartridge casing 330 has a generally rectangular parallelepiped shape. The ink cartridge 230 does not include the first inner lid 131, the second inner lid 132 or the outer lid 134. That is, the cartridge casing 330 of the ink cartridge 230 has a top wall 188, a bottom wall, a front wall, a rear wall, a right side wall 191, and a left side wall 192. The top wall 188 is connected to the front wall, the rear wall, the right side wall 191, and the left side wall 192. The top wall 188 constitutes a part of the cartridge casing 330. The cartridge casing 330 has a storage chamber 190. The storage chamber 190 is defined by the front wall, the rear wall, the bottom wall, the top wall 188, the right side wall 191, and the left side wall 192 of the cartridge casing 330. The cartridge casing 330 need not be formed with integral molding of resin. For example, the right side wall 191 and the left side wall 192 may be configured of films welded to the front wall, the rear wall, the bottom wall, and the top wall 188.

In this modification, the ink supply portion 34 does not protrude from any walls defining the outer shape of the ink cartridge 230. In this case, a protrusion 193 protruding in the left-right direction is provided at each of the right side wall 191 and the left side wall 192 such that the ink supply port 71 is interposed between the two protrusions 193. Each protrusion 193 extends in the front-rear direction along a liquid passage 194. At least one of an upper end and a lower end of each protrusion 193 may serve as the guide grooves 175.

Further, in this modification, the ink supply portion 34 does not include the cylinder 75, the packing 76, the valve 77, the coil spring 78, the cap 79, or the snap-fit mechanism 74. A film (not illustrated) is adhered to an opening of the ink supply port 71. The film provides a liquid-tight seal with the opening of the ink supply port 71, thereby blocking communication between the storage chamber 190 and the outside of the ink cartridge 230. When the ink cartridge 230 is attached to the cartridge attachment section 110, the ink needle 102 pierces the film, thereby allowing the ink stored in the storage chamber 190 to flow into the ink needle 102.

Further, in such a case, the accessed member (such as, the protruding portion 43, operation portion 90, the light-blocking plate 67, or the electrodes 65 of the IC board 64) is disposed at the top wall 188 of the cartridge casing 330. Incidentally, the accessed member is a member accessible to the outside in a state where the ink cartridge 30 to the cartridge attachment section 110. In FIG. 27A, the IC board 64 as the accessed member is disposed at the top wall 188 of the cartridge casing 330. The protruding portion 43 or the light-blocking plate 67 as the accessed member may be disposed at the top wall 188 of the cartridge casing 330. Alternatively, both the protruding portion 43 and the light-blocking plate 67 may be disposed at the top wall 188 together with the IC board 64.

Figure 27B:
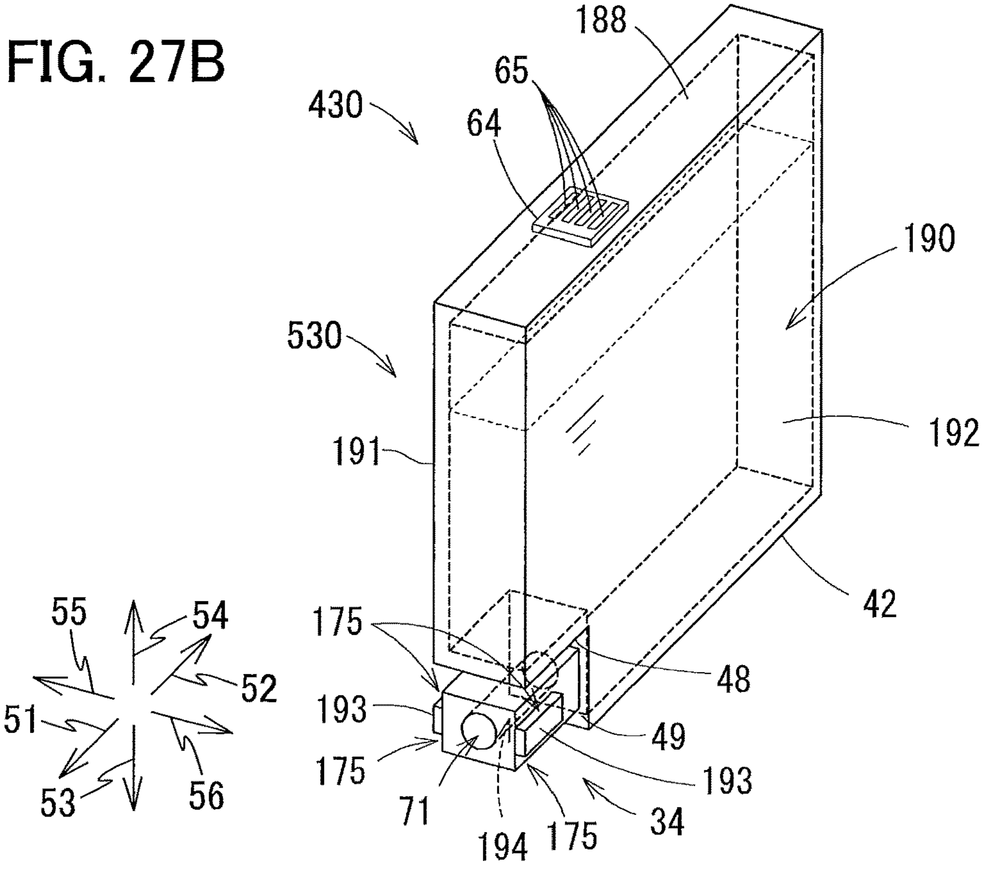
FIG. 27B is a perspective view of the ink cartridge 430 according to a second modification of the ink cartridge 30 as viewed from a front side thereof.

FIG. 27B illustrates an ink cartridge 430 according to a second modification to the embodiment. The ink cartridge 430 has an outer shape defined by a cartridge casing 530. In the above-described first modification illustrated in FIG. 27A, the ink supply portion 34 does not protrude frontward, and is not provided with the cap 79. However, as illustrated in FIG. 27B, the ink supply portion 34 protrudes from the connecting wall 49, but may not be provided with the cap 79. In the latter case, the tubular ink supply portion 34 protrudes frontward from the connecting wall 49, and a pair of protrusions 193 protruding in the left-right direction from the outer surface of the ink supply portion 34. At least one of an upper end and a lower end of each protrusion 193 may serve as the guide grooves 175.

Further, in the above-described embodiment, each of the guide grooves 175 includes a portion extending in the front-rear direction (i.e., the first guide surface 176) and a portion inclined relative to the front-rear direction (i.e., the third guide surface 178). However, as in the modifications illustrated in FIGS. 27A and 27B, the guide grooves 175 may only include a portion extending in the front-rear direction.

Further, in the above-described embodiment, the first guide surface 176 of the guide groove 175 and the second guide surface 177 of the guide groove 175 are intersecting with each other. However, the first guide surface 176 and the second guide surface 177 need not intersect with each other.

Figure 28:
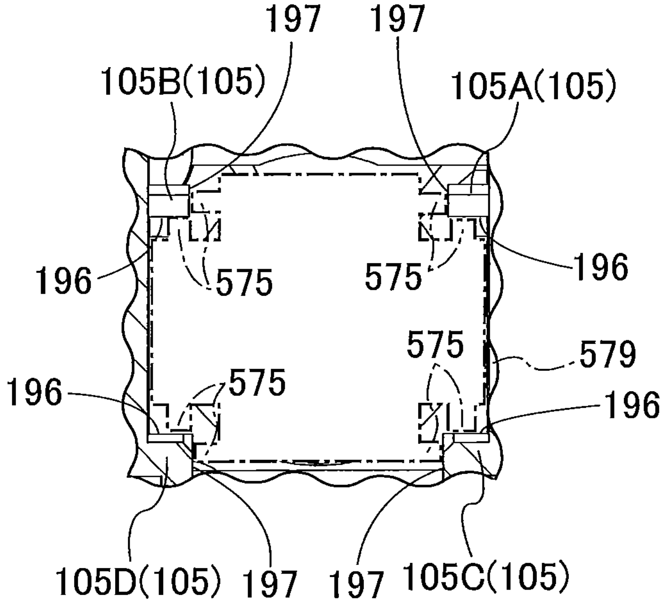
FIG. 28 is a view for description illustrating a state where guide portions 575 are guided by the corresponding projections 105.

Further, in the above-described embodiment, the cap 79 has the four guide grooves 175 that are guided by the corresponding projections 105. However, a different configuration can be employed for guiding the ink supply portion 34 to the ink needle 102. In a variation illustrated in FIG. 28, a cap 579 has four guide portions 575 instead of the four guide groves 175. The respective guide portions 575 are provided at each corner portions or the cap 579. Each of the guide portions 575 has two protrusions adapted to contact the corresponding projections 105. One of the two protrusions extends in the up-down direction, and the remaining one of the two protrusions extends in the left-right direction. During attachment process of the ink cartridge 30 to the cartridge attachment section 110, the two protrusions of each guide portions 575 contact the first guide surface 196 and the second guide surface 197, respectively, whereby the ink supply portion 34 is guided to the ink needle 102. Incidentally, the each of the two protrusions may have a flat-shaped tip end, or a pointed tip end. In case that each of the two protrusions has a flat-shaped tip end, the two protrusions may contact the projection 105 at its flat-shaped tip end (surface contact). In case that each of the two protrusions has a pointed tip end, the two protrusions may contact the projection 105 at its pointed tip end (point contact).

In the above-described embodiment, ink is an example of the liquid. However, a pretreatment liquid that is ejected onto sheets prior to ink during a printing operation may be stored in the liquid cartridge. Alternatively, cleaning water for cleaning the recording head 21 may be stored in the liquid cartridge. That is, the ink cartridge 30 according to the present disclosure need not be a cartridge for storing ink, but may be a cartridge for storing liquid consumed by the printer 10.

<Operational Advantages>

According to the above-described embodiment, the guide grooves 175 are guided by the projections 105 during insertion of the ink needle 102 into the ink supply portion 34, respectively. That is, each guide groove 175 provided at the ink supply portion 34 serves as a reference surface for positioning the ink supply portion 34. In this case, an area of the reference surface for positioning the ink supply portion 34 in position can be smaller in comparison with a case where the outer circumferential surface of the ink supply portion 34 functions as the reference surface. Thus, the ink supply portion 34 can be positively guided toward the ink needle 102 so as to allow the ink needle 102 to be inserted into the ink valve chamber 35 without any collision of the ink supply portion 34 to the ink needle 102.

Further, according to the above-described embodiment, the ink supply portion 34 is formed with four of the guide grooves 175. Accordingly, the ink supply portion 34 can be surely guided toward the ink needle 102.

Further, according to the above-described embodiment, the first guide surface 176 and the second guide surface 177 are open. That is, the guide groove 175 does not have a surface that faces the first guide surface 176 and the second guide surface 177. Therefore, interference between the ink supply portion 34 and the projections 105 can be restrained even if the ink cartridge 30 enters into the cartridge attachment section 110 or extracted from the cartridge attachment section 110 with the ink cartridge 30 being inclined relative to the cartridge attachment section 110.

Further, according to the above-described embodiment, each of the four guide grooves 175 is formed at each corners of the cap 79. Accordingly, the outer shape of the cap 79 can be simplified in comparison with a case where the guide groove 175 is provided at a center portion of each of an upper surface, a lower surface, a left surface, and a right surface of the cap 79.

Further, according to the above-described embodiment, the rear end of the first guide surface 176 is positioned rearward of the front end of the packing 76. Since the first guide surface 176 is guided by the projection 105 during attachment of the ink cartridge 30 to the cartridge attachment section 110, the position of the packing 76 can be stabilized. Accordingly, the ink needle 102 can be securely introduced into the ink valve chamber 35.

Further, according to the above-described embodiment, since the third guide surface 178 is inclined relative to the front-rear direction, a space is provided between the third guide surface 178 and the cartridge attachment section 110. Therefore, interference between the ink supply portion 34 and the projections 105 can be restrained even if the ink cartridge 30 enters into the cartridge attachment section 110 or extracted from the cartridge attachment section 110 with the ink cartridge 30 being inclined relative to the cartridge attachment section 110.

Further, according to the above-described embodiment, since the first guide surface 176 is continuous with the third guide surface 178, guiding of the ink supply portion 34 toward the ink needle 102 can be smoothly performed.

Further, according to the above-described embodiment, the angle defined between the third guide surface 178 and the front-rear direction is greater than the angle defined between the bottom surface of the main bottom wall portion 42 and the front-rear direction. This structure can prevent the interference between the third guide surface 178 and the projections 105 even if the ink cartridge 30 is attached to and detached from the cartridge attachment section 110 with the inclined posture of the ink cartridge 30 such that the bottom surface of the main bottom wall portion 42 is abutted against the cartridge attachment section 110.

Further, according to the above-described embodiment, the cartridge casing 130 and the outer lid 134 are pivotally moved to be inclined by their pivotal movement during attachment of the ink cartridge 30 to the cartridge attachment section 110 and detachment of the ink cartridge 30 from the cartridge attachment section 110. However, interference of the ink supply portion 34 against the projections 105 can be restrained even if the cartridge casing 130 and the outer lid 134 are inclined by the pivotal movement as described above.

Further, according to the above-described embodiment, the guide grooves 175 are positioned outward of the IC board 64 in the left-right direction. Accordingly, the respective guide groove 175 contacts the corresponding projection 105 at the position outward of the IC board 64 in the left-right direction during attachment of the ink cartridge 30 to the cartridge attachment section 110 and detachment of the ink cartridge 30 from the cartridge attachment section 110. Therefore, inclination in the left-right direction of the IC board 64 can be restrained during the attachment or the detachment of the ink cartridge 30.

Further, according to the above-described embodiment, the first absorbing member 182 and the second absorbing member 183 can absorb ink leaked from the ink supply portion 34. Therefore, flowing of the ink leaked from the ink supply portion 34 to outside of the ink cartridge 30 can be reduced.

Further, ink leaked from the ink supply portion 34 flows to outside of the ink cartridge 30 through the ink supply port 71. According to the above-described embodiment, the first absorbing member 182 can absorb the ink passing through the ink supply port 71.

Further, most of the ink leaked from the ink supply portion 34 flows downward due to the gravitational force. According to the above-described embodiment, the second absorbing member 183 is disposed at the lower portion of the inner space of the cap 79. Therefore, the ink leaked from the ink supply portion 34 and flowing downward can be absorbed by the second absorbing member 183.

Further, according to the above-described embodiment, the groove 184 is formed at the inner peripheral surface of the cap 79 defining the inner space of the cap 79 so as to extend from the portion adjacent to the peripheral edge portion of the ink supply port 71 toward the second absorbing member 183. Therefore, the ink leaked from the ink supply portion 34 can be directed to the second absorbing member 183 through the groove 184.

REMARKS

The ink cartridge 30 is an example of a liquid cartridge. The ink cartridge 30K is also an example of a liquid cartridge. The ink cartridge 230 is also an example of a liquid cartridge. The ink cartridge 430 is also an example of a liquid cartridge. The ink tube 102 is an example of a liquid supply tube. The cartridge casing 130 and the outer lid 134 are examples of a cartridge body. The cartridge casing 330 is also an example of a cartridge body. The cartridge casing 530 is also an example of a cartridge body. The first storage chamber 32 and the second storage chamber 33 are an example of a liquid storage chamber. The ink storage chamber 190 is also an example of a liquid storage chamber. The ink supply portion 34 is an example of a liquid supply portion. The ink valve chamber 35 is an example of a liquid passage. The front surface 79A is an example of a front end face. The guide groove 175 is an example of a guide. The guide portion 575 is also an example of a guide. The first guide surface 196 of the projection 105 is an example of one surface. The second guide surface 197 of the projection 105 is an example of another surface. The first guide surface 176 of the guide groove 175 is an example of a first guide portion. The second guide surface 177 of the guide groove 175 is an example of a second guide portion. The guide groove 175A is an example of a first guide groove. The guide groove 175B is an example of a second guide groove. The guide groove 175C is an example of a third guide groove. The guide groove 175D is an example of a fourth guide groove. The first perpendicular direction is an example of a first direction. The second perpendicular direction is an example of a second direction. The packing 76 is an example of a seal portion. The guide groove 175C and the guide groove 175D are an example of a particular guide groove. The subordinate bottom wall portion 48 is an example of a first bottom wall. The main bottom wall portion 42 is an example of a second bottom wall. The lock surface 151 is an example of an engagement portion. The cylinder 75 is an example of a sleeve. The IC board 64 is an example of a circuit board. The guide groove 175A and the guide groove 175C are an example of a guide. The guide groove 175B and the guide groove 175D are an example of another guide. The left-right direction is an example of a widthwise direction. The first absorbing member 182 and the second absorbing member 183 are an example of an absorber. The ink supply portion 71 is an example of an opening. The first absorbing member 182 is an example of a first absorber. The second absorbing member 183 is an example of a second absorber. The printer 10 is an example of a liquid-consuming device.

While the description has been made in detail with reference to the embodiment(s) thereof, it would be apparent to those skilled in the art that many modifications and variations may be made therein without departing from the spirit of the disclosure.

What is claimed is:

1. A liquid cartridge comprising:
a liquid chamber configured to store liquid therein; and
a liquid supply portion defining a liquid passage extending in a frontward direction, the liquid supply portion being positioned downward of the liquid chamber in a downward direction perpendicular to the frontward direction,
wherein the liquid supply portion comprises:
an outer peripheral surface extending in the frontward direction; and
a protrusion protruding from the outer peripheral surface in a widthwise direction perpendicular to both the frontward direction and the downward direction, and
wherein the protrusion comprises:
a first surface facing upward in an upward direction opposite the downward direction; and
a second surface facing downward in the downward direction and inclined with respect to the first surface such that the second surface faces not only downward in the downward direction but also rearward in a rearward direction opposite the frontward direction.

2. The liquid cartridge according to claim 1,
wherein the liquid supply portion further comprises:
another protrusion protruding from the outer peripheral surface in the widthwise direction, the another protrusion being positioned opposite the protrusion in the widthwise direction, and
wherein the another protrusion comprises:
a third surface facing upward in the upward direction; and
a fourth surface facing downward in the downward direction and inclined with respect to the third surface such that the fourth surface faces not only downward in the downward direction but also rearward in the rearward direction.

3. The liquid cartridge according to claim 2,
wherein the liquid passage is positioned between the protrusion and the another protrusion in the widthwise direction.

4. The liquid cartridge according to claim 3,
wherein the first surface and the third surface face the liquid chamber in the upward direction.

5. The liquid cartridge according to claim 4,
wherein the first surface extends from a front end of the protrusion, and
wherein the third surface extends from a front end of the another protrusion.

6. The liquid cartridge according to claim 5,
wherein the first surface and the third surface extend parallel to each other in the frontward direction.

7. The liquid cartridge according to claim 2,
wherein the liquid cartridge is for use with a liquid-consuming device including a liquid supply tube, the liquid supply tube being configured to be inserted into the liquid passage of the liquid supply portion during an attachment process of the liquid cartridge to the liquid-consuming device, and
wherein at least one of the first surface, the second surface, the third surface, and the fourth surface serves as a guide surface for guiding an insertion of the liquid supply tube into the liquid passage during the attachment process of the liquid cartridge to the liquid-consuming device.

8. The liquid cartridge according to claim 2,
wherein the liquid supply portion further comprises:
a cap that covers the liquid passage.

9. The liquid cartridge according to claim 8,
wherein the cap has a front end surface serving as a front end of the liquid supply portion, and
wherein the liquid passage is open on the front end surface of the cap.

10. The liquid cartridge according to claim 1, further comprising a cartridge body comprising:
a first bottom wall; and
a second bottom wall positioned rearward in the rearward direction and downward in the downward direction relative to the first bottom wall,
wherein the liquid supply portion is positioned downward in the downward direction relative to the first bottom wall and upward in the upward direction relative to the second bottom wall.

11. The liquid cartridge according to claim 1,
wherein the liquid supply portion further comprises:
a sleeve extending in the frontward direction, the sleeve having a hollow configuration defining an inner space serving as the liquid passage;
a seal portion formed with a through-hole configured to communicate the liquid passage with an outside of the liquid supply portion; and
a cap, and
wherein the cap is configured to cover the sleeve with the seal portion interposed between the cap and the sleeve to fix the seal portion, the cap having an outer peripheral surface serving as the outer peripheral surface of the liquid supply portion.

12. The liquid cartridge according to claim 1, further comprising:
a circuit board extending in a direction different from the frontward direction.

13. The liquid cartridge according to claim 1,
wherein the first surface faces the liquid chamber in the upward direction.

14. The liquid cartridge according to claim 13,
wherein the first surface extends from a front end of the protrusion.

15. The liquid cartridge according to claim 14,
wherein the liquid supply portion further comprises:
a cap that covers the liquid passage.

16. The liquid cartridge according to claim 15, wherein the cap has a front end surface serving as a front end of the liquid supply portion, and wherein the liquid passage is open on the front end surface of the cap.

17. The liquid cartridge according to claim 16, further comprising a cartridge body comprising:

a first bottom wall; and a second bottom wall positioned rearward in the rearward direction and downward in the downward direction relative to the first bottom wall, wherein the liquid supply portion is positioned downward in the downward direction relative to the first bottom wall and upward in the upward direction relative to the second bottom wall.

18. The liquid cartridge according to claim 17, further comprising:

a circuit board extending in a direction different from the frontward direction.

* * * * *